United States Patent [19]
Trovato et al.

[11] Patent Number: 5,870,303
[45] Date of Patent: Feb. 9, 1999

[54] METHOD AND APPARATUS FOR CONTROLLING MANEUVERS OF A VEHICLE

[75] Inventors: Karen I. Trovato, Putnam Valley; Leendert Dorst, Yorktown Heights, both of N.Y.

[73] Assignee: Philips Electronics North America Corporation, New York, N.Y.

[21] Appl. No.: 323,189

[22] Filed: Oct. 14, 1994

Related U.S. Application Data

[63] Continuation of Ser. No. 101,336, Aug. 2, 1993, abandoned, which is a continuation of Ser. No. 879,702, May 5, 1992, abandoned, which is a continuation of Ser. No. 646,516, Jan. 25, 1991, abandoned, which is a continuation of Ser. No. 290,130, Dec. 23, 1988, abandoned, which is a continuation-in-part of Ser. No. 123,502, Nov. 20, 1987, abandoned, which is a continuation-in-part of Ser. No. 166,599, Mar. 9, 1988, Pat. No. 4,949,277.

[51] Int. Cl.⁶ .................................................... G06F 19/00
[52] U.S. Cl. .......................... 364/167.07; 701/26; 395/90
[58] Field of Search ............................... 364/148, 424.01, 364/424.02, 461, 449, 460, 167.01; 340/932.2; 701/23–28, 201, 202; 318/587, 568.12; 901/1, 50; 395/80, 90, 919, 902, 903, 904, 912

[56] References Cited

U.S. PATENT DOCUMENTS

| | | | |
|---|---|---|---|
| 4,361,202 | 11/1982 | Minovitch | 364/424.02 |
| 4,481,568 | 11/1984 | Inaba et al. | 364/474.2 |
| 4,482,968 | 11/1984 | Inaba et al. | 364/474.2 X |
| 4,530,056 | 7/1985 | Mackinnon et al. | 364/449 X |
| 4,674,048 | 6/1987 | Okumura | 318/568.12 X |
| 4,764,873 | 8/1988 | Libby | 364/461 |
| 4,809,178 | 2/1989 | Ninomiya et al. | 364/443 |
| 4,862,373 | 8/1989 | Meng | 364/461 |
| 4,919,224 | 4/1990 | Shyu et al. | 364/424.02 X |
| 4,931,930 | 6/1990 | Shyu et al. | 364/424.01 |
| 4,962,458 | 10/1990 | Verstraete | 364/444 X |

OTHER PUBLICATIONS

J. Barraquand et al, "On Nonholonomic Mobile Robots and Optimal Maneuvering", IEEE International Symposium on Intelligent Control, Albany, NY, Sep. 1989, pp. 1–26.

J. Barraquand et al., "Numerical Potential Field Techniques for Robot Path Planning"; Technical Report STAN–CS–1285, Oct. 1989, pp. 1–38.

D.J. Frailey, "CARGuide–on–board computer for automobile route guidance", AFIPS Conference Proceedings, 1984 National Computer Conference, Jul. 9–12, 1984, Las Vegas, Nevada, pp. 695–706.

Laurent Gouzénes, "Strategies for Solving Collision–free Trajectories Problems for Mobile and Manipulator Robots", Int'l J. Robotics Rsch, vol. 3, No. 4 (Winter 1984) pp. 51–65.

EVA–Ortungs–und Navigationsystem für Landfahrzeuge, ntz, Bd. 36 (1983) Heft 4, pp. 214–218.

Ichikawa et al–"A Heuristic Planner and an Executive for Mobile Robot Control" IEEE Trans. on Systems, Man Cybernetics vol. SMC–15, No. 4, Jul./Aug. 1985, pp. 558–563.

*Primary Examiner*—Joseph Ruggiero
*Attorney, Agent, or Firm*—Anne E. Barschall

[57] ABSTRACT

Maneuvers of a vehicle, in the presence of obstacles, are planned using a three-dimensional configuration space. Axes of the configuration space correspond to x and y coordinate locations of the rear differential of the vehicle and angle of the vehicle. The configuration space is filled with cost to goal and direction arrows values using an exhaustive search strategy. The direction arrows values point to a least cost path to a goal for the vehicle. The exhaustive search strategy involves searching a bow-tie shaped neighborhood of a goal state, and then a bow-tie shaped neighborhood of each state in the first neighborhood, iterating until all reachable states are searched. A precedence order is established so that states which are blocked are not searched.

22 Claims, 20 Drawing Sheets

METHOD AND APPARATUS FOR CONTROLLING MANEUVERS OF A VEHICLE

This is continuation of application Ser. No. 08/101,336, filed on Aug. 2, 1993 abandoned, which is a continuation of Ser. No. 07/879,702, filed on May 5, 1992 abandoned, which is a continuation of Ser. No. 07/646,516, filed on Jan. 25, 1991 abandoned, which is a continuation of Ser. No. 07/290,130, filed on Dec. 23, 1988 abandoned, which is a continuation-in-part of Ser. No. 07/123,502, filed on Nov. 20, 1987 abandoned, which is a continuation-in-part of Ser. No. 166,599 filed Mar. 9, 1988, now U.S. Pat. No. 4,949,277, which issued on Aug. 14, 1990.

BACKGROUND OF THE INVENTION

1. Field of the Invention

The invention relates to controlling maneuvers of a robotic vehicle and in particular to parking a car. Maneuvering a vehicle in this way is a particular example of planning an optimal path for an object to follow from a given start point to a nearest one of a set of goals, taking into account constraints and obstacles.

2. Related Art

One of the most important outstanding problems in robotics is that of path planning with obstacle avoidance. In a typical task, the robot has to move from a start location to a goal location. Obstacles should be avoided along the way, and the movement as a whole should be as efficient as reasonably possible. The planning of the path should be as rapid as possible. The problem of providing such a "path" for a robot, for instance by giving a series of set points, is called the path planning problem.

There are a number of existing robots. Typically they are controlled using a programming language. One commonly used language is Val II, described in Unimation, Inc., "Programming Manual: User's Guide to Val II: Version 2.0 398AG1", December 1986. Val II can be used to control products such as Unimation's Puma Robots and Adept Robots. Using Val II, a user can specify the movement of a robot, from a current point to a desired point, using the command MOVE POINT () on page 4–20 of the reference. Points are usually generated in joint coordinates. It is therefore sufficient for a path planning method to generate a series of set points to be inserted in the appropriate Val II command. The technology is in place for the robot to follow a path once the set points are generated.

Typical industrial robots use manually generated set points. Such manually generated set points are adequate for performing a simple repetitive task such as automated assembly in an environment which does not change from one task to the next. Manually generated set points are not practical and paths followed are often not efficient for dynamic situations, or for situations with large numbers of obstacles, or for obstacles with complex shapes. Therefore there is a need for a method to generate set points automatically.

One known method automatically generates a set of points along an optimal path. The set of points allows a robot to get from a start point to one of a set of goal points. One goal point is chosen over the others because it minimizes movement of the robot. This known method is disclosed in L. Dorst et al., "The Constrained Distance Transformation, A Pseudo-Euclidean, Recursive Implementation of the Lee-algorithm", *Signal Processing III* (I. T. Young et al. eds; Elsevier Science Publishers B.V., EURASIP 1986) ("L. Dorst et al."); and P. W. Verbeek et al., "Collision Avoidance and Path Finding through Constrained Distance Transformation in Robot State Space", Proc. Conf. Intelligent Autonomous Systems I, Dec. 8–11, 1986, Amsterdam pp. 627–634. The known method plans paths in the configuration space of the robot. Obstacles to robot movement are represented by forbidden states in configuration space. In this space, the series of set points is represented in so-called joint coordinates, this is a set of coordinates that can be used to drive the joints of the robot directly. No complicated coordinate transformations are needed. An advantage of the known method is the simplicity with which it can be expanded to greater numbers of degrees of freedom.

In the past, the path in configuration space was found in three steps:

1) A transformation is made of the obstacles and the goals of the robot from points in task space to states in configuration space. The configuration space is discretized.
2) A cost field is created, specifying the total cost needed to reach the closest goal state at each state in configuration space. The particular method used to produce the cost field is described in L. Dorst et al. The method is a repeated scanning of the complete configuration space, while performing a basic cost propagation operation at each state.
3) From the start state, steps are taken in the direction of the cost gradient of the cost field until the goal state is reached. The states passed on the way form the shortest path from start to goal, and can be used as the series of set points.

Steps 1) and 2) are performed only once for a given robot and a given set of obstacles and goals. Using the same cost field, Step 3) can be performed for different start states.

The above method has a number of disadvantages. First, in step 2), the whole configuration space has to be scanned several times. Second, the kinds of cost metrics considered are restricted. In particular the cost of transitions between states in configuration space are considered to be the same for a given direction independent of the state at which cost is calculated. These restrictions limit practical applications. For instance, it is not possible to find a path for a robot arm with revolute joints that will result in minimal movement of an end-effector. Minimal time paths are only possible for a few robots which are of limited practical application. A third disadvantage is that following the gradient requires computation of the gradient at every point of the path.

In the prior art, a search technique known as $A^*$ was known, see e.g. N. J. Nilson, *Principles of Artificial Intelligence*, Chapter 2 (Tioga 1980).

After propagating cost waves, some aspect of the configuration space may change, for instance, if an obstacle is removed or a goal added. In such a case, it may be inefficient to repropagate cost waves through the entire configuration space, because only a small part of the configuration space may be affected.

Another problem which arises after a change in configuration space is that the precise location of the changes, particularly in obstacle location, may not be known.

An approach to this problem is set forth in V. Lumelsky, "Algorithmic and Complexity Issues of Robot Motion in an Uncertain Environment", Journal of Complexity 3, 146–182 (1987); and V. Lumelsky, "Dynamic Path Planning for a Planar Articulated Robot Arm Moving Amidst Unknown Obstacles", Automatica, Vol. 23., No. 5, pp. 551–570 (1987). This approach suffers from certain shortcomings. For instance, the method disclosed is only able to deal with two dimensions. The method also does not have a memory for previously encountered obstacles.

A number of research projects have considered the problem of electronic maps for vehicles.

SUMMARY OF THE INVENTION

It is therefore an object of the invention to control the maneuvers of a robotic vehicle using techniques referred to herein as "budding" and "differential budding".

It is a second object of the invention to avoid repeated scanning of the configuration space during creation of the cost field.

It is a third object of the invention to allow use of cost metrics which vary at different states in configuration space. An example of this would be a cost function which allows minimization of the movement of the effector end of the robot.

It is a fourth object of the invention to avoid computation of the gradient at every state during establishment of a path.

It is a fifth object of the invention to create a path planning method which is easily adaptable to multiple degrees of freedom.

It is a sixth object of the invention to deal with changes in a configuration space.

It is a seventh object to deal with changes in configuration space in the context of a space-variant metric.

It is an eighth object of the invention to deal with changes in a configuration space using budding.

It is a ninth object of the invention to deal with changes in condition in multiple dimensions.

It is a tenth object of the invention to deal with unsensed or partially sensed changes in conditions in the context of a space-variant metric.

It is an eleventh object of the invention to deal with unsensed or partially sensed changes in conditions using budding.

It is a twelfth object of the invention to deal with unsensed or partially sensed changes in conditions with improved abilities to incorporate new data into the memory of the path planner.

It is a thirteenth object of the invention to plan maneuvers of a robotic vehicle.

It is a fourteenth object of the invention to plan maneuvers of a robotic vehicle using budding and differential budding.

It is a fifteenth object of the invention to specify appropriate metrics and configuration spaces for planning maneuvers of a robotic vehicle.

It is a sixteenth object of the invention to establish an efficient precedence for searching a neighborhood of a given state in configuration space.

It is a seventeenth object of the invention to use space variant neighborhoods in configuration space.

These objects are achieved according to the invention by the use of cost metrics which are referred to herein as "space-variant metrics."

These objects are further achieved according to the invention by a process referred to herein as "following the direction arrows".

These objects are still further achieved according to the invention by using the space-variant metrics in a multi-dimensional configuration space.

The method of differential budding involves identifying a region in configuration space which is affected by a change of conditions in task space. Precisely selected states referred to as a perimeter and which define this region are then placed on a "sifting heap" from which they are budded.

In the case of an added obstacle, the perimeter includes the front edge of the obstacle as well as surrounding a group of states which are connected via direction arrows to the back edge of the added obstacle.

In the case of removed obstacles, the perimeter states are neighbors of the removed obstacle states.

In the case of added goals, the perimeter states are the added goals themselves.

In the case of partially sensed changes in conditions, the changes in conditions are detected while following a pre-calculated path. Most changes in conditions can then be dealt with as an added obstacle, a removed obstacle, an added goal, or a removed goal. In one embodiment of the invention, the object first encounters a portion of the change in conditions iteratively follows a newly calculated path until the change in conditions is taken into account.

Further objects and advantages of the invention will become apparent in the remainder of the application.

BRIEF DESCRIPTION OF THE DRAWING

These and other aspects of the invention are described herein with reference to the selected embodiments illustrated in the following figures.

FIG. 1b is a more detailed flowchart of box 154 of FIG. 1a.

DETAILED DESCRIPTION OF THE PREFERRED EMBODIMENTS

A. Definition of Some Terms

A robot has degrees of freedom. The degrees of freedom are the independent parameters needed to specify its position in its task space. Some examples follow. A hinged door has 1 degree of freedom. In other words, any position can be characterized by one parameter, an opening angle. A robot which moves freely over a factory floor has two degrees of freedom, for instance the x- and y- position coordinates. An object in space can be considered to have six degrees of freedom. The 6 independent parameters that need to be specified are three position coordinates and three orientation angles. Therefore in order for a robot to be capable of manipulating an object into an arbitrary position and orientation in space, the robot must have at least six degrees of freedom. An example of a commercially available robot with six degrees of freedom is the Puma 562, manufactured by Unimation, Inc.

A rotational degree of freedom is a degree of freedom that corresponds to an angle about a rotation axis of a robot joint. A rotational degree of freedom is a periodic parameter with values running from 0° to 360°; i.e. 360° corresponds to the same configuration of the robot as does 0°. Translational degrees of freedom correspond to non-periodic parameters that can take on values over an infinite range. Usually, however, the ranges of both rotational and translational degrees of freedom are limited by the scope of the robot.

The "configuration space" of a robot is the space spanned by the parameters of the robot. The configuration space has one dimension for each degree of freedom of the robot. Herein, a point in configuration space will be called a "state". Each "state" in an n-dimensional configuration space is characterized by a set of n values of the n robot degrees of freedom. A robot in the position characterized by the set of values is in a certain configuration. The set of states in the configuration space correspond to the set of all possible robot configurations.

For the purpose of computation, the configuration space is "discretized". This means that only a limited number of states are used for calculations.

Figure 2:
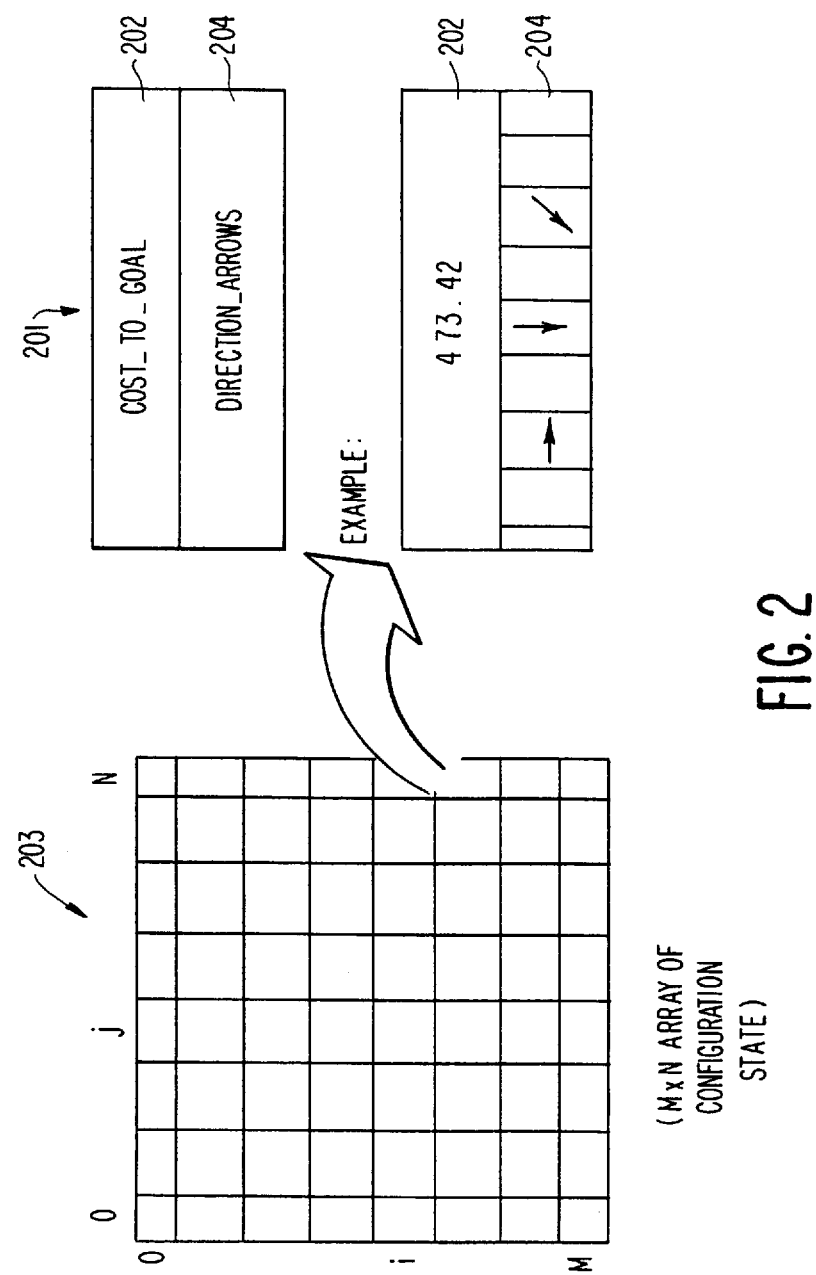
FIG. 2 shows a data structure used as a configuration space.

FIG. 2 shows a data structure 203 which is used as the configuration space of a robot with two degrees of freedom. Data structure 203 is an MxN matrix of configuration states. The states are identified by their indices (i,j), where i represents a row number and j represents a column number. Each state (i,j) is itself a data structure as shown at 201 and has a cost_to_goal field 202 and a direction_arrows field 204. These fields are filled in by "budding" as described below. The cost_to_goal field 202 generally contains a number which represents the cost of transition to get from the present state to a nearest "goal state". "Goal states" represent potential end points of the path to be planned.

The cost of a transition in configuration space is a representation of a "criterion" or constraint in task space. A criterion is a cost according to which a user seeks to optimize. Examples of criteria that a user might chose are: amount of fuel, time, distance, wear and tear on robot parts, and danger.

The direction_arrows field 204 can contain zero or more arrows which indicate a direction of best transition in the configuration space from the present state to a neighbor state in the direction of the goal state resulting in a path of least total cost.

Arrows are selected from sets of permissible transitions between neighboring states within the configuration space. The term "neighbor state" is used herein to mean a state which is removed from a given state by a single permissible transition. One set of arrows could be {up, down, right, left}, where, for instance, "up" would mean a transition to the state immediately above the present state. Another set of arrows could be {NORTH, SOUTH, EAST, WEST, NE, NW, SE, SW}. Yet a third set of arrows could be {(0,1), (1,0), (0,−1), (−1,0), (1,1), (1,−1), (−1, 1), (−1, −1), (1,2), (−1,2), (1,−2) (−1,−2), (2,1), (−2,1), (2,−1), (−2,−1)}. It is noted that the arrows "up", "NORTH", and "(−1,0)", are all representations of the same transition within the configuration space. In general one skilled in the art may devise a number of sets of legal transitions according to the requirements of particular applications. Once a set of legal transitions is devised any unambiguous symbolic representation of the set of permissible transitions can serve as the direction arrows. In the case of the directions (1,2), (−1,2), (1,−2), (−1,−2), (2,1), (−2,1), (2,−1) and (−2,−1), transition to a "neighbor" state in a two dimensional matrix 203 actually requires a "knight's move", as that term is known from the game of chess. For example (1,−2) represents the move in the neighbor direction "down one and right 2".

In the configuration space, a metric is defined. The "metric" specifies for each state in configuration space the cost of a transition to any neighboring state. This metric may be specified by a function. For instance, a locally Euclidean metric can be defined as follows. At a state (i,j), the cost of a transition in a neighbor removed from (i,j) by direction arrow (di,dj) is given by $\sqrt{di \times di + dj \times dj}$. In other situations, it is more convenient to compute the metric in advance and store it. Obstacles can be represented in the metric by transitions of infinite cost. A transition between two arbitrary states must take the form of a series of transitions from neighbor to neighbor. The cost of any arbitrary path from a start state to a goal state is the sum of the costs of transitions from neighbor to neighbor along the path.

In budding, a standard data structure called a heap is used to maintain an ordering of states. This is only one of many possible schemes for ordering, but the heap is considered to be the most efficient schedule for implementations with a small number of parallel processors. The heap is a balanced binary tree of nodes each representing a configuration state. In the preferred embodiment, the nodes actually store the indices of respective configuration states. In the heap, each parent state has a lower cost_to_goal than either of its two children states. Therefore, the state at the top of the heap is that with the least value of cost_to_goal. Heaps are well known data structures, which are maintained using well known methods. One description of heaps and heap maintenance may be found in Aho et al., *The Design and Analysis of Computer Algorithms*, (Addison-Wesley 1974) pp. 87–92. In an alternate embodiment, other ways of ordering states may be used during budding. For instance, a queue can be used. This means that modes are not necessarily budded in order of lower cost.

B. Overview of Budding

Figure 1A:
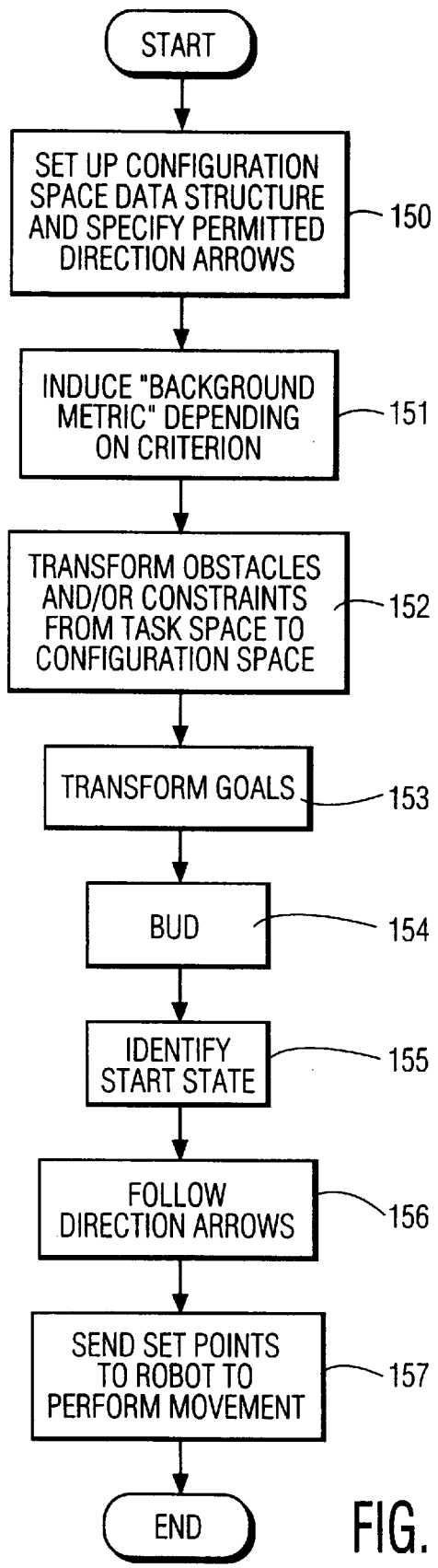
FIG. 1a is a high level flowchart giving a conceptual view of the method of path planning.

FIG. 1a gives a general overview of steps used in generating a series of set points using the method of the invention.

In box 150 the configuration space is set up and permitted direction arrows are specified. One skilled in the art might devise a number of ways of doing this.

One option offered by the method is that of specifying aspects of the configuration space interactively. The number of states in a configuration space might be chosen to reflect how finely or coarsely a user wishes to plan a path. The set of direction arrows may be chosen to be more complete to get finer control of direction. The set of direction arrows may be chosen to be less complete if speed of path planning is more important than fine control of direction.

Other ways of specifying the configuration space and direction arrows are to code them into a program or hard wire them into circuitry. These options provide for less flexibility, but can result in increased processing efficiency.

In box 151, a "background metric" is induced by a criterion. A background metric is one which applies throughout a configuration space without taking into account local variations which relate to a particular problem. Another option offered by the method is to specify the transition costs interactively.

In box 152 obstacles and constraints are transformed from task space to configuration space. This transformation generates obstacle states and/or constraint states. In addition or alternatively the transformation can represent obstacles and constraints as part of the metric. Boxes 151 and 152 are represented as separate steps in FIG. 1a, but in fact they can be combined.

In box 153, goals are transformed from points in task space to one or many goal states in configuration space.

In box 154 "budding" occurs. "Budding" is explained below. Budding results in filling the direction_arrows fields of the configuration space with direction arrows.

In box 155, a start state is identified. The start point in task space can be input by a user, or it can be sensed automatically, where applicable. This start point must then be transformed into a state in configuration space. If robot encoders are read, or the command WHERE in Val II is used, one obtains the parameters of the start state immediately, without any need for transformations. The WHERE command returns the joint encoder angles in degrees.

In box 156, the method follows the direction arrows set up in box 154 from the start point indicated in box 155 to the goal state. The path states passed through in box 156 are sent to a robot at 157. The path can be sent in the form of set points. Each set point can then be a parameter of a MOVE POINT() command in Val II. The set points can be transformations into task space of the path states passed through in box 156. In an appropriate application, the set points can be the path states themselves. As will be discussed below, in some applications the set points need not be used to direct a robot. They can also be used as instructions to human beings.

Figure 1B:
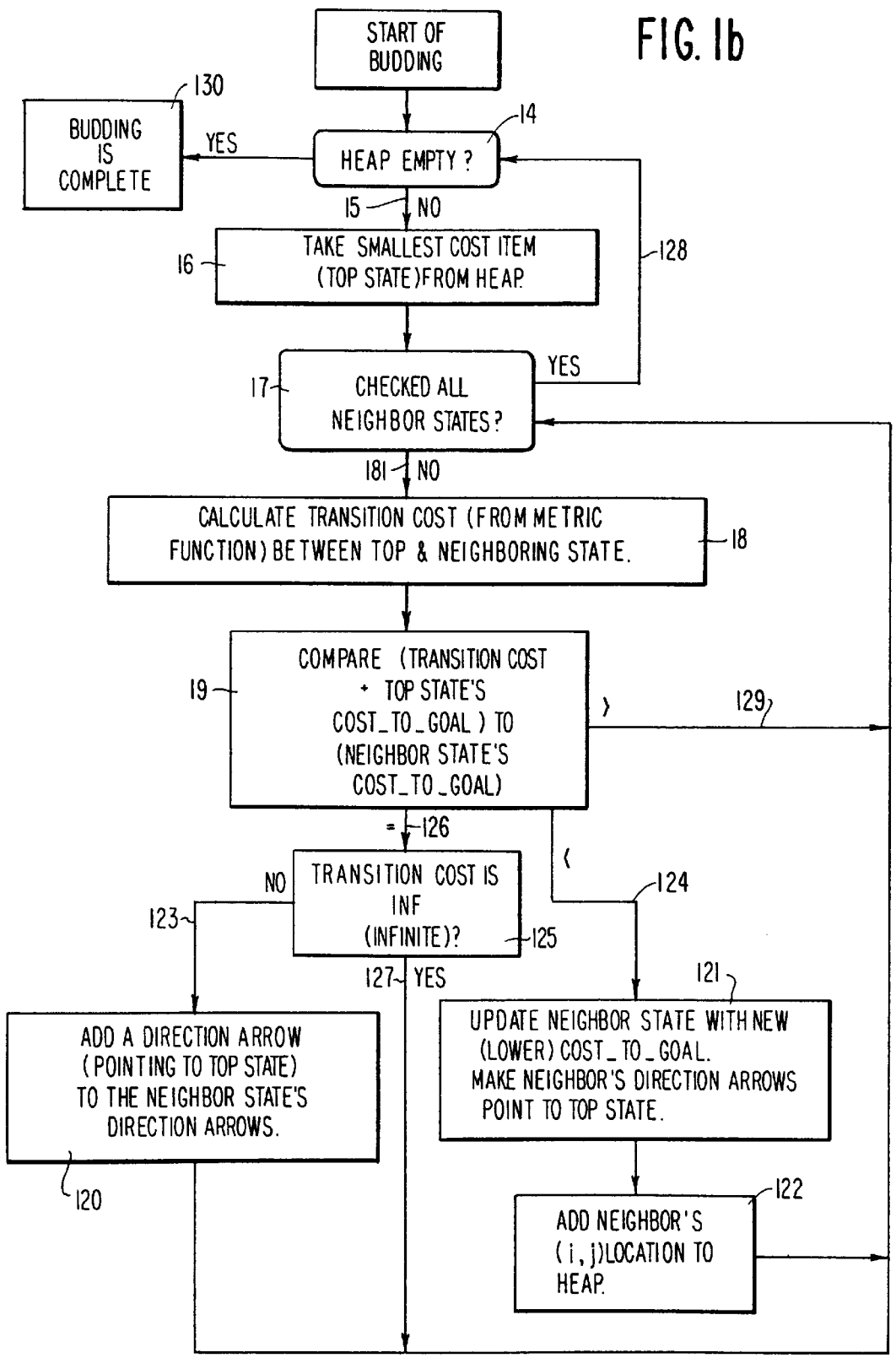

The method described in the flowchart of FIGS. 1a and 1b is applicable to a large number of different situations.

Although the path planning problem given is that of moving from a starting position to a goal position, the solution is actually found by propagating cost waves starting at the goal toward the start. The transition cost for moving from state "a" to a state "b" calculated during "budding" represents the cost that will be incurred while following the path states through b to a.

"Propagating cost waves", here, is treating layer after layer of unprocessed states. If a queue is used to schedule budding, unprocessed states are treated first in, first out. If a heap is used, then the lowest cost node will always be budded first.

Cost criteria can be selected according to the needs of a particular application, for instance: minimizing time, minimizing distance travelled, minimizing joint movement. The transition cost of movement is not symmetric. A transition from state A to state B may be more expensive than a transition from state B to state A.

The metric for transition costs between states of the configuration space is different from the cost criterion of movement in the task space, because cost waves are propagated from goal state to start state, in other words the transition costs are associated with transitions in configuration space.

When cost of movement varies depending on location in configuration space a "space-variant metric" is required.

FIG. 1b expands box 154 of FIG. 1a.

In box 150 of FIG. 1a, uncosted values U are assigned to the cost_to_goal field of each configuration state, and all the direction_arrows fields are cleared.

In box 152 infinite values INF are set in the cost_to_goal field of configuration states which represent obstacles. In addition, the boundaries of the task space are obstacles.

Box 153 assigns zero 0 to the cost_to_goal fields of the configuration states which represent goals. There may be one or many goals. Also in box 153, the indices of the goals are added to a heap. Standard methods of heap maintenance are employed for addition and removal of states to/from the heap. As a result, the state with the lowest cost will always be the top state of the heap.

Box 14 of FIG. 1b checks to see if the heap is empty. If the heap is empty, the algorithm takes the NO branch 15 to box 16. Box 16 takes the smallest cost item from the heap (top state), using a standard heap deletion operation.

Box 17 tests whether all the neighboring states have been checked. Neighbor states are those states which are immediately adjacent to the top state. If the neighboring states have not been checked, the method takes the NO branch 181 from box 17.

In box 18 the transition cost between the top state and its neighboring states is calculated using the metric function. Transitions to obstacle states can be represented as "INF". Box 18 calculates each transition cost one at a time as part of the loop which includes boxes 17, 18, 19, 120, 121, 122, and 125.

Box 19 compares the sum of the transition cost and the contents of the cost_to_goal field of the top state with the contents of the cost_to_goal field of a current neighboring state. If a state is in its initialized condition, the contents of the cost_to_goal field will be U, uncosted. One way to implement "U" is to assign to the cost_to_goal field a value which exceeds the largest possible value for the configuration space, other than INF. If the comparison in Box 19 gives a comparison result of "<", the method takes branch 124 to box 121. Following branch 124 will be referred to herein as "improving" a state.

In box 121 the cost_to_goal field of the neighbor state is updated with the new (lower) cost_to_goal, i.e. the sum of the transition cost and the contents of the cost_to_goal field. In addition, box 121 adds an arrow pointing to the top state in the direction_arrows field of the neighboring state.

In box 122, which follows box 121, the indices (i,j) of the neighboring state are added to the heap.

The method now returns control to box 17. This return results in a loop. The method executes boxes 17, 18, 19, 121, and 122 for each of the neighboring states, other than an obstacle. For an obstacle, the method takes branch 126 to box 125. Since the transition cost is infinite, branch 127 is taken from box 125 to return control to box 17.

The above-described process of: exploring all of the neighbors of a first state; assigning appropriate costs and direction arrows to neighbors; and adding 'improved' neighboring states to the heap, is referred to herein as "budding" a state.

After budding the current top state, all neighbor states have been checked, so the 'yes' branch 128 is taken from box 17. If the heap is not empty at box 14, branch 15 is taken.

In box 16, the next top state is retrieved. This is the smallest cost item which is on top of the heap.

If no impact can be made to any neighbor of a top state, no changes are made to the configuration space during that iteration. If the sum of the transition cost to a current neighbor state and the top state's cost_to_goal is greater than the neighbor's preexisting cost_to_goal, branch 124 is not taken. No improvement can be made. Branch 129 is taken instead, returning control to box 17. Taking branch 129 is referred to herein as "not impacting" another state.

It is possible that box 19 can reveal more than one equivalent path from a current neighbor state, which corresponds to branch 123. In box 120, an "alternative arrow" is added to a neighbor, but not to the heap, when an equivalent path is found. The direction_arrows field can contain more than one arrow as illustrated in 204 of FIG. 2.

Once the heap is empty, branch 130 is taken and budding is completed.

Once the budding of all the states of the configuration space is finished, a path can be followed from any starting position to the goal by simply following the direction_arrows values. The cost in each configuration state gives the total cost required to reach the goal from that state.

Situations may occur where transformed obstacles may completely separate the start state from the goal state. In such situations, when budding has completed, there will be no arrows at the starting state. This indicates that there is no path to the goal from this starting state.

One skilled in the art might devise a number of ways of determining which regions in configuration space correspond to an obstacle in task space. One simple way of making this determination, is to simulate each state of the configuration space one by one in task space and test whether each state corresponds to hitting the obstacle. Standard solid-modelling algorithms may be used to determine whether the object for which a path is planned hits the obstacle in task space. One such set of algorithms is implemented by representing surfaces using the B-rep technique in the Silma package sold by SILMA, 211 Grant Road, Los Altos, Calif. 94022.

Sometimes a configuration space will be periodic. For instance, when the object for which a path is planned is a robot, the axes of the configuration space may be the joint angles of the robot. In this case the configuration space will be topologically equivalent to a torus, and paths may wrap around its edges.

States with equal cost_to_goal are located on what appear to be equal cost wave fronts flowing out from the goal. For this reason, in the art the term "propagating cost waves" has been used to describe the process of assigning direction arrows to states in configuration space. However, the prior art did not use budding to propagate cost waves, but instead produced a cost field by scanning the configuration space from top to bottom and then from bottom to top until the states stabilized.

An efficiency technique that can be used with budding is "early path detection". The early path detection feature makes use of the fact that as soon as the cost waves have been propagated just beyond the starting state, the optimal path can be reported, since no further budding changes will affect the region between the start and goal.

Figure 3:
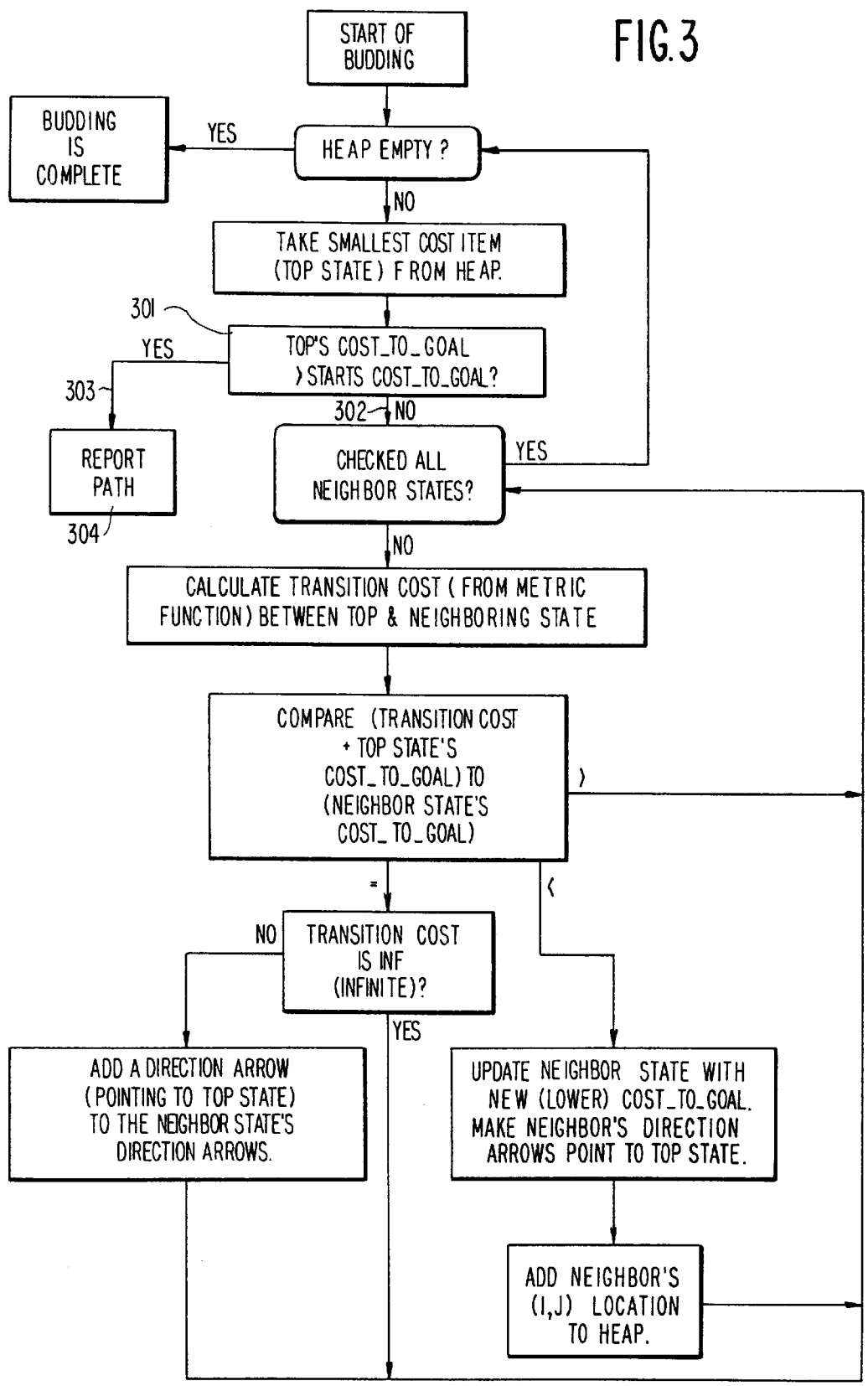
FIG. 3 is a flow chart of an alternate embodiment of the method of path planning called "budding".

FIG. 3 shows the additional steps necessary for early path detection. FIG. 3 is the same as FIG. 1b, except that several steps have been added. In box 301, the method tests whether the value of the cost_to_goal field of the state at the top of the heap is greater than the cost_to_goal field of the start state. If the result of the test of box 301 is negative, budding continues as usual, along branch 302. If the result of the test of box 301 is positive, the method follows branch 303 to box 304 where the path is reported. After the path is reported at box 304, normal budding continues. It is possible to stop after this early path detection if the entire cost field is not needed. This kind of early path detection is not possible if a queue structure is used during budding, instead of heap because using a queue structure the shortest path cannot be determined until the entire configuration space is budded.

Another efficiency technique is to begin budding from both the goal and the start states. The path then is found when the expanding cost waves meet. Usually, a different metric must be used for budding the start state from that which is used for budding the goal states. This results from the fact that budding out from the start state would be in the actual direction of motion in the task space which is essentially calling the same metric function with the top and neighbor states swapped. By contrast, budding from the goal states is in a direction opposite to motion in the task space.

C. Overview of Differential Budding

Figure 4:
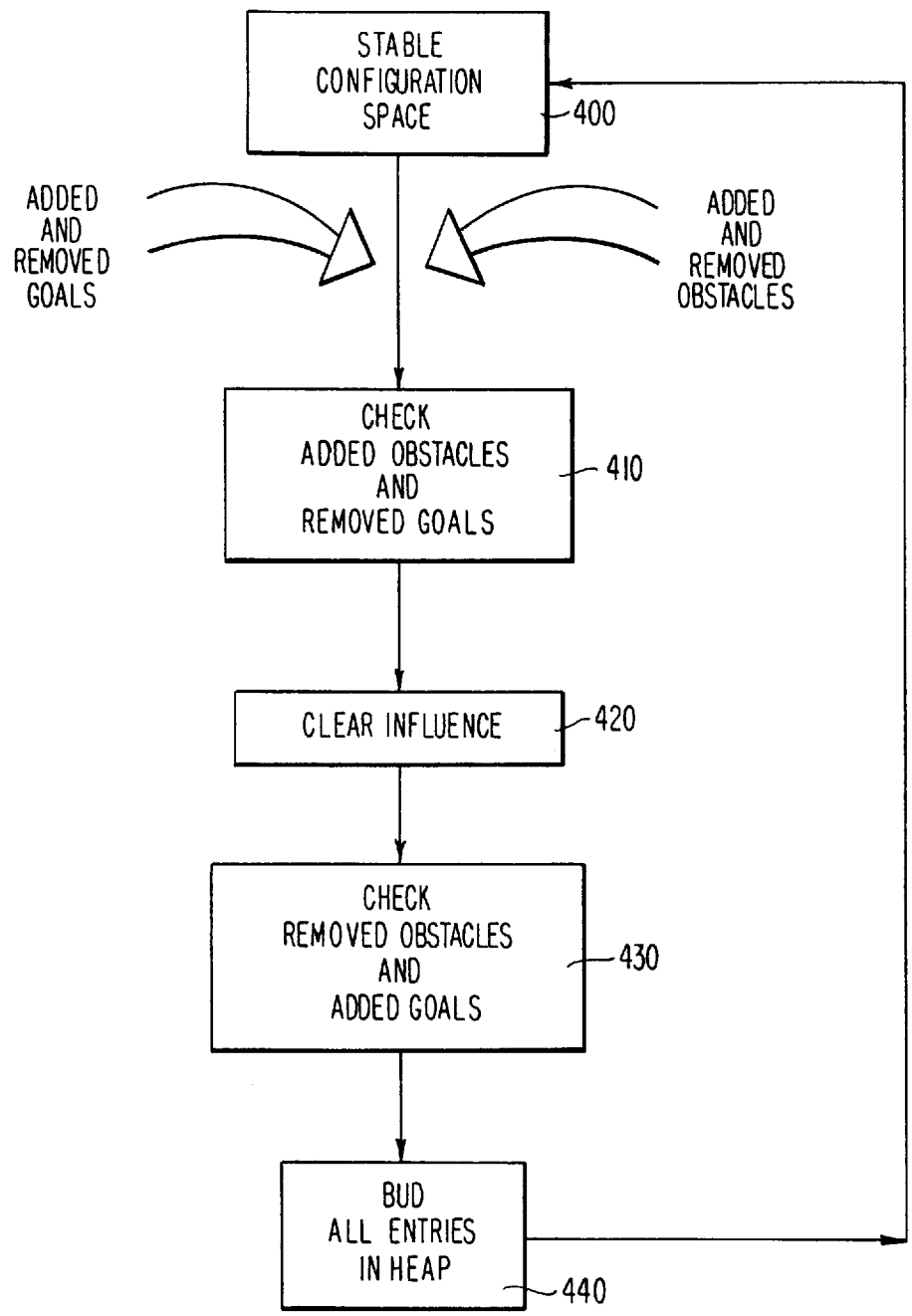
FIG. 4 is a summary flow chart of the differential budding method.

FIG. 4 gives a general overview of steps used in "differential budding", a method for regenerating a configuration space with changes in obstacles and goals. The resulting configuration space provides information necessary to generate a series of set points to be followed for an optimal path.

In box 400, a configuration space filled with direction arrows and costs_to_goal is assumed. Information about changed goal and obstacle states is also assumed to be provided. These states are already transformed from task space to configuration space. It should be noted that the method will work if the configuration space is merely initialized, with UNCOSTED in each cost_to_goal, and no direction arrows.

In box 410, information about newly added obstacle states and newly removed goal states is used to initialize the corresponding states in configuration space.

In box 420, all states 'influenced' by the added obstacle and removed goal states are initialized to have UNCOSTED values and no direction arrows. 'Influenced' neighbors are those that are on paths that point to or through these added obstacle or removed goal states. The 'perimeter' of states around this region is obtained and added to the heap for later 'budding'.

In box 430, information about newly removed obstacle states and newly added goal states is used to initialize the corresponding states in configuration space. The heap is set up so that 'budding' can take place.

In box 440, the states on the heap accumulated as a result of boxes 410, 420, and 430 are 'budded' resulting in a stable (valid) configuration space. Given a starting state, an optimal path of set points can be read out by following the direction arrows in configuration space to the goal state.

Two special structures are used for efficiency: a sifting and a sifting array. The 'sifting heap' is a regular heap except that it keeps at most one copy of a tuple (state) in the heap even though many requests to add extra copies may be made. Whenever the word "heap" is used herein, a "sifting heap" is intended. The 'sifting array' (used to store unique states of the perimeter) is similarly a regular array except that it keeps at most one copy of a tuple (state). Some of the arrays referred to herein are sifting and some are not. In both cases, sifting is achieved by maintaining flags in each state of the configuration space that report if a state is in the heap or in the perimeter array. Then all that is needed when adding or removing states from the heap or perimeter is to modify these flags correctly.

Figure 5:
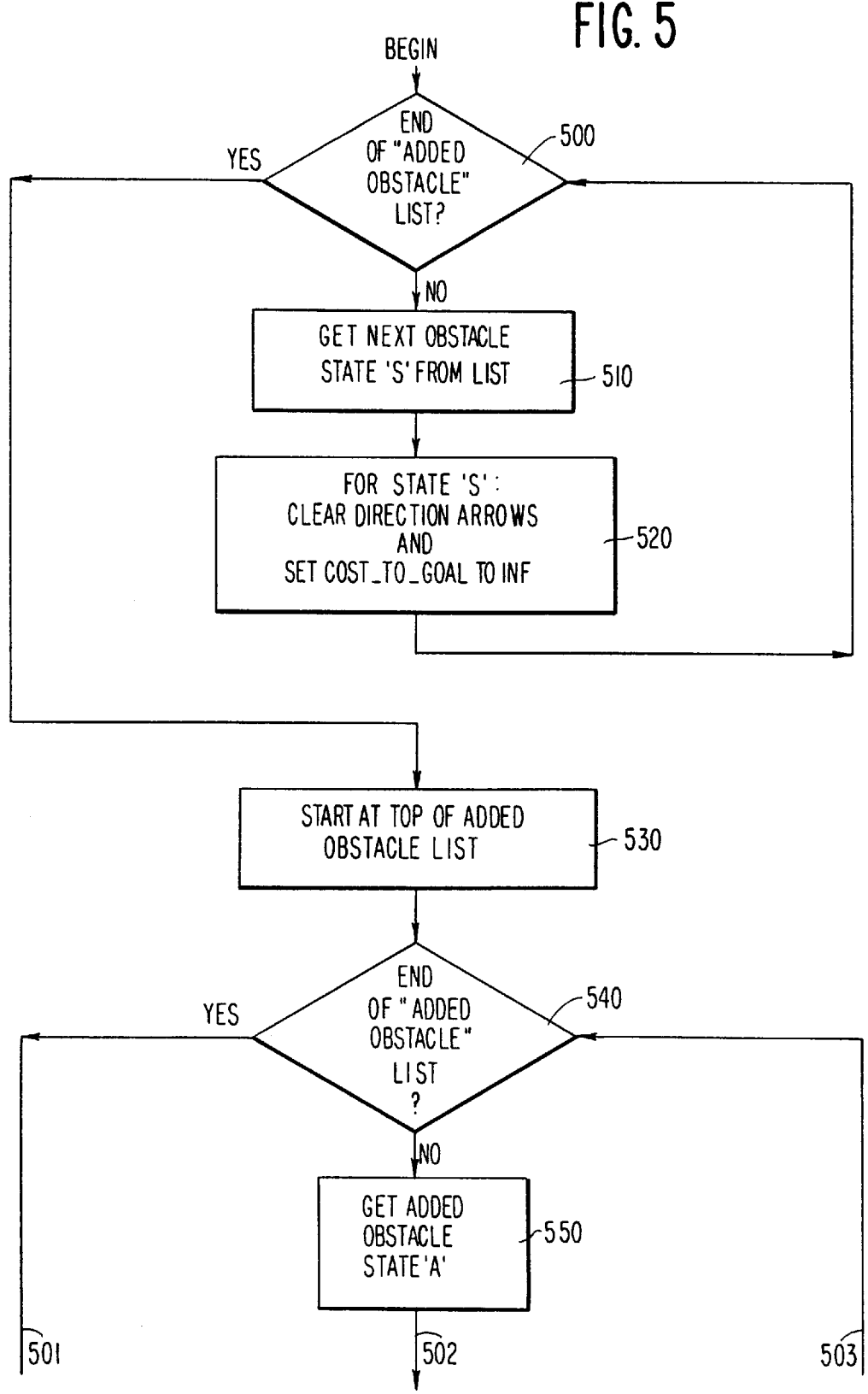
FIGS. 5 and 6 are flow charts giving more details of box 110 of FIG. 4.
Figure 6:
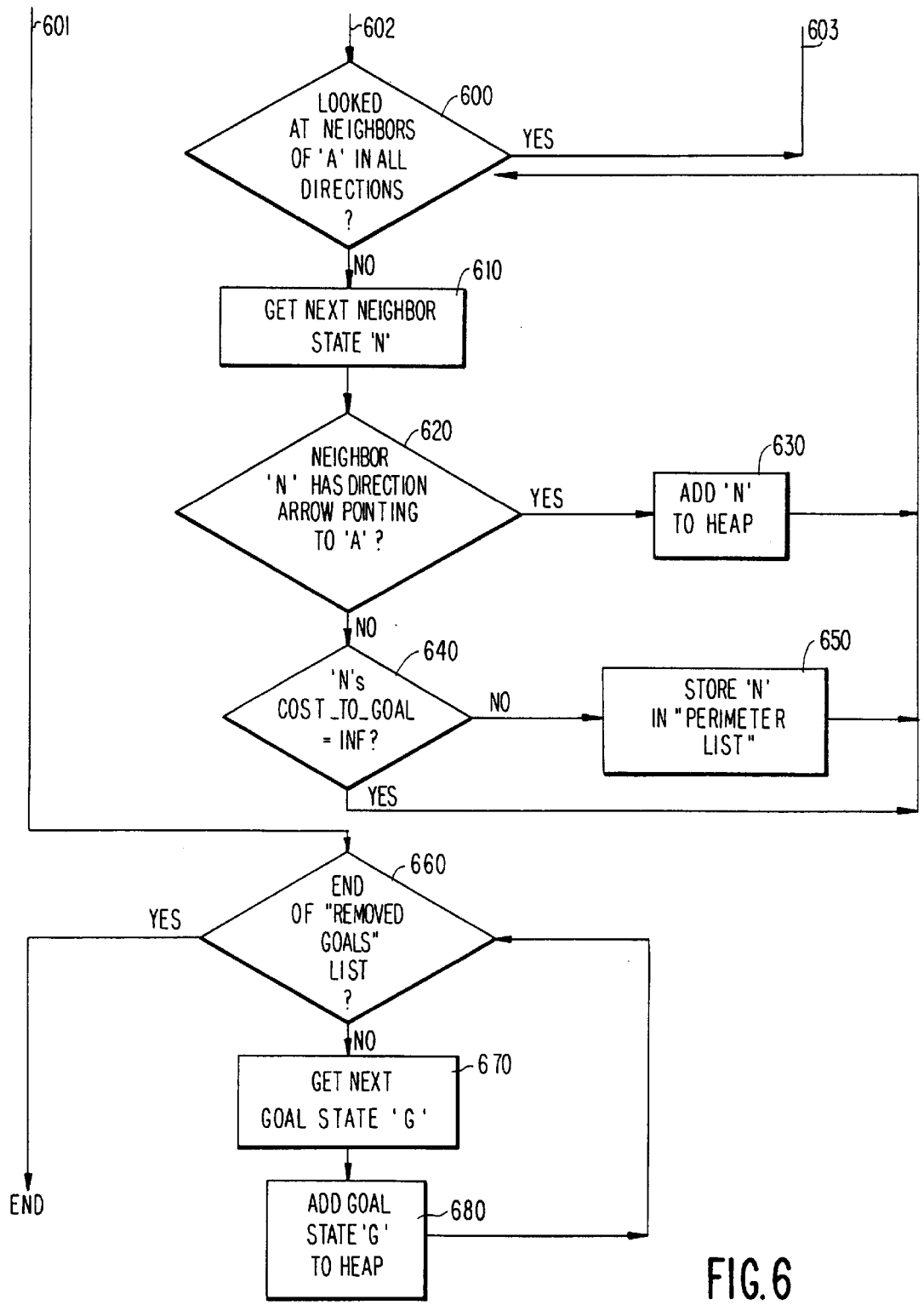

The method in box 410 is detailed by the flowchart of FIG. 5 and FIG. 6. The method of box 420 is detailed by the flowchart in FIG. 7 and FIG. 8. The method of box 430 is detailed by the flowchart of FIG. 9 and FIG. 10.

i. Check added obstacles and removed goals.

The 'check added obstacles and removed goals' method of box 410 includes three main parts.

The first part is shown in boxes 500, 510, and 520. Box 500 tests whether the end of the "added obstacle" list has been reached. If the result of the test in box 500 is "Yes", control passes to box 530. If the result of the test in box 500 is "No", control passes to box 510. Box 510 gets the next obstacle state 'S' from the added obstacle list. Box 520 then clears the direction_arrows field and sets the cost_to_goal field to INF in the state 'S'. After box 520, control is returned to box 500.

Boxes 500, 510, and 520 thus constitute a loop which initializes each 'added obstacle' state ('S') in configuration space to have no direction arrows and an INF (INFINITE) cost_to_goal.

The second part of the "check added obstacles and removed goals" method of box 410 is shown in boxes 530, 540 and 550 of FIG. 5, and boxes 600, 610, 620, 630, 640, and 650 of FIG. 6. It should also be noted that line 501 of FIG. 5 connects to line 601 of FIG. 6; line 502 of FIG. 5 connects to line 602 of FIG. 6; and line 503 of FIG. 5 connects to line 603 of FIG. 6.

In this second part of box 410, the 'front edge' of the obstacle and the 'back edge' of the added obstacle are obtained. The 'front edge' contains those neighbor states that are on the 'goal side' of the added obstacle. These states are neighbors of the obstacle region, have cost values other than INFINITY or UNCOSTED, and are not pointing toward any of the obstacle states. The 'back edge' contains those neighbor states that are not on the front edge. These states have direction arrows that point into the added obstacle.

Box 540 signifies a test for the end of the "added obstacle" list. If the end has been reached, control passes via line 501/601 to box 660. If the end has not been reached, control passes to box 550, where an added obstacle 'A' is retrieved.

Then at box 600, it is determined whether all of the neighbor states 'N' of the obstacle state 'A' have been considered. If all of the neighbor states 'N' have been considered, control returns via line 603/503 to box 540. If a neighbor state 'N' has not been considered, control passes to box 610, where that state 'N' is retrieved.

Box 620 indicates a test of whether the state 'N' contains a direction arrow that points to 'A'. If state 'N' does not contain such a direction arrow, control passes to box 640. If state 'N' does contain such a direction arrow, the state 'N' is added to the heap at box 630. If the state 'N' is added to the heap at box 630, 'N' is considered to be part of the 'back edge' of the added obstacle. After box 630, control returns to box 600.

In box 640, 'N' is tested for whether its cost_to_goal field contains INF. If 'N' does have a cost_to_goal of INF, control is returned to box 600. If 'N' has a cost_to_goal other than INF, it is added to the 'perimeter list' at box 650, and is considered part of the 'front edge' of the obstacle.

The third part of the "check added obstacles and removed goals" method of box 410 is shown in boxes 660, 670 and 680 of FIG. 3. These three boxes form a loop. In box 660, it is determined whether the end of the "removed goals" list has been reached. If the end has been reached, the "check added obstacles and removed goals" method is complete. If the end has not been reached, the next goal state 'G' is retrieved at box 670. This goal state 'G' is then added to the heap at box 680 and control is returned to box 660. Thus, in this loop, each of the removed goal states in the 'removed goal list' is added to the heap.

ii. Clear influence.

The 'clear influence' method of box 420 includes two main parts. The first part determines the 'perimeter of influence' due to the newly added obstacle and removed goal states, and the second part takes the perimeter and puts it into the heap.

Figure 7:
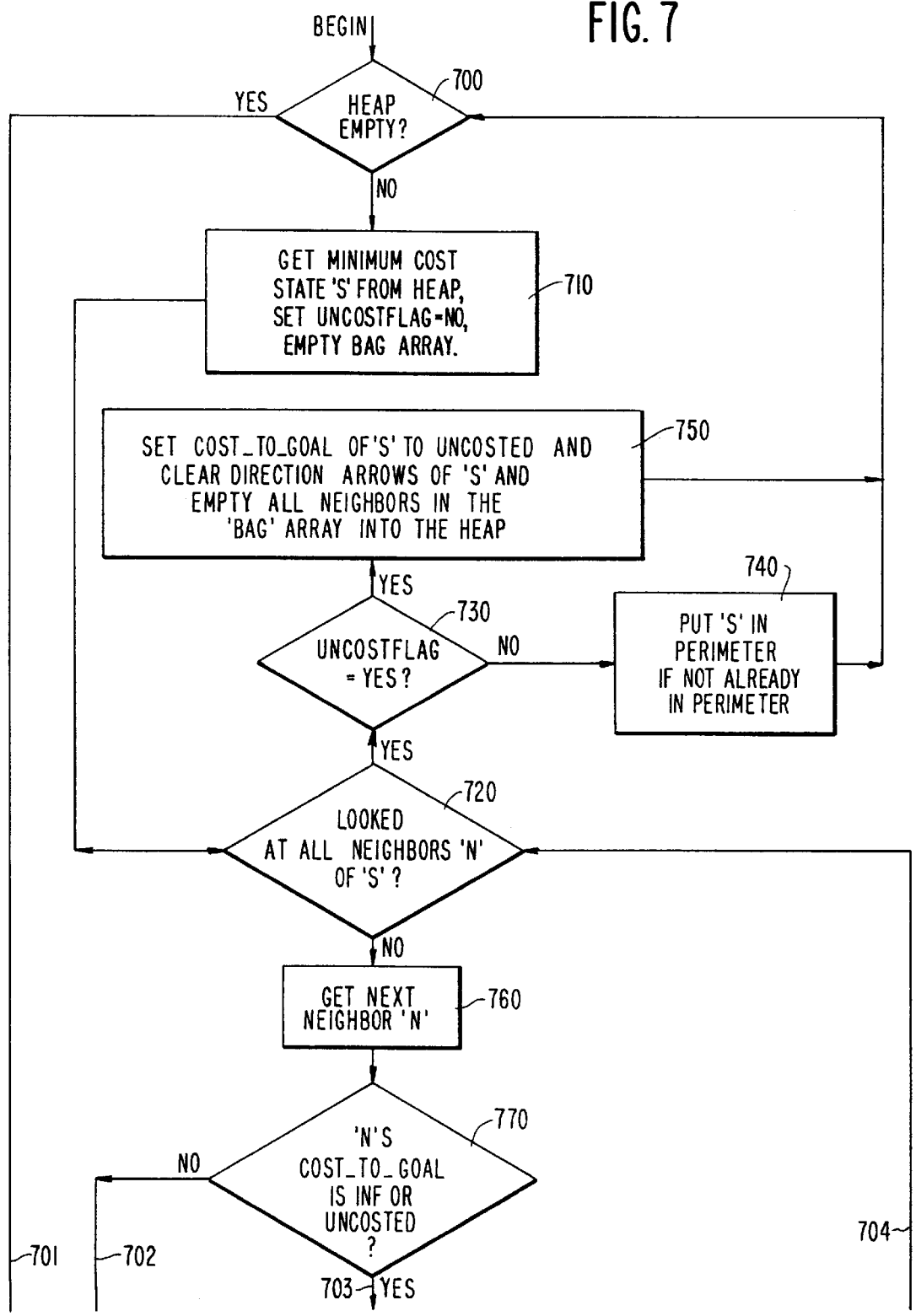
FIGS. 7 and 8 are flow charts giving more details of box 120 of FIG. 4.
Figure 8:
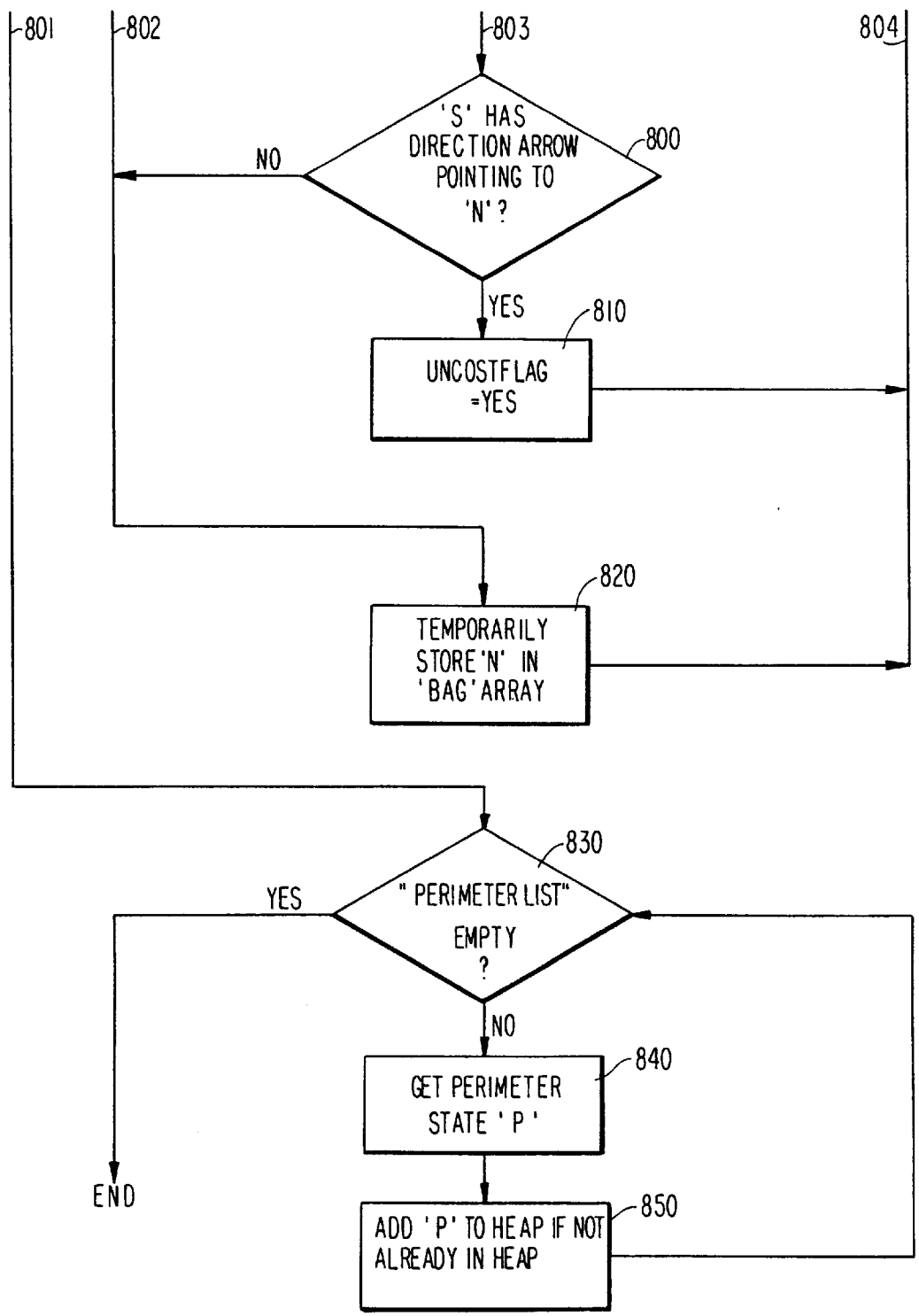

The first part of the "clear influence" method of box 420 is shown in boxes 700, 710 720, 730, 740, 750, 760 and 770 of FIG. 7, and boxes 800, 810 and 820 of FIG. 8. It should be noted that line 701 of FIG. 7 connects to line 801 of FIG. 8, line 702 of FIG. 7 connects to line 802 of FIG. 8, line 703 of FIG. 7 connects to line 803 of FIG. 8, and line 704 of FIG. 7 connects to line 804 of FIG. 8.

At the beginning of the 'clear influence' method, the heap consists of neighbor states at the back edge of any added obstacles and any removed goal states. At box 700, the heap is tested to see if it is empty. If the heap is empty control passes via line 701/801 to box 830.

If the heap is not empty, then, at box 710, a minimum cost state 'S' is retrieved from the heap and and a variable, uncostflag, corresponding to 'S' is set to "NO". At box 720, it is then determined whether all neighbors, 'N', of 'S' have been considered. If all the neighbors have been considered, control passes to box 760.

If all of the neighbors have not been considered, the variable uncostflag is tested at box 730. If uncostflag has a value "No" then, at box 740, 'S' is added to the perimeter, if 'S' has not already been added to the perimeter. If uncostflag has a value "Yes", then, at box 750, the cost_to_goal field of 'S' is set to UNCOSTED; the direction_arrows field of 'S' is cleared; and all neighbors from the 'Bag' array are emptied into the heap which sifts them, i.e. it does not store any duplicate states.

At box 760 a next neighbor 'N' is retrieved. At box 770 the cost_to_goal field of 'N' is tested to see if it is either INF or UNCOSTED. If it is neither, control passes via line 702/802 to Lox 820. If it is either INF or uncosted, control passes via line 403/503 to box 500.

At box 800, 'S' is checked to see if it has a direction arrow painting to 'N'. If not, control passes to box 820. If so, the uncostflag associated with 'S' is set to "YES".

In box 820 the neighbor 'N' is temporarily stored in the Bag array. Control then returns via line 804/704 to box 720.

Thus, during the first part of the "clear influence" method of box 420, each state 'S' in the heap, that points to any neighbor 'N' that has a cost_to_goal that is either INFINITE or UNCOSTED is identified. Such a state 'S' must therefore have been 'connected' via direction arrows to the back of a new obstacle state or to a removed goal state. Any neighbor that is not INFINITE or UNCOSTED is a candidate for expanding the search and is temporarily stored in the 'Bag'. The 'Bag' is a standard array containing states. After all neighbors of 'S' are examined, if 'S' is connected, then all neighbors of 'S' that are in the 'Bag' are added ("emptied") to the heap, which sifts them, and 'S' is reinitialized to have cost_to_goal of UNCOSTED and no direction arrows. If 'S' is not connected, 'No' branch from box 730, then 'S' must be a member of the 'perimeter' and the neighbors that are in the 'Bag' are NOT added to the heap.

The second part of the "clear influence" method of box 420 is shown in boxes 830, 840, and 850 of FIG. 8. At box 830, the perimeter list, stored in a sifting array, is checked to see if it is empty. If so, the clear influence method ends. If not, a perimeter state 'P' is retrieved 840 and added 850 to the heap, if not already in the heap. After box 850, control is returned to box 830. This second part of box 420 thus reads the states in the "perimeter list" and stores them in the heap.

Thus the perimeter list can be said to surround an influenced or "affected region" of the configuration space, and this terminology has been used herein. The term "influenced" is used herein particularly to refer to the "clear influence" step 420 and is distinguished from the term affected, which is used more broadly as explained below. However, this terminology is not meant to imply that the surrounded region is contains the only states which may be changed as a result of differential budding. States on or outside the perimeter may have their cost_to_goal or direction_arrows values changed as a result of budding the heap in box 440 of FIG. 4.

iii. Check removed obstacles and added goals.

The 'check removed obstacles and added goals' method of box 430 has three main parts.

The first part is shown in boxes 900, 910 and 920. At box 900, it is determined whether the end of the 'removed obstacle' list has been reached. If the end has been reached, control passes to box 930. If the end has not been reached, a next obstacle state, 'S', is retrieved from the list at box 910. In this state, 'S', the direction_arrows field is cleared and the cost_to_goal field is set to UNCOSTED. This first part is, then, a loop which initializes each 'removed obstacle' state in configuration space to have no direction arrows and an UNCOSTED cost_to_goal. These are appropriate values, since these now unoccupied (removed) obstacle states have no presumed costs or arrows. These removed obstacle states can be said to be the region affected by the obstacle removal, and this terminology is used herein. However, it should be noted that states outside this "affected region" may still have their cost_to_goal and direction_arrows values changed as a result of budding in box 440. The states surrounding the removed obstacle can be said to be the perimeter, but they require a less sophisticated treatment than the perimeter of the removed goals and added obstacles.

Figure 9:
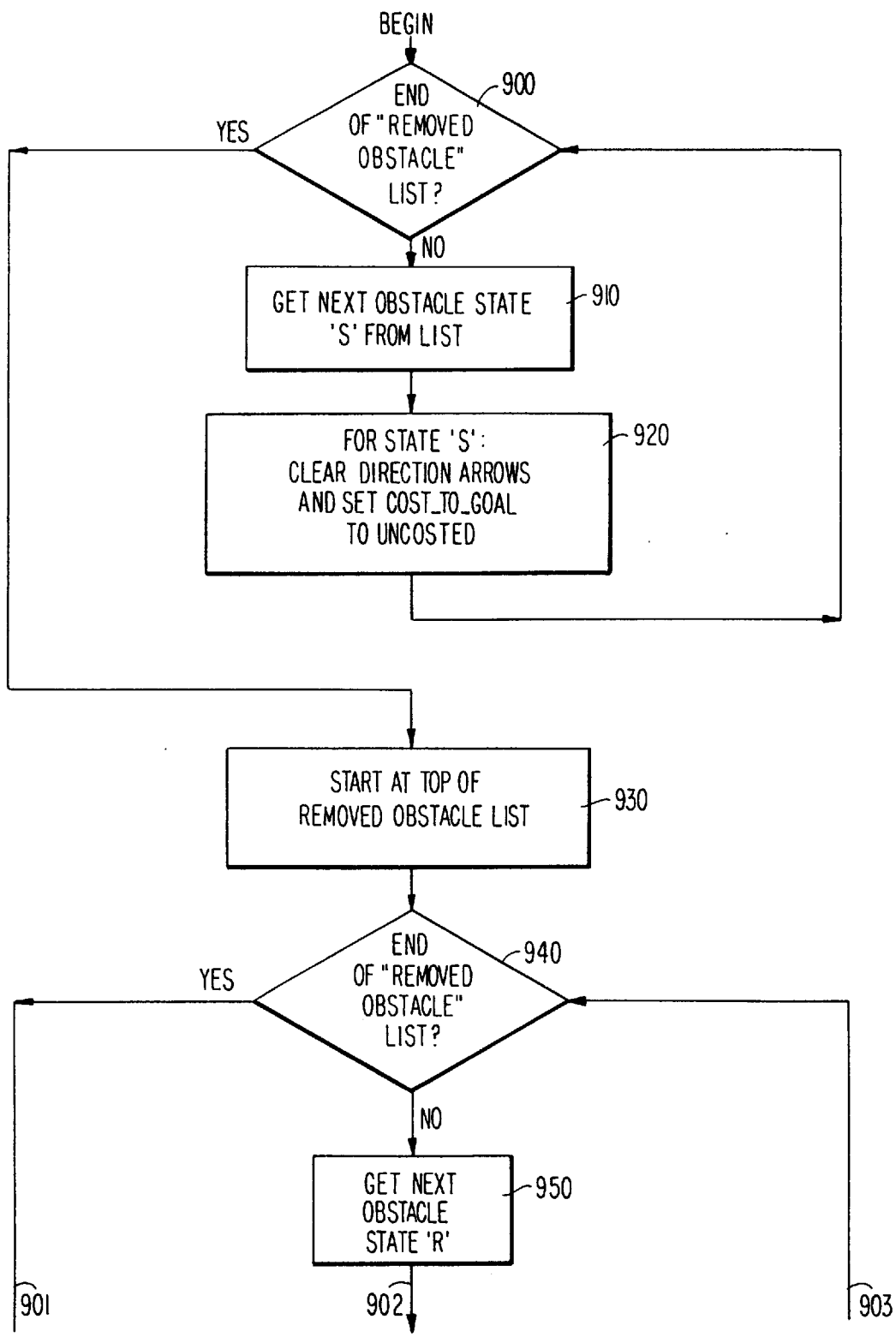
FIGS. 9 and 10 are flow charts giving more details of box 130 of FIG. 4.
Figure 10:
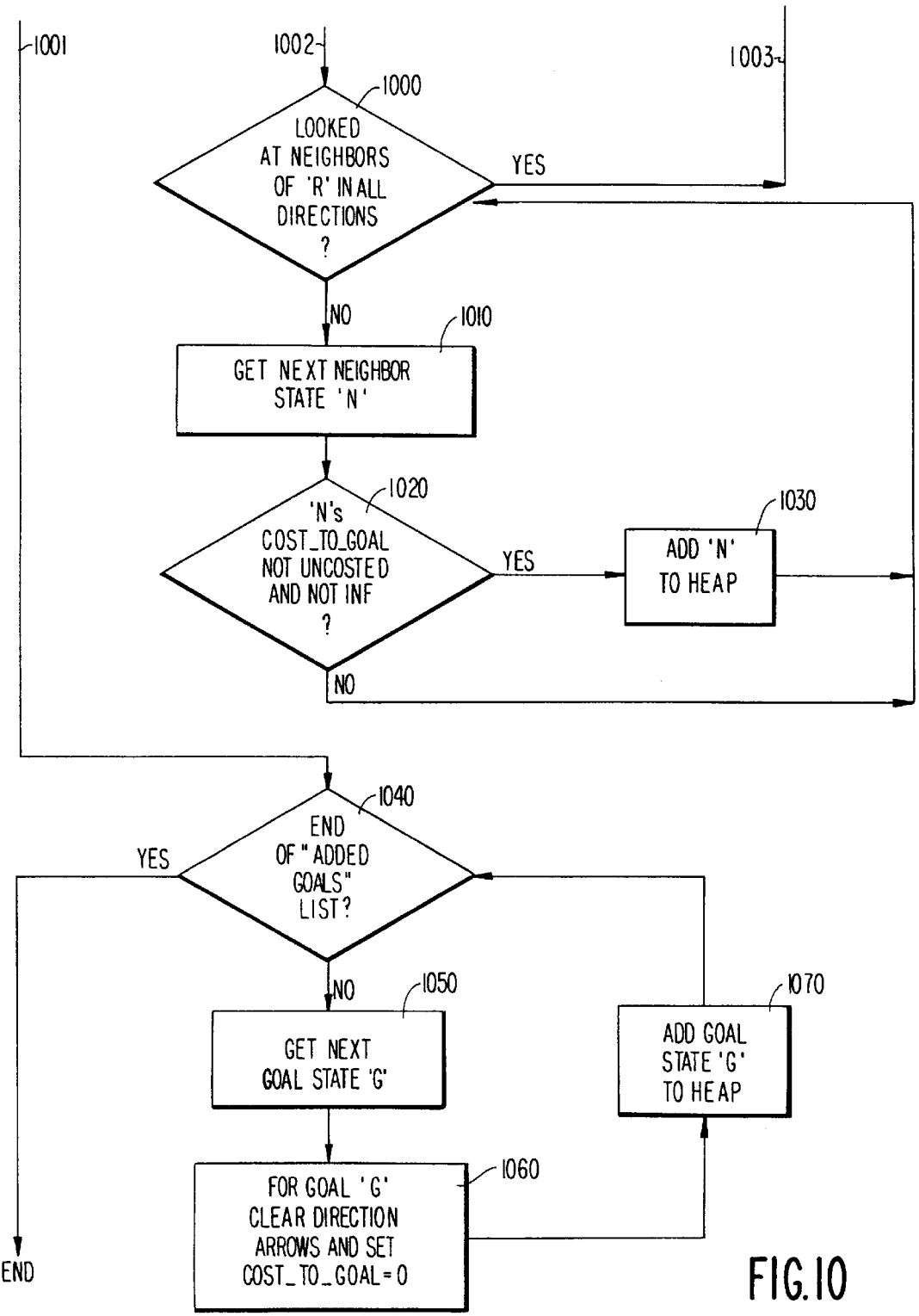

The second part of box 430 is shown in boxes 930, 940 and 950 of FIG. 9 and boxes 1000, 1010, 1020, and 1030 of FIG. 10. Line 901 of FIG. 9 connects to line 1001 of FIG. 10, line 902 of FIG. 9 connects to line 1002 of FIG. 10, and line 903 of FIG. 9 connects to line 1003 of FIG. 10.

This second part of box 430 starts at the top of the removed obstacle list, at 930. A test is performed at 940, as in box 900, to determine whether the end of the "removed obstacle" list has been reached. If the end has been reached, control passes via line 901/1001 to box 1040. If the end has not been reached, a next obstacle state 'R' is retrieved at 950. Then, in box 1000, it is determined whether all neighbors of 'R' have been considered. If so, control is passed via line 1003/903 to box 940. If not, a next neighbor state 'N' of 'R' is retrieved at 1010. If 'N' has a cost_to_goal field which has a value of UNCOSTED or INF, then control is returned to box 1000. If 'N' has a cost_to_goal field which is not UNCOSTED and not INF, then 'N' is added to the heap at 1030.

Thus, in this second part of box 430, all neighbors of a removed obstacle state that have a cost_to_goal other than 'INFINITY' or 'UNCOSTED' are added to the heap, which sifts them. These states together form an edge that is adjacent to the removed obstacle. These neighboring states will help (via the 'budding' mechanism of box 440) to fill in the vacated area where the 'removed obstacle' states reside.

The third part of box 430 is shown in boxes 1040, 1050, 1060, and 1070 of FIG. 10. At box 1040, a test is performed to determine if the end of the "added goals" list has been reached. If the end has been reached, the 'check removed obstacles and added goals' method terminates. If the end has not been reached, a next goal state 'G' is retrieved at 1050. At 1060, for the goal 'G', the direction_arrows field is cleared and the cost_to_goal field is set to zero. Then, at 1070, the goal 'G' is added to the heap and control is returned to box 1040.

Thus, this third part of box 430 is a loop which takes each newly added goal state from the "added goals" list, clears the direction arrows, sets the cost_to_goal to zero, and adds each goal state to the heap. Thus the added goal states are both the "affected region" and the perimeter as that terminology is used herein. However, it should be noted that states outside this "affected region" may still have their cost_to_goal and direction_arrows values changed as a result of budding in box 440.

In summary, then, the "affected region" as that term is used herein means states that have been cleared as part of the clear influence step 420, and states corresponding to removed obstacles and added goal states which are "influenced" are the ones cleared during the clear influence step 420.

Differential budding can also handle the situation where some new information is discovered while an object is already moving on a prescribed path. This arises when the object does not have a vision sensor, or has a faulty one, but does have a proximity or tactile sensor of some kind, or when discretization of the configuration space leads to some errors in motion which must be corrected along the way. This can also arise where stored information becomes out of date. In many cases an object may be able to learn about an environment simply by moving around, acquiring information about new obstacles or goals or removed obstacles or goals as it encounters them, and incorporating this knowledge into its configuration space. The object can also adapt to a changing environment even if the vision sensors are not perfect. In such cases new information can be regarded as added or removed obstacles or goals. New obstacles can be detected by encountering different parts of the obstacle while following iteratively developed new paths.

Figure 11:
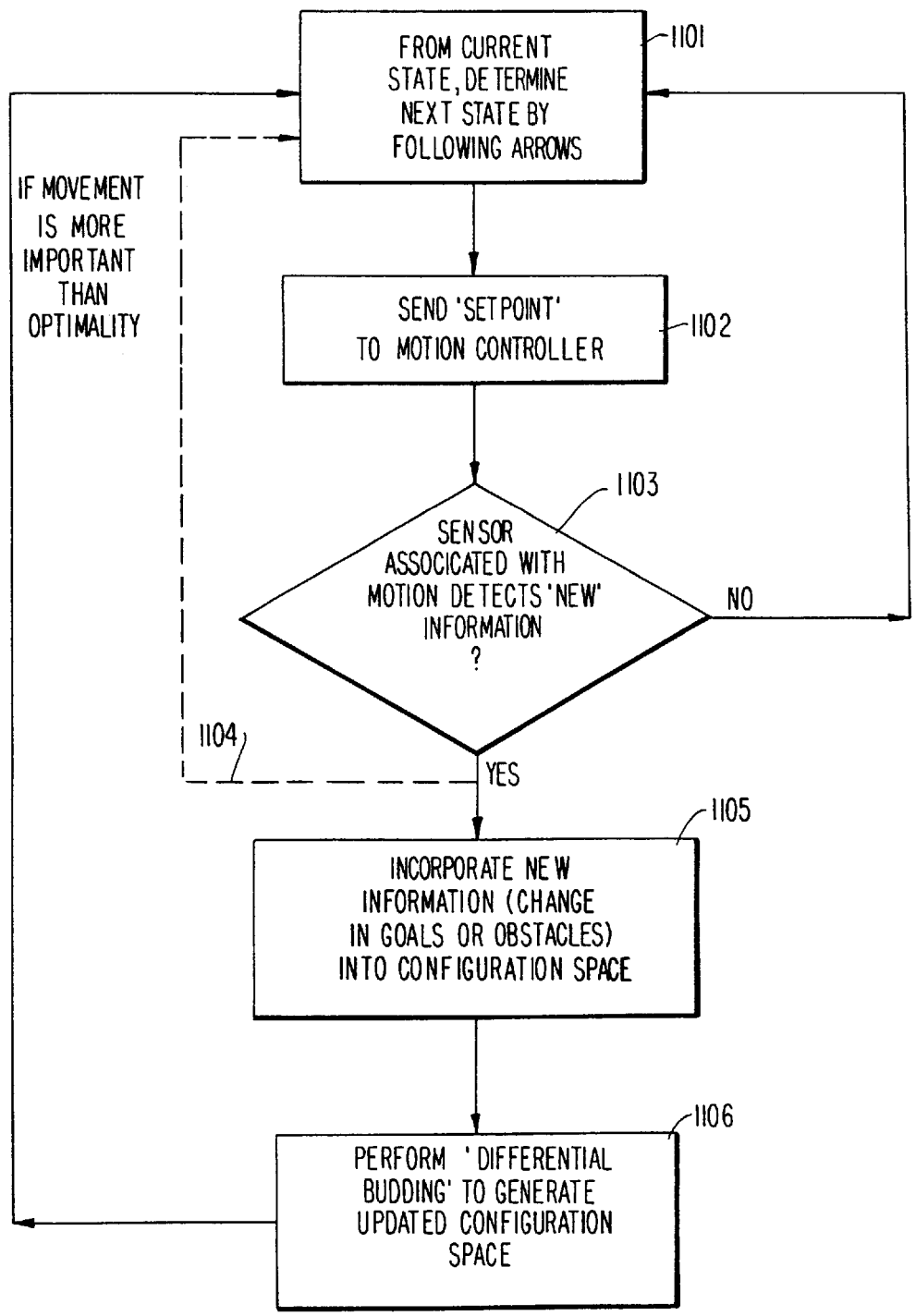
FIG. 11 shows a flow chart for dealing with phantom changes in conditions.

FIG. 11 is a flow chart which summarizes the iterative approach to dealing with unsensed or partially sensed changes in conditions.

In box 1101 the method determines a next state in a precalculated path, by following direction_arrow values from a current states.

In box 1102 the method sends a set point to a motion controller for the robot, based on the next state.

At box 1103 a test is performed to determine whether a sensor associated with the motion to the next state has detected new information. If no new information is detected, control returns to box 1101.

If new information is detected there are two options. If the new information is not an absolute obstacle to movement, control may optionally return via the dotted line 1104 to box 1101. The dotted line 1104 represents a situation in which movement is chosen over calculation of a new optimum path. The dotted line 1104 is chosen, in other words, when movement is more important than strict optimality.

While the dotted line 1104 is taken, a processor could be incorporating new information into a configuration space while motion continues. Such parallel processing could be useful when the new information does not immediately affect the motion on the precalculated path. For instance, if the method is applied to control of emergency vehicles, an emergency vehicle might report a traffic blockage in a lane of opposing traffic. Such a report need not affect the progress of the emergency vehicle which reports the blockage. In this case of the emergency vehicle, the vision of the driver is the proximity sensor.

If the dotted line 1104 is not taken, and new information is sensed, control passes to box 1105. In box 1105, the new information is incorporated into configuration space. At 1106, differential budding occurs, for instance using boxes 410–440 of FIG. 4.

After 1106, control returns to box 1101.

D. Precedence of Search of Neighbors

Figure 16:
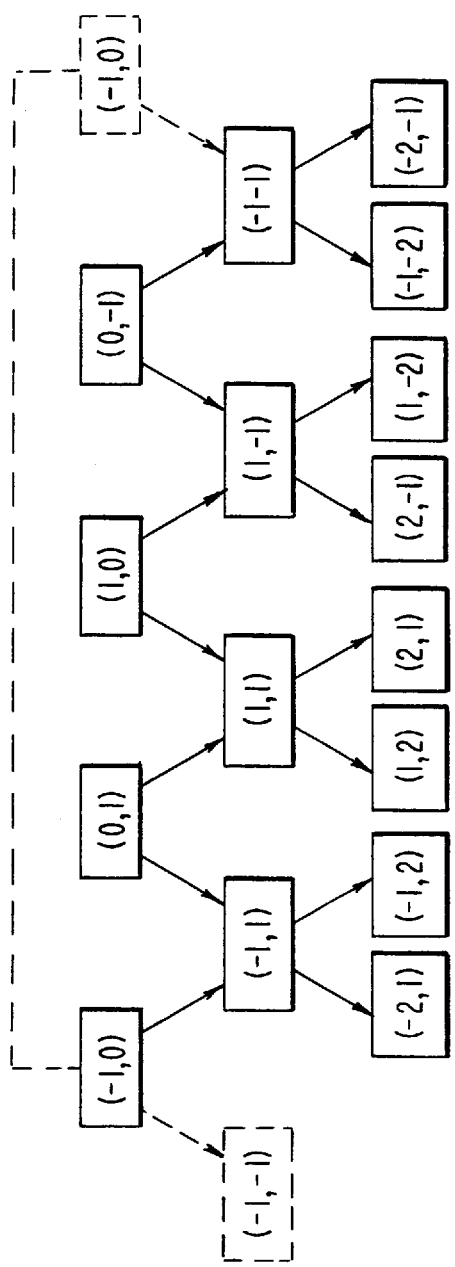
FIG. 16 is an illustration of the precedence of search of a given set of neighbors.

The search of the neighbors in box 17 must occur in a particular order as soon as there are more neighbors than the set {(1,0), (0,1), (−1,0), (0,−1)}. The search of box 17 should never allow searching a neighbor which is beyond a neighbor blocked by an obstacle. For instance, given the set of neighbors {(1,0), (0,1), (−1,0), (0,−1), (1,1), (1,−1), (−1,1), (−1,−1), (2,1), (1,2), (2,−1), (1,−2), (−2,1), (−1,2), (−2,−1), (−1,−2)}, the neighbor (1,1) should never be searched unless both (0,1) and (1,0) have been searched and are free of obstacles. If either (0,1) or (1,0) is blocked, it should be assumed that, (1,1), which is beyond both of them, cannot be reached safely. Similarly, (2,1) should not be searched unless (1,1) has been searched and is free of obstacles. Neighbor (0,1) does not have to be searched a second time in order to determine that it is safe to search neighbor (2,1), because (1,1) would not have been searched unless (0,1) was clear. Precedence of search is necessary to find safe paths through configuration space, but it also results in a benefit of making the search of box 17 more efficient, because not all neighbors will always be searched. FIG. 16 shows the precedence of search amongst the neighbors in the set {(1,0), (0,1), (−1,0), (0,−1), (1,1), (1,−1), (−1,1), (−1,−1), (2,1), (1,2), (2,−1), (1,−2), (−2,1), (−1,2), (−2,−1), (−1,−2)}. The dotted lines in FIG. 16 represent the fact that the picture wraps around at the ends, with (−1,0) able to appear at either end.

While this example gave a particular precedence for a particular application, those of ordinary skill in the art will be able to design other precedences which make sense for other applications.

Application of Budding and Differential Budding to Maneuvering a Vehicle

One possible application of budding and differential budding is maneuvering a robotic vehicle. The word "maneuver" is used herein to mean small movements, i.e. movements which have a size which is within approximately the same order of magnitude as the size of the robotic vehicle, as opposed to large movements, such as would be planned with an electronic map. A robotic vehicle may be maneuvered into, for example, a tight parking space, a three point turn, or an ordinary turn. Such maneuvers are often difficult for the operator of a robotic vehicle to plan because of imperfect knowledge of the size and maneuverability of the vehicle.

In what follows, an example of the application of budding and differential budding to maneuvering a robotic vehicle is given. The example is of an ordinary car with front wheel steering.

The car can be regarded as a robot with three degrees of freedom. Three parameters $(x,y,\phi)$ will be used herein as axes of a configuration space for the car, where x and y define a location of the car in Cartesian coordinates and $\phi$ represents its angle.

The "Cartesian point location" of the car (x,y) is taken to be at a point midway between its non-steering wheels. In most cars, this point is at the rear differential of the car, because in most cars steering is effected with the front wheels. This particular point is chosen because it leads to certain efficiencies of calculation, which will be described below. However, any point consistently related to the position of the car may be chosen.

In addition to having a point location, the car is assumed to be contained within a rectangle having a width and length. The rectangle is also assumed to have an angle relative to a fixed reference angle.

Figure 12:
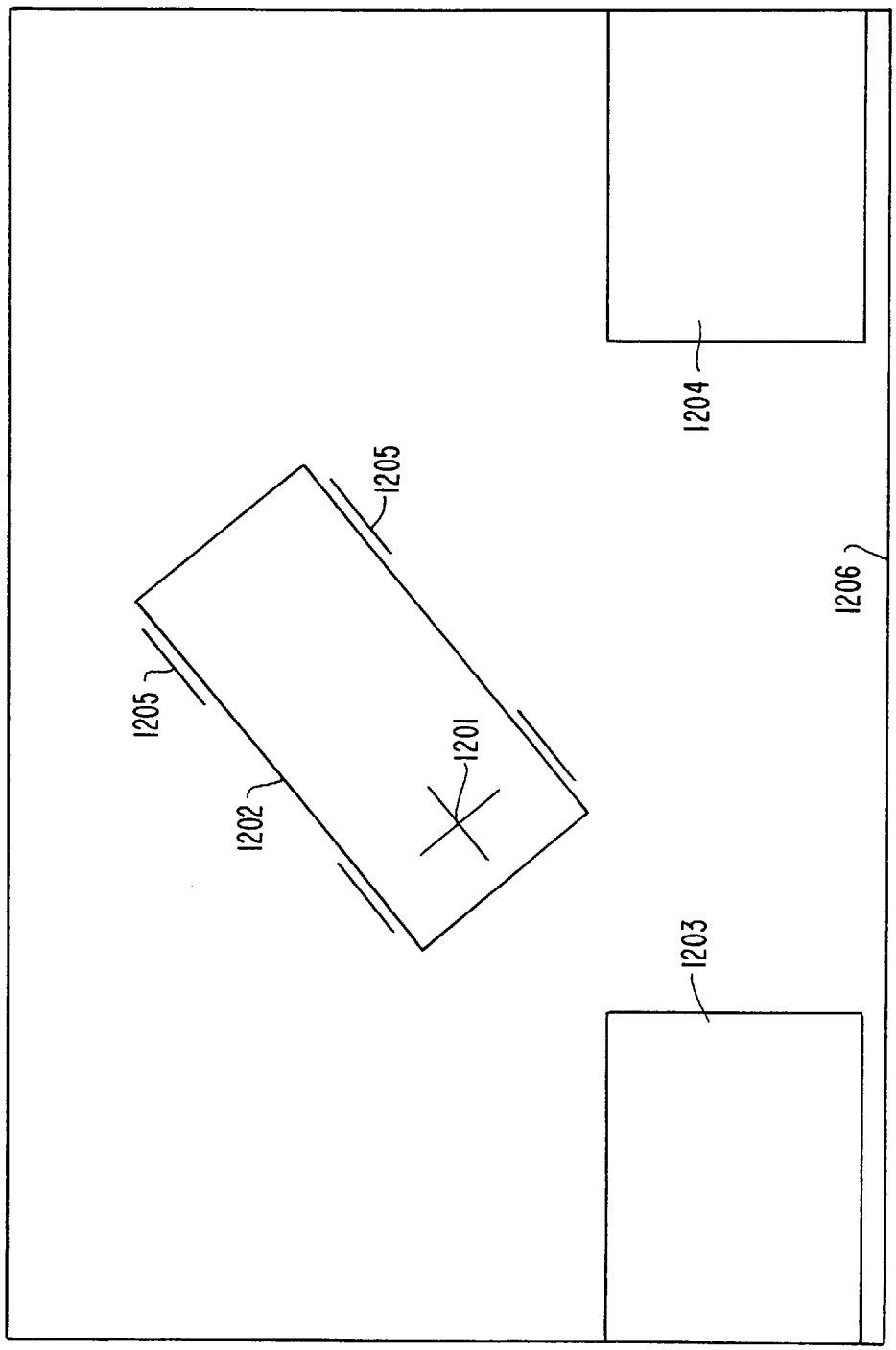
FIG. 12 is a schematic illustration of a vehicle in task space.

FIG. 12 illustrates a schematic task space of a car 1202, with a cross 1201 at its Cartesian point location. Two obstacles 1203, 1204, which could be parked cars, are shown.

The car 1202 is considered to be located at an (x,y) position at the Cartesian point location 1201 and at an angle $\phi$, here pictured at about 235°. In this example, the 235° is measured from a fixed reference angle 0° which is parallel to the curb 1206 and has a direction from box 1204 to box 1203. The units chosen for this example were arbitrary, with the car 1202 being 3 units long. The discretization, illustrated by the grid is chosen so that the x and y axes in configuration space each have four states per distance unit. Thus the car is 12 states long. The discretization was also chosen so that the angle $\phi$ could assume 64 different values. In other words, the periodic axis $\phi$ in configuration space has sixty-four states along it, with each state representing an increment of 5⅝°. Those of ordinary skill in the art will appreciate that other units and other levels of discretization can be chosen. In particular, finer discretization will give more accurate calculations of movement at the expense of longer calculation time, while coarser discretization will give less accurate calculations with a shorter calculation time.

In order to simplify the example, the front wheels 1205 are assumed to be parallel, and to have three possible positions: 45° to the left, straight, and 45° to the right. The wheel positions are used to determine how the car 1202 moves, but are not a parameter of the configuration space in this embodiment. In real cars, the wheels may not always be precisely parallel. However, given the level of discretization chosen, such secondary effects can be ignored. In real cars, the front wheels can assume a greater variety of positions than are allowed in the present example. The techniques of the present example can be readily adjusted to take into account secondary effects and increased numbers of wheel angles.

Figure 13:
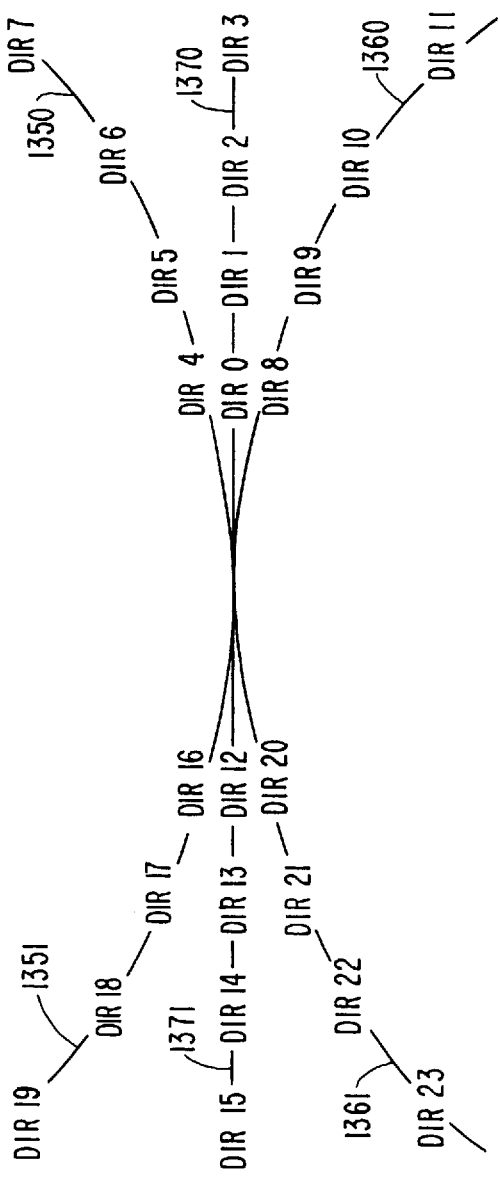
FIG. 13 illustrates a transformation of a neighborhood into task space.

FIG. 13 schematically illustrates the shape of transform of the neighborhood of any given car pose as that transform would look in task space. Assuming the front of the car is pointed towards dir 3. Fiber 1351 illustrates the forward and 1350 the backward path of the Cartesian point location of the car when the front wheels are turned 45° to the left. Fiber 1361 illustrates the forward and 1360 the backward path of the Cartesian point location of the car with the front and back wheels turned 45° to the right. Fiber 1371 illustrates the forward and 1370 the backward path of the Cartesian point location of the car with the front wheels straight.

When a real car drives first forward and then backward, with the steering wheel turned at a given angle, the real car does not exactly retrace its path. However, because of the discretization of the configuration space, the paths 1350, 1351, 1360, 1361, 1371, and 1370 adequately represent the possible paths of the car given the assumed front wheel angles. If the discretization gives rise to rounding errors, with the car ending up in a pose other than that intended, the car can still follow the direction_arrows from its new pose to the goal.

If it is assumed that the maximum angle which the front wheels can make is 45°, the fibers 1350/1351 and 1360/1361 define outer boundaries of all of the possible paths which the Cartesian point location of the car can take from the given pose. The shape of FIG. 13 will be referred to herein as a "bow-tie". Thus the set of neighbors of a given state in configuration space, will correspond to a bow-tie around the pose corresponding to that state in task space.

The bow-tie formation illustrates the usefulness of choosing the Cartesian point location of the car in task space to be midway between the non-steering wheels. This Cartesian point location is a pivot point of the car. In other words, when this Cartesian point location is chosen, fibers 1350 and 1360 meet at a single tangent point, rather than having two points of intersection.

Other kinds of vehicles may have more or different pivot points.

FIG. 13 schematically illustrates the location of 24 neighbor points surrounding an arbitrary point in task space. It is to be noted that since budding generally occurs outward from the goal, the lines from the current pose are opposite to the direction_arrows which would be assigned during budding. Thus neighbor dir 7, which is forward of the current position and to the left, corresponds to a direction_arrows value which corresponds to moving the car backwards with the front wheels turned left. Neighbor dir 19, which is in back of the current position and to the left, corresponds to a direction_arrows value which corresponds to moving the car forwards with the front wheels turned all the way to the left.

The neighbor points of FIG. 13 are adapted to the particular discretization which was chosen for this example. More neighbors would allow for more precise movement. Less neighbors would allow for less precise movement. If the wheels of the car are allowed to assume more angles, i.e. are if they are represented with a finer degree of discretization, the bow-tie will have more fibers with neighbors on each fiber. Alternatively, enough neighbors can be added to completely fill the space between the outerboundary fibers 1350/1351 and 1360/1361. These additional neighbors may or may not be considered to be located on fibers, although they correspond to some calculable and unique wheel angle. These additional neighbors will minimize transition cost to the current state. In such a case, the wheel angle could be considered to be continuous rather than discretized.

The above discussion of neighborhoods can be generalized to other examples of path planning. In general, the number of neighbors to a current state can vary depending on the state. In other words, the neighborhood is "space-variant". In addition, the neighborhood around the state can take on any shape depending on the application.

The placement of these 24 neighbor poses with respect to the current pose are listed in TABLE I. As shown in this table, the neighbor points are a function of the angle $\phi$ of the car. The angle $\phi$ is called "carangle" in the table, and it assumes values 0–64. The neighbor poses are called dir 0, dir 1, . . . , dir 23, which correspond to the neighbor points in FIG. 13. Next to the name of each of the neighbor points in TABLE I are four numbers. The first number represents a distance travelled by the Cartesian point location of the car from a current point to the neighbor point. The next three points represent the pose differential value (dx,dy,d$\phi$), with dx, dy, and d$\phi$ represented as respective numbers of states.

Thus, for example, under carangle 0 in TABLE I, dir 0 represents a Cartesian point location movement of 0.250 units, a transition of one state in the x direction, and a transition of zero states in the y and $\phi$ directions. Similarly, under carangle 0, we see that dir 23 represents a Cartesian point location movement of 1.017, a transition of −4 states in the x direction, a transition of 0 states in the y direction, and a transition of 3 states in the $\phi$ direction.

Within a given carangle, two neighbor points may not be distinguishable. For instance, under carangle 0, dir 4 represents a Cartesian point location movement of 0.250, a transition of one state in the x direction and transitions of zero states in the y and $\phi$ directions. Thus under carangle 0, dir 4 is indistinguishable from dir 0. This is an artifact resulting from the level of discretization of the configuration space. The transition with the higher cost will never be chosen in box 19 of FIG. 1a. In an alternative embodiment, this redundancy of the neighborhood can be eliminated, by removing higher cost redundant neighbors from the search.

Thus, in general, Table I defines set of neighborhoods which vary according to the state, or a "space variant neighborhood".

The cost function chosen to be minimized in this embodiment is the distance travelled by the Cartesian point location of the car. Because of this choice of cost function, the distance values in TABLE I also indicate the transition costs from the states corresponding to the indicated neighbor poses to the state corresponding to the indicated current pose. TABLE I thus also defines a space variant metric as well as a space variant neighborhood. The term "metric" is applied to the metric induced herein to mean that transition costs are $\geq 0$, regardless of whether there is symmetry of transition costs or whether the triangular inequality holds for transition costs.

One skilled in the art might choose other cost functions to minimize, for instance the number of turns of the steering wheel, or the amount of time a particular path takes to follow.

If different parameters were chosen for the configuration space the set of neighbors would be chosen differently. For instance, the bow-tie of FIG. 13 is symmetrical because it is assumed that the car has perfect response. If the car does not have perfect response, velocity may become a fourth parameter of the configuration space. At higher velocities, it is not reasonable to consider instantaneously reversing the direction of the car. Therefore, some of the neighborhoods will have a transform looking like a narrowed version of only one bow of the bow-tie. For instance, if the car is moving 30 m.p.h. forward, dir 0 through dir 11, which correspond to reverse motion of the car, should be eliminated from the neighborhood. Similarly, the maximum wheel angles allowed at 30 m.p.h. would be smaller than those allowed at rest, therefore dir 16 through dir 19 would correspond to a maximum wheel angle of less than 45°. In this example, extra neighbors, beyond dir 15, dir 19, and dir 20 should be added to correspond to extra possibilities for motion for the car.

In budding, the neighbors in the bow-tie neighborhood must be searched according to a precedence, as described in section D, above, in which no neighbor is searched if it is beyond a neighbor which is blocked by an obstacle. In the case of FIG. 12, the precedence can involve searching all of the neighbors on a fiber of the bow-tie, from the center out, until an obstacle is reached or until the end of the fiber, and then searching another fiber. Other precedences can be chosen. For instance, if redundant neighbors are removed, the removed redundant neighbor should be considered blocked or non-blocked for precedence of search depending on whether a retained redundant state is blocked. In other words, if dir 4 is removed from Table I for the search for carangle 0, then the search of block 17 of FIG. 1b will search dir 5 if and only if dir 0 is non-blocked.

The transformation of obstacles into configuration space will now be described.

Figure 14A:
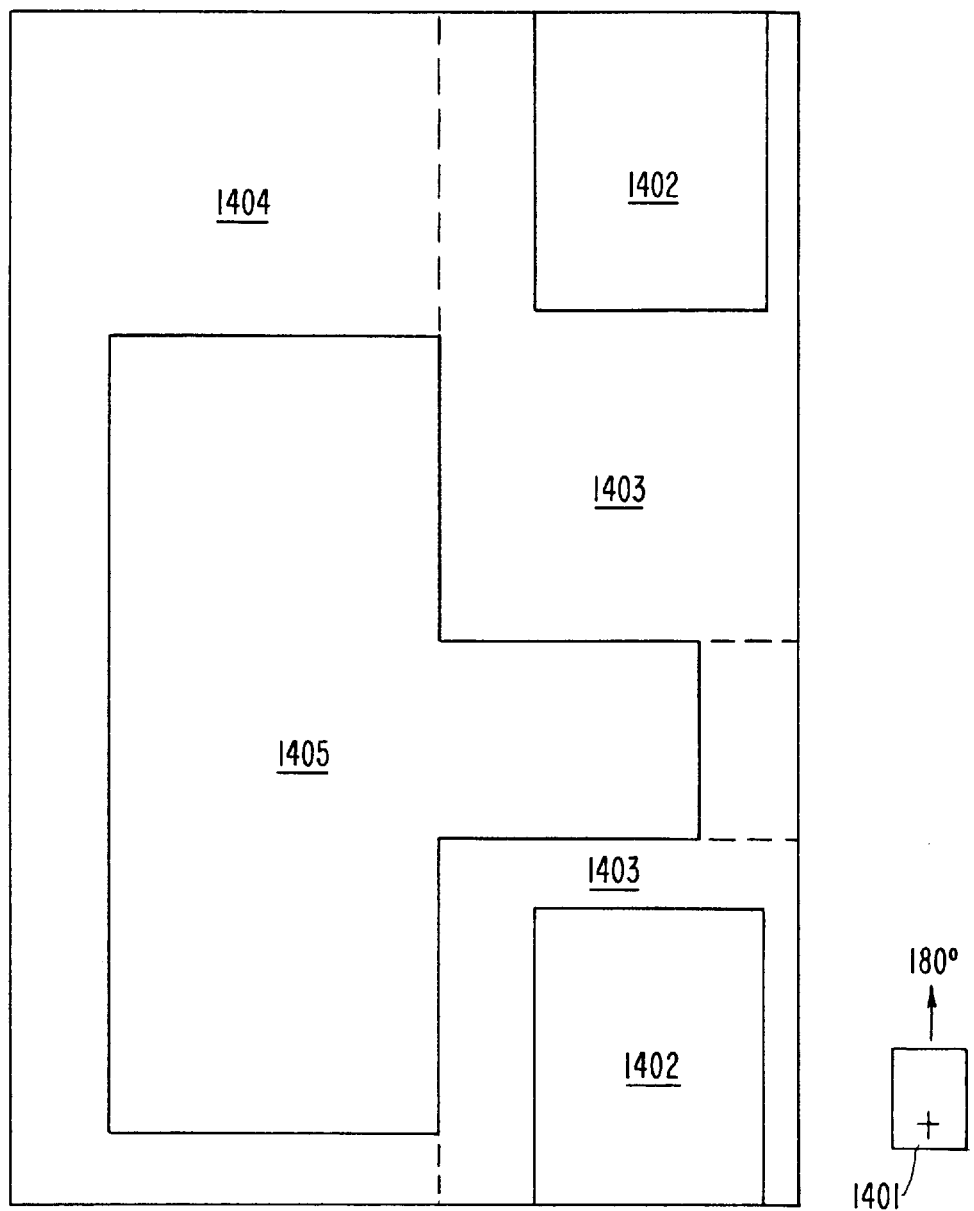
FIGS. 14a, 14b, 14c, and 14d illustrate obstacle transformation from task space to configuration space.

The obstacles 1203 and 1204 will have different shapes in configuration space depending on the angle $\phi$ of the car 1201. FIGS. 14a, b, c, and d, illustrate $\phi$ planes of the configuration space showing obstacle regions for obstacles similar to 1203 and 1204.

Figure 14B:
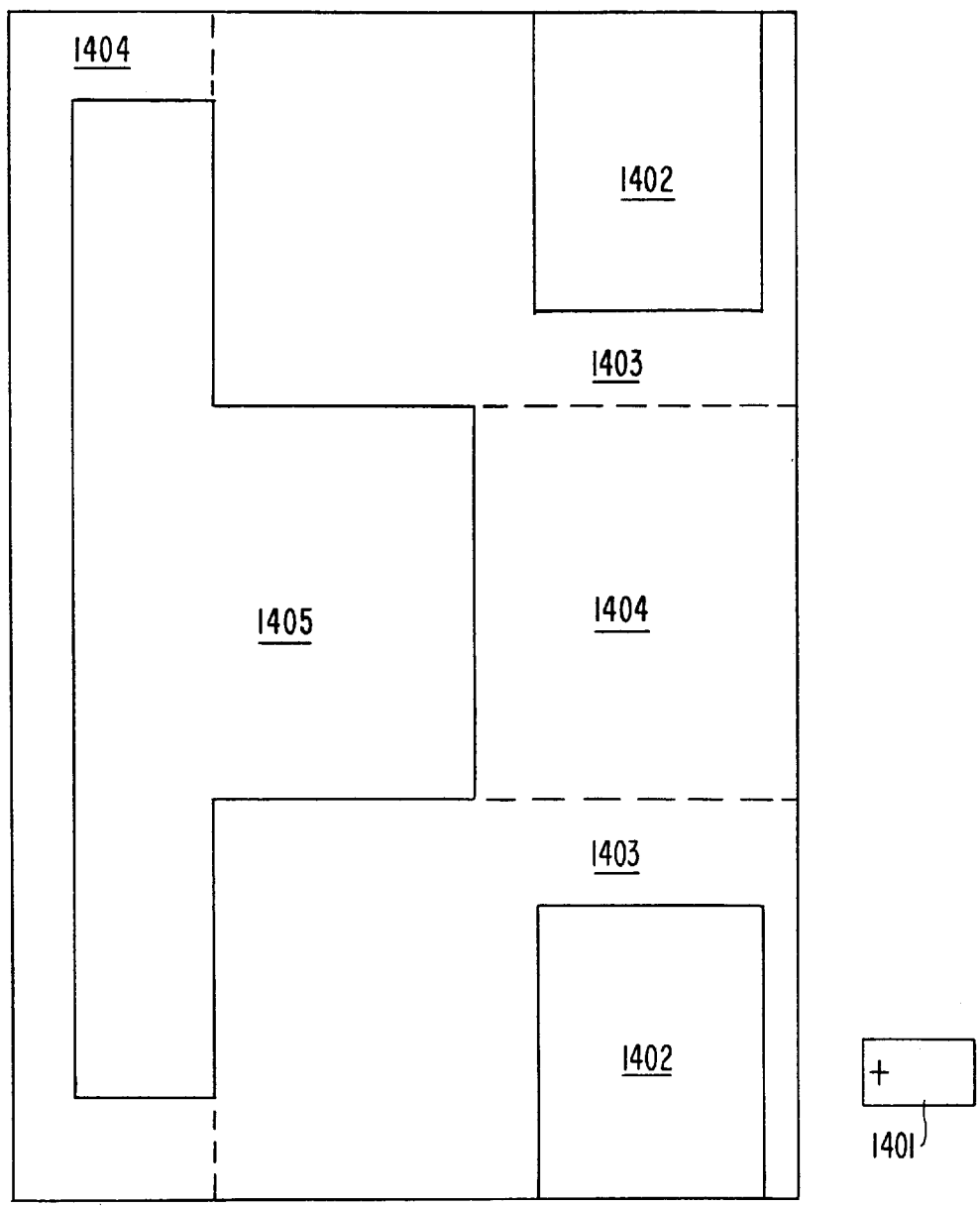
Figure 14C:
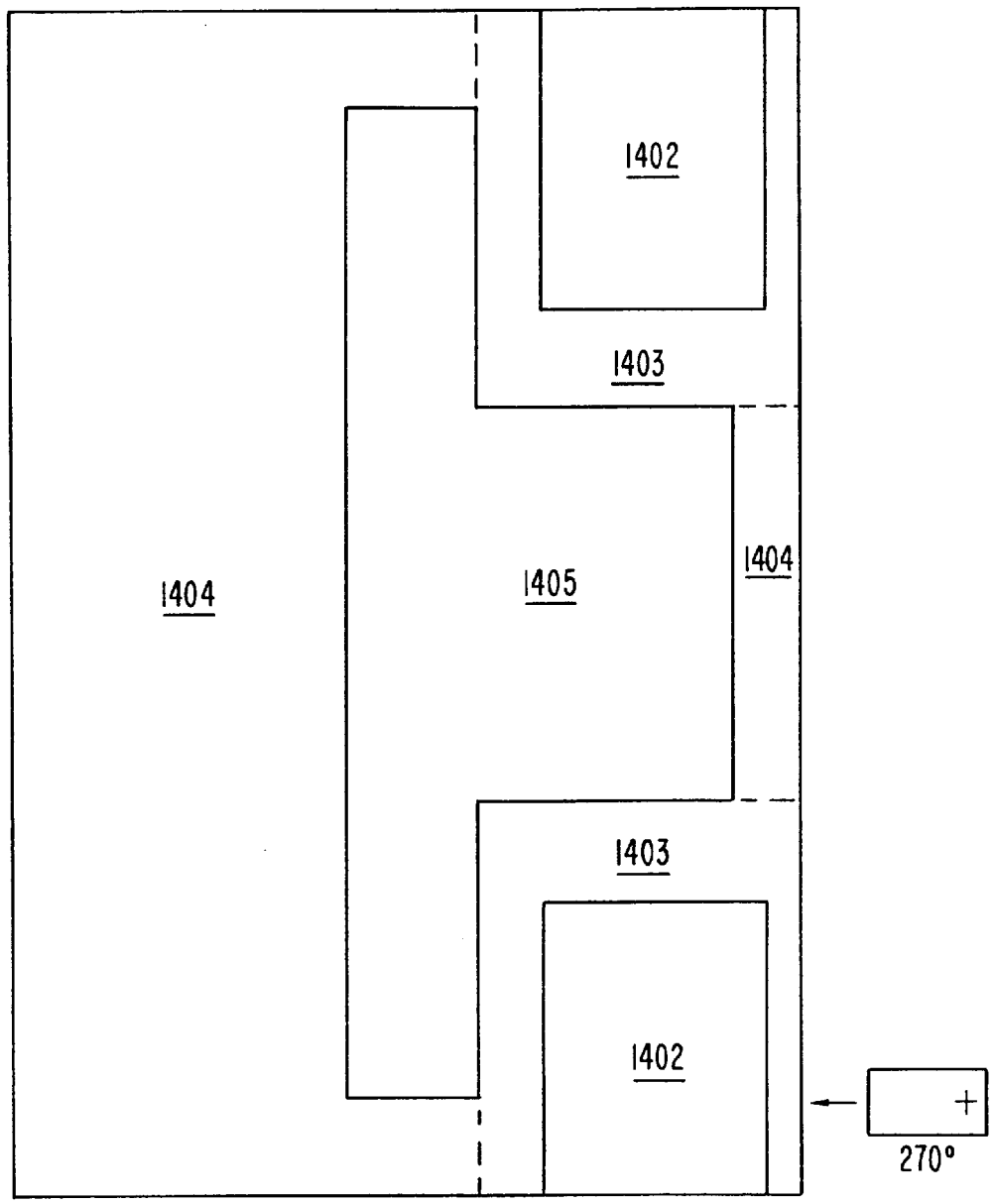
Figure 14D:
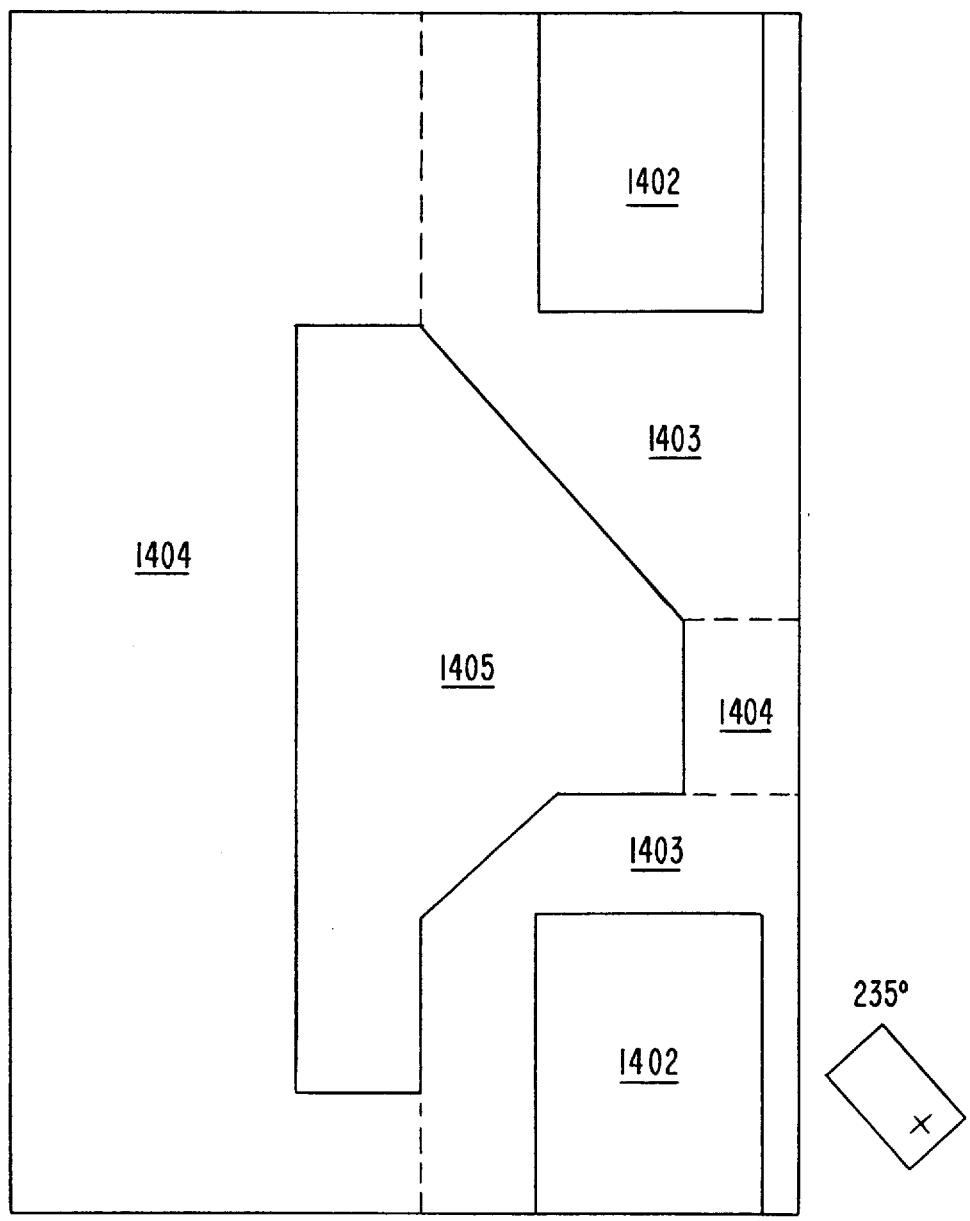

FIG. 14a shows the $\phi$=180° plane of the configuration space. The car is illustrated schematically at 1401, where it is pictured at the angle $\phi$=180°. Regions 1402 correspond to the size of real obstacles in task space. Regions 1403 correspond to additional space which the Cartesian point location of the car cannot enter because of the surface area covered by the car. Regions 1404 correspond to areas which the Cartesian point location of the car cannot enter because of selected boundaries of the task space, for instance curbs on a road. Region 1405 represents the area in which the Cartesian point location of the car is free to move. FIGS. 14b–14d illustrate the same configuration space as FIG. 4a, but in the $\phi=90°$, 270°, and 235° planes, respectively.

Source code for implementing a simulation of the method according to the invention is included as Appendix A. The source code is in the C language. Some subroutines of this code are of particular interest. The subroutine called "neighbor.c" implements trigonometric functions controlling the movement of the car and defines the cost function used by the simulation. The subroutine called transform.c transforms the obstacles for each angle $\phi$ of the car.

Figure 15:
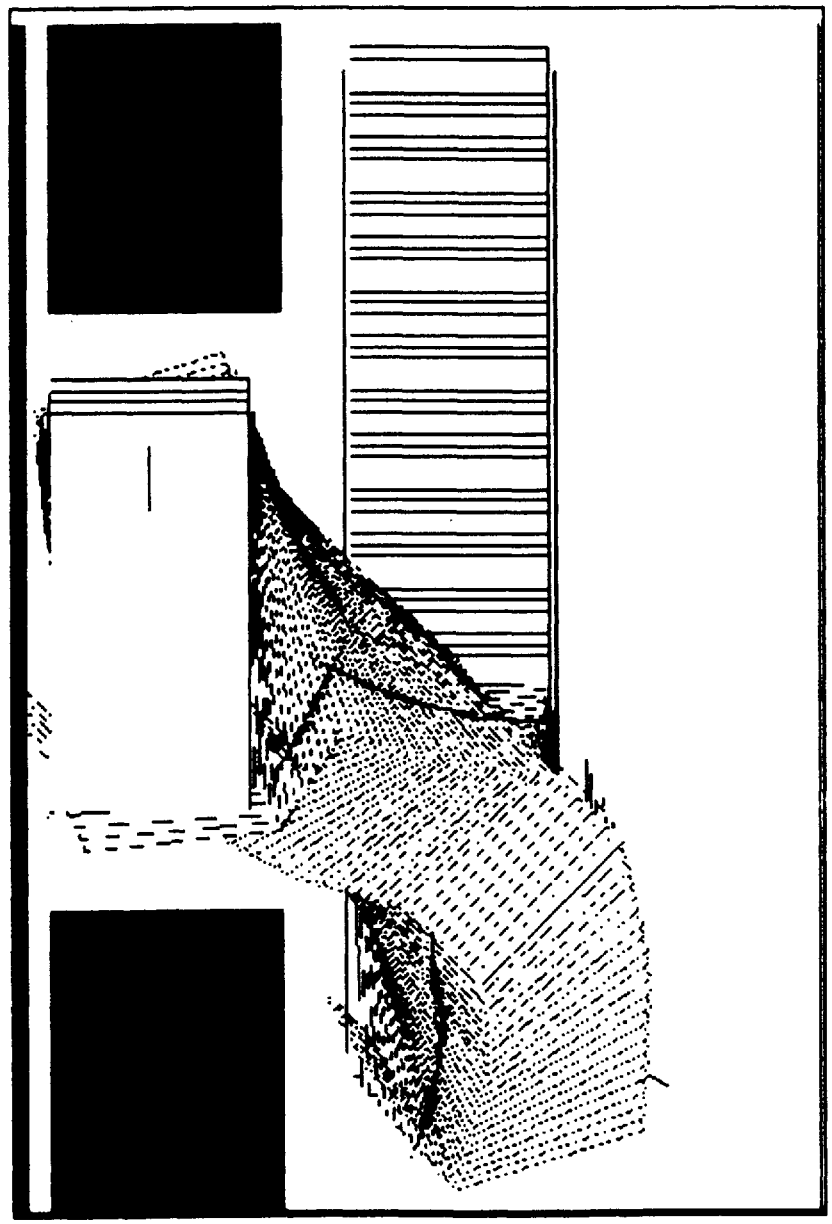
FIG. 15 is a screen image of a sun workstation running the simulation of Appendix A.

FIG. 15 is a screen image of a sun workstation running the simulation of Appendix A. The screen image shows a superposition of images of the car 1202 as it moves through the poses associated with states along a path which parallel parks the car.

TABLE I dir:dist dx dy dφ carangle 0

| | | | | | | | | | | | | | |
|---|---|---|---|---|---|---|---|---|---|---|---|---|---|
| dir 0: | 0.250 | 1 | 0 | 0 | dir 1: | 0.500 | 2 | 0 | 0 | dir 2: | 0.750 | 3 | 0 | 0 |
| dir 3: | 1.000 | 4 | 0 | 0 | dir 4: | 0.250 | 1 | 0 | 0 | dir 5: | 0.502 | 2 | 0 | 1 |
| dir 6: | 0.757 | 3 | 0 | 2 | dir 7: | 1.017 | 4 | 0 | 3 | dir 8: | 0.250 | 1 | 0 | 0 |
| dir 9: | 0.502 | 2 | 0 | −1 | dir 10: | 0.757 | 3 | 0 | −2 | dir 11: | 1.017 | 4 | 0 | −3 |
| dir 12: | 0.250 | −1 | 0 | 0 | dir 13: | 0.500 | −2 | 0 | 0 | dir 14: | 0.750 | −3 | 0 | 0 |
| dir 15: | 1.000 | −4 | 0 | 0 | dir 16: | 0.250 | −1 | 0 | 0 | dir 17: | 0.502 | −2 | 0 | −1 |
| dir 18: | 0.757 | −3 | 0 | −2 | dir 19: | 1.017 | −4 | 0 | −3 | dir 20: | 0.250 | −1 | 0 | 0 |
| dir 21: | 0.502 | −2 | 0 | 1 | dir 22: | 0.757 | −3 | 0 | 2 | dir 23: | 1.017 | −4 | 0 | 3 | carangle 1

| | | | | | | | | | | | | | |
|---|---|---|---|---|---|---|---|---|---|---|---|---|---|
| dir 0: | 0.250 | 0 | 0 | 0 | dir 1: | 0.500 | 1 | 0 | 0 | dir 2: | 0.750 | 2 | 0 | 0 |
| dir 3: | 1.000 | 3 | 0 | 0 | dir 4: | 0.250 | 0 | 0 | 0 | dir 5: | 0.502 | 1 | 0 | 1 |
| dir 6: | 0.757 | 2 | 0 | 2 | dir 7: | 1.017 | 3 | 0 | 3 | dir 8: | 0.250 | 0 | 0 | 0 |
| dir 9: | 0.502 | 1 | 0 | −1 | dir 10: | 0.757 | 2 | 0 | −2 | dir 11: | 1.017 | 4 | 0 | −3 |
| dir 12: | 0.250 | 0 | 0 | 0 | dir 13: | 0.500 | −1 | 0 | 0 | dir 14: | 0.750 | −2 | 0 | 0 |
| dir 15: | 1.000 | −3 | 0 | 0 | dir 16: | 0.250 | 0 | 0 | 0 | dir 17: | 0.502 | −1 | 0 | −1 |
| dir 18: | 0.757 | −2 | 0 | −2 | dir 19: | 1.017 | −4 | 0 | −3 | dir 20: | 0.250 | 0 | 0 | 0 |
| dir 21: | 0.502 | −1 | 0 | 1 | dir 22: | 0.757 | −2 | 0 | 2 | dir 23: | 1.017 | −3 | 0 | 3 | carangle 2

| | | | | | | | | | | | | | |
|---|---|---|---|---|---|---|---|---|---|---|---|---|---|
| dir 0: | 0.250 | 0 | 0 | 0 | dir 1: | 0.500 | 1 | 0 | 0 | dir 2: | 0.750 | 2 | 0 | 0 |
| dir 3: | 1.000 | 3 | 0 | 0 | dir 4: | 0.250 | 0 | 0 | 0 | dir 5: | 0.502 | 1 | 0 | 1 |
| dir 6: | 0.757 | 2 | 0 | 2 | dir 7: | 1.017 | 3 | 1 | 3 | dir 8: | 0.250 | 0 | 0 | 0 |
| dir 9: | 0.502 | 1 | 0 | −1 | dir 10: | 0.757 | 2 | 0 | −2 | dir 11: | 1.017 | 3 | 0 | −3 |
| dir 12: | 0.250 | 0 | 0 | 0 | dir 13: | 0.500 | −1 | 0 | 0 | dir 14: | 0.750 | −2 | 0 | 0 |
| dir 15: | 1.000 | −3 | 0 | 0 | dir 16: | 0.250 | 0 | 0 | 0 | dir 17: | 0.502 | −1 | 0 | −1 |
| dir 18: | 0.757 | −2 | 0 | −2 | dir 19: | 1.017 | −3 | 0 | −3 | dir 20: | 0.250 | 0 | 0 | 0 |
| dir 21: | 0.502 | −1 | 0 | 1 | dir 22: | 0.757 | −2 | 0 | 2 | dir 23: | 1.017 | −3 | −1 | 3 | carangle 3

| | | | | | | | | | | | | | |
|---|---|---|---|---|---|---|---|---|---|---|---|---|---|
| dir 0: | 0.250 | 0 | 0 | 0 | dir 1: | 0.500 | 1 | 0 | 0 | dir 2: | 0.750 | 2 | 0 | 0 |
| dir 3: | 1.000 | 3 | 1 | 0 | dir 4: | 0.250 | 0 | 0 | 0 | dir 5: | 0.502 | 1 | 0 | 1 |
| dir 6: | 0.757 | 2 | 0 | 2 | dir 7: | 1.017 | 3 | 1 | 3 | dir 8: | 0.250 | 0 | 0 | 0 |
| dir 9: | 0.502 | 1 | 0 | −1 | dir 10: | 0.757 | 2 | 0 | −2 | dir 11: | 1.017 | 3 | 0 | −3 |
| dir 12: | 0.250 | 0 | 0 | 0 | dir 13: | 0.500 | −1 | 0 | 0 | dir 14: | 0.750 | −2 | 0 | 0 |
| dir 15: | 1.000 | −3 | −1 | 0 | dir 16: | 0.250 | 0 | 0 | 0 | dir 17: | 0.502 | −1 | 0 | −1 |
| dir 18: | 0.757 | −2 | 0 | −2 | dir 19: | 1.017 | −3 | 0 | −3 | dir 20: | 0.250 | 0 | 0 | 0 |
| dir 21: | 0.502 | −1 | 0 | 1 | dir 22: | 0.757 | −2 | 0 | 2 | dir 23: | 1.017 | −3 | −1 | 3 | carangle 4

| | | | | | | | | | | | | | |
|---|---|---|---|---|---|---|---|---|---|---|---|---|---|
| dir 0: | 0.250 | 0 | 0 | 0 | dir 1: | 0.500 | 1 | 0 | 0 | dir 2: | 0.750 | 2 | 1 | 0 |
| dir 3: | 1.000 | 3 | 1 | 0 | dir 4: | 0.250 | 0 | 0 | 0 | dir 5: | 0.502 | 1 | 0 | 1 |
| dir 6: | 0.757 | 2 | 1 | 2 | dir 7: | 1.017 | 3 | 1 | 3 | dir 8: | 0.250 | 0 | 0 | 0 |
| dir 9: | 0.502 | 1 | 0 | −1 | dir 10: | 0.757 | 2 | 1 | −2 | dir 11: | 1.017 | 3 | 1 | −3 |
| dir 12: | 0.250 | 0 | 0 | 0 | dir 13: | 0.500 | −1 | 0 | 0 | dir 14: | 0.750 | −2 | −1 | 0 |
| dir 15: | 1.000 | −3 | −1 | 0 | dir 16: | 0.250 | 0 | 0 | 0 | dir 17: | 0.502 | −1 | 0 | −1 |
| dir 18: | 0.757 | −2 | −1 | −2 | dir 19: | 1.017 | −3 | −1 | −3 | dir 20: | 0.250 | 0 | 0 | 0 |
| dir 21: | 0.502 | −1 | 0 | 1 | dir 22: | 0.757 | −2 | −1 | 2 | dir 23: | 1.017 | −3 | −1 | 3 | carangle 5

| | | | | | | | | | | | | | |
|---|---|---|---|---|---|---|---|---|---|---|---|---|---|
| dir 0: | 0.250 | 0 | 0 | 0 | dir 1: | 0.500 | 1 | 0 | 0 | dir 2: | 0.750 | 2 | 1 | 0 |
| dir 3: | 1.000 | 3 | 1 | 0 | dir 4: | 0.250 | 0 | 0 | 0 | dir 5: | 0.502 | 1 | 0 | 1 |
| dir 6: | 0.757 | 2 | 1 | 2 | dir 7: | 1.017 | 3 | 2 | 3 | dir 8: | 0.250 | 0 | 0 | 0 |
| dir 9: | 0.502 | 1 | 0 | −1 | dir 10: | 0.757 | 2 | 1 | −2 | dir 11: | 1.017 | 3 | 1 | −3 |
| dir 12: | 0.250 | 0 | 0 | 0 | dir 13: | 0.500 | 4 | 0 | 0 | dir 14: | 0.750 | −2 | −1 | 0 |
| dir 15: | 1.000 | −3 | −1 | 0 | dir 16: | 0.250 | 0 | 0 | 0 | dir 17: | 0.502 | −1 | 0 | −1 |
| dir 18: | 0.757 | −2 | −1 | −2 | dir 19: | 1.017 | −3 | −1 | −3 | dir 20: | 0.250 | 0 | 0 | 0 |
| dir 21: | 0.502 | −1 | 0 | 1 | dir 22: | 0.757 | −2 | −1 | 2 | dir 23: | 1.017 | −3 | −2 | 3 |

TABLE I-continued dir:dist dx dy dφ carangle 6

| dir 0: | 0.250 | 0 | 0 | 0 | dir 1: | 0.500 | 1 | 1 | 0 | dir 2: | 0.750 | 2 | 1 | 0 |
|---|---|---|---|---|---|---|---|---|---|---|---|---|---|---|
| dir 3: | 1.000 | 3 | 2 | 0 | dir 4: | 0.250 | 0 | 0 | 0 | dir 5: | 0.502 | 1 | 1 | 1 |
| dir 6: | 0.757 | 2 | 1 | 2 | dir 7: | 1.017 | 3 | 2 | 3 | dir 8: | 0.250 | 0 | 0 | 0 |
| dir 9: | 0.502 | 1 | 1 | −1 | dir 10: | 0.757 | 2 | 1 | −2 | dir 11: | 1.017 | 3 | 2 | −3 |
| dir 12: | 0.250 | 0 | 0 | 0 | dir 13: | 0.500 | −1 | −1 | 0 | dir 14: | 0.750 | −2 | −1 | 0 |
| dir 15: | 1.000 | −3 | −2 | 0 | dir 16: | 0.250 | 0 | 0 | 0 | dir 17: | 0.502 | −1 | −1 | −1 |
| dir 18: | 0.757 | −2 | −1 | −2 | dir 19: | 1.017 | −3 | −2 | −3 | dir 20: | 0.250 | 0 | 0 | 0 |
| dir 21: | 0.502 | −1 | −1 | 1 | dir 22: | 0.757 | −2 | −2 | 2 | dir 23: | 1.017 | −3 | −2 | 3 | carangle 7

| dir 0: | 0.250 | 0 | 0 | 0 | dir 1: | 0.500 | 1 | 1 | 0 | dir 2: | 0.750 | 2 | 1 | 0 |
|---|---|---|---|---|---|---|---|---|---|---|---|---|---|---|
| dir 3: | 1.000 | 3 | 2 | 0 | dir 4: | 0.250 | 0 | 0 | 0 | dir 5: | 0.502 | 1 | 1 | 1 |
| dir 6: | 0.757 | 2 | 1 | 2 | dir 7: | 1.017 | 2 | 2 | 3 | dir 8: | 0.250 | 0 | 0 | 0 |
| dir 9: | 0.502 | 1 | 1 | −1 | dir 10: | 0.757 | 2 | 1 | −2 | dir 11: | 1.017 | 3 | 2 | −3 |
| dir 12: | 0.250 | 0 | 0 | 0 | dir 13: | 0.500 | −1 | −1 | 0 | dir 14: | 0.750 | −2 | −1 | 0 |
| dir 15: | 1.000 | −3 | −2 | 0 | dir 16: | 0.250 | 0 | 0 | 0 | dir 17: | 0.502 | −1 | −1 | −1 |
| dir 18: | 0.757 | −2 | −1 | −2 | dir 19: | 1.017 | −3 | −2 | −3 | dir 20: | 0.250 | 0 | 0 | 0 |
| dir 21: | 0.502 | −1 | −1 | 1 | dir 22: | 0.757 | −2 | −1 | 2 | dir 23: | 1.017 | −2 | −2 | 3 | carangle 8

| dir 0: | 0.250 | 0 | 0 | 0 | dir 1: | 0.500 | 1 | 1 | 0 | dir 2: | 0.750 | 2 | 2 | 0 |
|---|---|---|---|---|---|---|---|---|---|---|---|---|---|---|
| dir 3: | 1.000 | 2 | 2 | 0 | dir 4: | 0.250 | 0 | 0 | 0 | dir 5: | 0.502 | 1 | 1 | 1 |
| dir 6: | 0.757 | 2 | 2 | 2 | dir 7: | 1.017 | 2 | 3 | 3 | dir 8: | 0.250 | 0 | 0 | 0 |
| dir 9: | 0.502 | 1 | 1 | −1 | dir 10: | 0.757 | 2 | 2 | −2 | dir 11: | 1.017 | 3 | 2 | −3 |
| dir 12: | 0.250 | 0 | 0 | 0 | dir 13: | 0.500 | −1 | −1 | 0 | dir 14: | 0.750 | −2 | −2 | 0 |
| dir 15: | 1.000 | −2 | −2 | 0 | dir 16: | 0.250 | 0 | 0 | 0 | dir 17: | 0.502 | −1 | −1 | −1 |
| dir 18: | 0.757 | −2 | −2 | −2 | dir 19: | 1.017 | −3 | −2 | −3 | dir 20 | 0.250 | 0 | 0 | 0 |
| dir 21: | 0.502 | −1 | −1 | 1 | dir 22: | 0.757 | −2 | −2 | 2 | dir 23: | 1.017 | −2 | −3 | 3 | carangle 9

| dir 0: | 0.250 | 0 | 0 | 0 | dir 1: | 0.500 | 1 | 1 | 0 | dir 2: | 0.750 | 1 | 2 | 0 |
|---|---|---|---|---|---|---|---|---|---|---|---|---|---|---|
| dir 3: | 1.000 | 2 | 3 | 0 | dir 4: | 0.250 | 0 | 0 | 0 | dir 5: | 0.502 | 1 | 1 | 1 |
| dir 6: | 0.757 | 1 | 2 | 2 | dir 7: | 1.017 | 2 | 3 | 3 | dir 8: | 0.250 | 0 | 0 | 0 |
| dir 9: | 0.502 | 1 | 1 | −1 | dir 10: | 0.757 | 1 | 2 | −2 | dir 11: | 1.017 | 2 | 2 | −3 |
| dir 12: | 0.250 | 0 | 0 | 0 | dir 13: | 0.500 | −1 | −1 | 0 | dir 14: | 0.750 | −1 | −2 | 0 |
| dir 15: | 1.000 | −2 | −3 | 0 | dir 16: | 0.250 | 0 | 0 | 0 | dir 17: | 0.502 | −1 | −1 | −1 |
| dir 18: | 0.757 | −1 | −2 | −2 | dir 19: | 1.017 | −2 | −2 | −3 | dir 20: | 0.250 | 0 | 0 | 0 |
| dir 21: | 0.502 | −1 | −1 | 1 | dir 22: | 0.757 | −1 | −2 | 2 | dir 23: | 1.017 | −2 | −3 | 3 | carangle 10

| dir 0: | 0.250 | 0 | 0 | 0 | dir 1: | 0.500 | 1 | 1 | 0 | dir 2: | 0.750 | 1 | 2 | 0 |
|---|---|---|---|---|---|---|---|---|---|---|---|---|---|---|
| dir 3: | 1.000 | 2 | 3 | 0 | dir 4: | 0.250 | 0 | 0 | 0 | dir 5: | 0.502 | 1 | 1 | 1 |
| dir 6: | 0.757 | 1 | 2 | 2 | dir 7: | 1.017 | 2 | 3 | 3 | dir 8: | 0.250 | 0 | 0 | 0 |
| dir 9: | 0.502 | 1 | 1 | −1 | dir 10: | 0.757 | 1 | 2 | −2 | dir 11: | 1.017 | 2 | 3 | −3 |
| dir 12: | 0.250 | 0 | 0 | 0 | dir 13: | 0.500 | −1 | −1 | 0 | dir 14: | 0.750 | −1 | −2 | 0 |
| dir 15: | 1.000 | −2 | −3 | 0 | dir 16: | 0.250 | 0 | 0 | 0 | dir 17: | 0.502 | −1 | −1 | −1 |
| dir 18: | 0.757 | −1 | −2 | −2 | dir 19: | 1.017 | −2 | −3 | −3 | dir 20: | 0.250 | 0 | 0 | 0 |
| dir 21: | 0.502 | −1 | −1 | 1 | dir 22: | 0.757 | −1 | −2 | 2 | dir 23: | 1.017 | −2 | −3 | 3 | carangle 11

| dir 0: | 0.250 | 0 | 0 | 0 | dir 1: | 0.500 | 0 | 1 | 0 | dir 2: | 0.750 | 1 | 2 | 0 |
|---|---|---|---|---|---|---|---|---|---|---|---|---|---|---|
| dir 3: | 1.000 | 1 | 3 | 0 | dir 4: | 0.250 | 0 | 0 | 0 | dir 5: | 0.502 | 0 | 1 | 1 |
| dir 6: | 0.757 | 1 | 2 | 2 | dir 7: | 1.017 | 1 | 3 | 3 | dir 8: | 0.250 | 0 | 0 | 0 |
| dir 9: | 0.502 | 0 | 1 | −1 | dir 10: | 0.757 | 1 | 2 | −2 | dir 11: | 1.017 | 2 | 3 | −3 |
| dir 12: | 0.250 | 0 | 0 | 0 | dir 13: | 0.500 | 0 | −1 | 0 | dir 14: | 0.750 | −1 | −2 | 0 |
| dir 15: | 1.000 | −1 | −3 | 0 | dir 16: | 0.250 | 0 | 0 | 0 | dir 17: | 0.502 | 0 | −1 | −1 |
| dir 18: | 0.757 | −1 | −2 | −2 | dir 19: | 1.017 | −2 | −3 | −3 | dir 20: | 0.250 | 0 | 0 | 0 |
| dir 21: | 0.502 | 0 | −1 | 1 | dir 22: | 0.757 | −1 | −2 | 2 | dir 23: | 1.017 | −1 | −3 | 3 | carangle 12

| dir 0: | 0.250 | 0 | 0 | 0 | dir 1: | 0.500 | 0 | 1 | 0 | dir 2: | 0.750 | 1 | 2 | 0 |
|---|---|---|---|---|---|---|---|---|---|---|---|---|---|---|
| dir 3: | 1.000 | 1 | 3 | 0 | dir 4: | 0.250 | 0 | 0 | 0 | dir 5: | 0.502 | 0 | 1 | 1 |
| dir 6: | 0.757 | 1 | 2 | 2 | dir 7: | 1.017 | 1 | 3 | 3 | dir 8: | 0.250 | 0 | 0 | 0 |
| dir 9: | 0.502 | 0 | 1 | −1 | dir 10: | 0.757 | 1 | 2 | −2 | dir 11: | 1.017 | 1 | 3 | −3 |
| dir 12: | 0.250 | 0 | 0 | 0 | dir 13: | 0.500 | 0 | −1 | 0 | dir 14: | 0.750 | −1 | −2 | 0 |
| dir 15: | 1.000 | −1 | −3 | 0 | dir 16: | 0.250 | 0 | 0 | 0 | dir 17: | 0.502 | 0 | −1 | −1 |
| dir 18: | 0.757 | −1 | −2 | −2 | dir 19: | 1.017 | −1 | −3 | −3 | dir 20: | 0.250 | 0 | 0 | 0 |
| dir 21: | 0.502 | 0 | −1 | 1 | dir 22: | 0.757 | −1 | −2 | 2 | dir 23: | 1.017 | −1 | −3 | 3 | carangle 13

| dir 0: | 0.250 | 0 | 0 | 0 | dir 1: | 0.500 | 0 | 1 | 0 | dir 2: | 0.750 | 0 | 2 | 0 |
|---|---|---|---|---|---|---|---|---|---|---|---|---|---|---|
| dir 3: | 1.000 | 1 | 3 | 0 | dir 4: | 0.250 | 0 | 0 | 0 | dir 5: | 0.502 | 0 | 1 | 1 |
| dir 6: | 0.757 | 0 | 2 | 2 | dir 7: | 1.017 | 0 | 3 | 3 | dir 8: | 0.250 | 0 | 0 | 0 |
| dir 9: | 0.502 | 0 | 1 | −1 | dir 10: | 0.757 | 0 | 2 | −2 | dir 11: | 1.017 | 1 | 3 | −3 |
| dir 12: | 0.250 | 0 | 0 | 0 | dir 13: | 0.500 | 0 | −1 | 0 | dir 14: | 0.750 | 0 | −2 | 0 |

TABLE I-continued dir:dist dx dy dφ

| | | | | | | | | | | | | | |
|---|---|---|---|---|---|---|---|---|---|---|---|---|---|
| dir 15: | 1.000 | −1 | −3 | 0 | dir 16: | 0.250 | 0 | 0 | 0 | dir 17: | 0.502 | 0 | −1 | −1 |
| dir 18: | 0.757 | 0 | −2 | −2 | dir 19: | 1.017 | −1 | −3 | −3 | dir 20: | 0.250 | 0 | 0 | 0 |
| dir 21: | 0.502 | 0 | −1 | 1 | dir 22: | 0.757 | 0 | −2 | 2 | dir 23: | 1.017 | 0 | −3 | 3 |
| carangle 14 | | | | | | | | | | | | | | |
| dir 0: | 0.250 | 0 | 0 | 0 | dir 1: | 0.500 | 0 | 1 | 0 | dir 2: | 0.750 | 0 | 2 | 0 |
| dir 3: | 1.000 | 0 | 3 | 0 | dir 4: | 0.250 | 0 | 0 | 0 | dir 5: | 0.502 | 0 | 1 | 1 |
| dir 6: | 0.757 | 0 | 2 | 2 | dir 7: | 1.017 | 0 | 3 | 3 | dir 8: | 0.250 | 0 | 0 | 0 |
| dir 9: | 0.502 | 0 | 1 | −1 | dir 10: | 0.757 | 0 | 2 | −2 | dir 11: | 1.017 | 1 | 3 | −3 |
| dir 12: | 0.250 | 0 | 0 | 0 | dir 13: | 0.500 | 0 | −1 | 0 | dir 14: | 0.750 | 0 | −2 | 0 |
| dir 15: | 1.000 | 0 | −3 | 0 | dir 16: | 0.250 | 0 | 0 | 0 | dir 17: | 0.502 | 0 | −1 | −1 |
| dir 18: | 0.757 | 0 | −2 | −2 | dir 19: | 1.017 | −1 | −3 | −3 | dir 20: | 0.250 | 0 | 0 | 0 |
| dir 21: | 0.502 | 0 | −1 | 1 | dir 22: | 0.757 | 0 | −2 | 2 | dir 23: | 1.017 | 0 | −3 | 3 |
| carangle 15 | | | | | | | | | | | | | | |
| dir 0: | 0.250 | 0 | 0 | 0 | dir 1: | 0.500 | 0 | 1 | 0 | dir 2: | 0.750 | 0 | 2 | 0 |
| dir 3: | 1.000 | 0 | 3 | 0 | dir 4: | 0.250 | 0 | 0 | 0 | dir 5: | 0.502 | 0 | 1 | 1 |
| dir 6: | 0.757 | 0 | 2 | 2 | dir 7: | 1.017 | 0 | 4 | 3 | dir 8: | 0.250 | 0 | 0 | 0 |
| dir 9: | 0.502 | 0 | 1 | −1 | dir 10: | 0.757 | 0 | 2 | −2 | dir 11: | 1.017 | 0 | 3 | −3 |
| dir 12: | 0.250 | 0 | 0 | 0 | dir 13: | 0.500 | 0 | −1 | 0 | dir 14: | 0.750 | 0 | −2 | 0 |
| dir 15: | 1.000 | 0 | −3 | 0 | dir 16: | 0.250 | 0 | 0 | 0 | dir 17: | 0.502 | 0 | −1 | 1 |
| dir 18: | 0.757 | 0 | −2 | −2 | dir 19: | 1.017 | 0 | −3 | −3 | dir 20: | 0.250 | 0 | 0 | 0 |
| dir 21: | 0.502 | 0 | −1 | 1 | dir 22: | 0.757 | 0 | −2 | 2 | dir 23: | 1.017 | 0 | −4 | 3 |
| carangle 16 | | | | | | | | | | | | | | |
| dir 0: | 0.250 | 0 | 1 | 0 | dir 1: | 0.500 | 0 | 2 | 0 | dir 2: | 0.750 | 0 | 3 | 0 |
| dir 3: | 1.000 | 0 | 4 | 0 | dir 4: | 0.250 | 0 | 1 | 0 | dir 5: | 0.502 | 0 | 2 | 1 |
| dir 6: | 0.757 | 0 | 3 | 2 | dir 7: | 1.017 | 0 | 4 | 3 | dir 8: | 0.250 | 0 | 1 | 0 |
| dir 9: | 0.502 | 0 | 2 | −1 | dir 10: | 0.757 | 0 | 3 | −2 | dir 11: | 1.017 | 0 | 4 | −3 |
| dir 12: | 0.250 | 0 | −1 | 0 | dir 13: | 0.500 | 0 | −2 | 0 | dir 14: | 0.750 | 0 | −3 | 0 |
| dir 15: | 1.000 | 0 | −4 | 0 | dir 16: | 0.250 | 0 | −1 | 0 | dir 17: | 0.502 | 0 | −2 | −1 |
| dir 18: | 0.757 | 0 | −3 | −2 | dir 19: | 1.017 | 0 | −4 | −3 | dir 20: | 0.250 | 0 | −1 | 0 |
| dir 21: | 0.502 | 0 | −2 | 1 | dir 22: | 0.757 | 0 | −3 | 2 | dir 23: | 1.017 | 0 | −4 | 3 |
| carangle 17 | | | | | | | | | | | | | | |
| dir 0: | 0.250 | 0 | 0 | 0 | dir 1: | 0.500 | 0 | 1 | 0 | dir 2: | 0.750 | 0 | 2 | 0 |
| dir 3: | 1.000 | 0 | 3 | 0 | dir 4: | 0.250 | 0 | 0 | 0 | dir 5: | 0.502 | 0 | 1 | 1 |
| dir 6: | 0.757 | 0 | 2 | 2 | dir 7: | 1.017 | 0 | 3 | 3 | dir 8: | 0.250 | 0 | 0 | 0 |
| dir 9: | 0.502 | 0 | 1 | −1 | dir 10: | 0.757 | 0 | 2 | −2 | dir 11: | 1.017 | 0 | 4 | −3 |
| dir 12: | 0.250 | 0 | 0 | 0 | dir 13: | 0.500 | 0 | −1 | 0 | dir 14: | 0.750 | 0 | −2 | 0 |
| dir 15: | 1.000 | 0 | −3 | 0 | dir 16: | 0.250 | 0 | 0 | 0 | dir 17: | 0.502 | 0 | −1 | −1 |
| dir 18: | 0.757 | 0 | −2 | −2 | dir 19: | 1.017 | 0 | −4 | −3 | dir 20: | 0.250 | 0 | 0 | 0 |
| dir 21: | 0.502 | 0 | −1 | 1 | dir 22: | 0.757 | 0 | −2 | 2 | dir 23: | 1.017 | 0 | −3 | 3 |
| carangle −18 | | | | | | | | | | | | | | |
| dir 0: | 0.250 | 0 | 0 | 0 | dir 1: | 0.500 | 0 | 1 | 0 | dir 2: | 0.750 | 0 | 2 | 0 |
| dir 3: | 1.000 | 0 | 3 | 0 | dir 4: | 0.250 | 0 | 0 | 0 | dir 5: | 0.502 | 0 | 1 | 1 |
| dir 6: | 0.757 | 0 | 2 | 2 | dir 7: | 1.017 | −1 | 3 | 3 | dir 8: | 0.250 | 0 | 0 | 0 |
| dir 9: | 0.502 | 0 | 1 | −1 | dir 10: | 0.757 | 0 | 2 | −2 | dir 11: | 1.017 | 0 | 3 | −3 |
| dir 12: | 0.250 | 0 | 0 | 0 | dir 13: | 0.500 | 0 | −1 | 0 | dir 14: | 0.750 | 0 | −2 | 0 |
| dir 15: | 1.000 | 0 | −3 | 0 | dir 16: | 0.250 | 0 | 0 | 0 | dir 17: | 0.502 | 0 | −1 | −1 |
| dir 18: | 0.757 | 0 | −2 | −2 | dir 19: | 1.017 | 0 | −3 | −3 | dir 20: | 0.250 | 0 | 0 | 0 |
| dir 21: | 0.502 | 0 | −1 | 1 | dir 22: | 0.757 | 0 | −2 | 2 | dir 23: | 1.017 | 1 | −3 | 3 |
| carangle 19 | | | | | | | | | | | | | | |
| dir 0: | 0.250 | 0 | 0 | 0 | dir 1: | 0.500 | 0 | 1 | 0 | dir 2: | 0.750 | 0 | 2 | 0 |
| dir 3: | 1.000 | −1 | 3 | 0 | dir 4: | 0.250 | 0 | 0 | 0 | dir 5: | 0.502 | 0 | 1 | 1 |
| dir 6: | 0.757 | 0 | 2 | 2 | dir 7: | 1.017 | −1 | 3 | 3 | dir 8: | 0.250 | 0 | 0 | 0 |
| dir 9: | 0.502 | 0 | 1 | −1 | dir 10: | 0.757 | 0 | 2 | −2 | dir 11: | 1.017 | 0 | 3 | −3 |
| dir 12: | 0.250 | 0 | 0 | 0 | dir 13: | 0.500 | 0 | −1 | 0 | dir 14: | 0.750 | 0 | −2 | 0 |
| dir 15: | 1.000 | 1 | −3 | 0 | dir 16: | 0.250 | 0 | 0 | 0 | dir 17: | 0.502 | 0 | −1 | −1 |
| dir 18: | 0.757 | 0 | −2 | −2 | dir 19: | 1.017 | 0 | −3 | −3 | dir 20 | 0.250 | 0 | 0 | 0 |
| dir 21: | 0.502 | 0 | −1 | 1 | dir 22: | 0.757 | 9 | −2 | 2 | dir 23: | 1.017 | 1 | −3 | 3 |
| carangle 20 | | | | | | | | | | | | | | |
| dir 0: | 0.250 | 0 | 0 | 0 | dir 1: | 0.500 | 0 | 1 | 0 | dir 2: | 0.756 | −1 | 2 | 0 |
| dir 3: | 1.000 | −1 | 3 | 0 | dir 4: | 0.250 | 0 | 0 | 0 | dir 5: | 0.502 | 0 | 1 | 1 |
| dir 6: | 0.757 | −1 | 2 | 2 | dir 7: | 1.017 | 1 | 3 | 3 | dir 8: | 0.250 | 0 | 0 | 0 |
| dir 9: | 0.502 | 0 | 1 | −1 | dir 10: | 0.757 | 1 | 2 | −2 | dir 11: | 1.017 | −1 | 3 | −3 |
| dir 12: | 0.250 | 0 | 0 | 0 | dir 13: | 0.500 | 0 | −1 | 0 | dir 14: | 0.750 | 1 | −2 | 0 |
| dir 15: | 1.000 | 1 | −3 | 0 | dir 16: | 0.250 | 0 | 0 | 0 | dir 17: | 0.502 | 0 | −1 | −1 |
| dir 18: | 0.757 | 1 | −2 | −2 | dir 19: | 1.017 | 1 | −3 | −3 | dir 20: | 0.250 | 0 | 0 | 0 |
| dir 21: | 0.502 | 0 | −1 | 1 | dir 22: | 0.757 | 1 | −2 | 2 | dir 23: | 1.017 | 1 | −3 | 3 |
| carangle 21 | | | | | | | | | | | | | | |
| dir 0: | 0.250 | 0 | 0 | 0 | dir 1: | 0.500 | 0 | 1 | 0 | dir 2: | 0.750 | −1 | 2 | 0 |
| dir 3: | 1.000 | −1 | 3 | 0 | dir 4: | 0.250 | 0 | 0 | 0 | dir 5: | 0.502 | 0 | 1 | 1 |

TABLE I-continued dir:dist dx dy dφ

| | | | | | | | | | | | | | | | |
|---|---|---|---|---|---|---|---|---|---|---|---|---|---|---|---|
| dir 6: | 0.757 | −1 | 2 | 2 | dir 7: | 1.017 | 2 | 3 | 3 | dir 8: | 0.250 | 0 | 0 | 0 |
| dir 9: | 0.502 | 0 | 1 | −1 | dir 10: | 0.757 | −1 | 2 | −2 | dir 11: | 1.017 | −1 | 3 | −3 |
| dir 12: | 0.250 | 0 | 0 | 0 | dir 13: | 0.500 | 0 | −1 | 0 | dir 14: | 0.750 | 1 | −2 | 0 |
| dir 15: | 1.000 | 1 | −3 | 0 | dir 16: | 0.250 | 0 | 0 | 0 | dir 17: | 0.502 | 0 | −1 | −1 |
| dir 18: | 0.757 | 1 | −2 | −2 | dir 19: | 1.017 | 1 | −3 | −3 | dir 20: | 0.250 | 0 | 0 | 0 |
| dir 21: | 0.502 | 0 | −1 | 1 | dir 22: | 0.757 | 1 | −2 | 2 | dir 23: | 1.017 | 2 | −3 | 3 | carangle 22

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | −1 | 1 | 0 | dir 2: | 0.750 | −1 | 2 | 0 |
| dir 3: | 1.000 | −2 | 3 | 0 | dir 4: | 0.250 | 0 | 0 | 0 | dir 5: | 0.502 | −1 | 1 | 1 |
| dir 6: | 0.757 | −1 | 2 | 2 | dir 6: | 1.017 | −2 | 3 | 3 | dir 8: | 0.250 | 0 | 0 | 0 |
| dir 9: | 0.502 | −1 | 1 | −1 | dir 10: | 0.757 | −1 | 2 | −2 | dir 11: | 1.017 | −2 | 3 | −3 |
| dir 12: | 0.250 | 0 | 0 | 0 | dir 13: | 0.500 | 1 | −1 | 0 | dir 14: | 0.750 | 1 | −2 | 0 |
| dir 15: | 1 000 | 2 | −3 | 0 | dir 16: | 0.250 | 0 | 0 | 0 | dir 17: | 0.502 | 1 | −1 | −1 |
| dir 18: | 0.757 | 1 | −2 | −2 | dir 19: | 1.017 | 2 | −3 | −3 | dir 20: | 0.250 | 0 | 0 | 0 |
| dir 21: | 0.502 | 1 | −1 | 1 | dir 22: | 0.757 | 1 | −2 | 2 | dir 23: | 1.017 | 2 | −3 | 3 | carangle 23

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | −1 | 1 | 0 | dir 2: | 0.750 | −1 | 2 | 0 |
| dir 3: | 1.000 | −2 | 3 | 0 | dir 4: | 0.250 | 0 | 0 | 0 | dir 5: | 0.502 | −1 | 1 | 1 |
| dir 6: | 0.757 | −1 | 2 | 2 | dir 7: | 1.017 | −2 | 2 | 3 | dir 8: | 0.250 | 0 | 0 | 0 |
| dir 9: | 0.502 | −1 | 1 | −1 | dir 10: | 0.757 | −1 | 2 | −2 | dir 11: | 1.017 | −2 | 3 | −3 |
| dir 12: | 0.250 | 0 | 0 | 0 | dir 13: | 0.500 | 1 | −1 | 0 | dir 14: | 0.750 | 1 | −2 | 0 |
| dir 15: | 1.000 | 2 | −3 | 0 | dir 16: | 0.250 | 0 | 0 | 0 | dir 17: | 0.502 | 1 | −1 | −1 |
| dir 18: | 0.757 | 1 | −2 | −2 | dir 19: | 1.017 | 2 | −3 | −3 | dir 20: | 0.250 | 0 | 0 | 0 |
| dir 21: | 0.502 | 1 | −1 | 1 | dir 22: | 0.757 | 1 | −2 | 2 | dir 23: | 1.017 | 2 | −2 | 3 | carangle 24

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | −1 | 1 | 0 | dir 2: | 0.750 | −2 | 2 | 0 |
| dir 3: | 1.000 | −2 | 2 | 0 | dir 4: | 0.250 | 0 | 0 | 0 | dir 5: | 0.502 | −1 | 1 | 1 |
| dir 6: | 0.757 | −2 | 2 | 2 | dir 7: | 1.017 | −3 | 2 | 3 | dir 8: | 0.250 | 0 | 0 | 0 |
| dir 9: | 0.502 | −1 | 1 | −1 | dir 10: | 0.757 | −2 | 2 | −2 | dir 11: | 1.017 | −2 | 3 | −3 |
| dir 12: | 0.250 | 0 | 0 | 0 | dir 13: | 0.500 | 1 | −1 | 0 | dir 14: | 0.750 | 2 | −2 | 0 |
| dir 15: | 1.000 | 2 | −2 | 0 | dir 16: | 0.250 | 0 | 0 | 0 | dir 17: | 0.502 | 1 | −1 | −1 |
| dir 18: | 0.757 | 2 | −2 | −2 | dir 19: | 1.017 | 2 | −3 | −3 | dir 20: | 0.250 | 0 | 0 | 0 |
| dir 21: | 0.502 | 1 | −1 | 1 | dir 22: | 0.757 | 2 | −2 | 2 | dir 23: | 1.017 | 3 | −2 | 3 | carangle 25

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | −1 | 1 | 0 | dir 2: | 0.750 | −2 | 1 | 0 |
| dir 3: | 1.000 | −3 | 2 | 0 | dir 4: | 0.250 | 0 | 0 | 0 | dir 5: | 0.502 | −1 | 1 | 1 |
| dir 6: | 0.757 | −2 | 1 | 2 | dir 6: | 1.017 | −3 | 2 | 3 | dir 8: | 0.250 | 0 | 0 | 0 |
| dir 9: | 0.502 | −1 | 1 | −1 | dir 10: | 0.757 | −2 | 1 | −2 | dir 11: | 1.017 | −2 | 2 | −3 |
| dir 12: | 0.250 | 0 | 0 | 0 | dir 13: | 0.500 | 1 | −1 | 0 | dir 14: | 0.750 | 2 | −1 | 0 |
| dir 15: | 1.000 | 3 | −2 | 0 | dir 16: | 0.250 | 0 | 0 | 0 | dir 17: | 0.502 | 1 | −1 | −1 |
| dir 18: | 0.757 | 2 | −1 | −2 | dir 19: | 1.017 | 2 | −2 | −3 | dir 20: | 0.250 | 0 | 0 | 0 |
| dir 21: | 0.502 | 1 | −1 | 1 | dir 22: | 0.757 | 2 | −1 | 2 | dir 23: | 1.017 | 3 | −2 | 3 | carangle 26

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | −1 | 1 | 0 | dir 2: | 0.750 | −2 | 1 | 0 |
| dir 3: | 1.000 | −3 | 2 | 0 | dir 4: | 0.250 | 0 | 0 | 0 | dir 5: | 0.502 | −1 | 1 | 1 |
| dir 6: | 0.757 | −2 | 1 | 2 | dir 7: | 1.017 | −3 | 2 | 3 | dir 8: | 0.250 | 0 | 0 | 0 |
| dir 9: | 0.502 | −1 | 1 | −1 | dir 10: | 0.757 | −2 | 1 | −2 | dir 11: | 1.017 | −3 | 2 | −3 |
| dir 12: | 0.250 | 0 | 0 | 0 | dir 13: | 0.500 | 1 | −1 | 0 | dir 14: | 0.750 | 2 | −1 | 0 |
| dir 15: | 1.000 | 3 | −2 | 0 | dir 16: | 0.250 | 0 | 0 | 0 | dir 17: | 0.502 | 1 | −1 | −1 |
| dir 18: | 0.757 | 2 | −1 | −2 | dir 19: | 1.017 | 3 | −2 | −3 | dir 20: | 0.250 | 0 | 0 | 0 |
| dir 21: | 0.502 | 1 | −1 | 1 | dir 22: | 0.757 | 2 | −1 | 2 | dir 23: | 1.017 | 3 | −2 | 3 | carangle 27

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | −1 | 0 | 0 | dir 2: | 0.750 | −2 | 1 | 0 |
| dir 3: | 1.000 | −3 | 1 | 0 | dir 4: | 0.250 | 0 | 0 | 0 | dir 5: | 0.502 | −1 | 0 | 1 |
| dir 6: | 0.757 | −2 | 1 | 2 | dir 7: | 1.017 | −3 | 1 | 3 | dir 8: | 0.250 | 0 | 0 | 0 |
| dir 9: | 0.502 | −1 | 0 | −1 | dir 10: | 0.757 | −2 | 1 | −2 | dir 11: | 1.017 | −3 | 2 | −3 |
| dir 12: | 0.250 | 0 | 0 | 0 | dir 13: | 0.500 | 1 | 0 | 0 | dir 14: | 0.750 | 2 | −1 | 0 |
| dir 15: | 1.000 | 3 | −1 | 0 | dir 16: | 0.250 | 0 | 0 | 0 | dir 17: | 0.502 | 1 | 0 | −1 |
| dir 18: | 0.757 | 2 | −1 | −2 | dir 19: | 1.017 | 3 | −2 | −3 | dir 20: | 0.250 | 0 | 0 | 0 |
| dir 21: | 0.502 | 1 | 0 | 1 | dir 22: | 0.757 | 2 | −1 | 2 | dir 23: | 1.017 | 3 | −1 | 3 | carangle 28

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | −1 | 0 | 0 | dir 2: | 0.750 | −2 | 1 | 0 |
| dir 3: | 1.000 | −3 | 1 | 0 | dir 4: | 0.250 | 0 | 0 | 0 | dir 5: | 0.502 | −1 | 0 | 1 |
| dir 6: | 0.757 | −2 | 1 | 2 | dir 7: | 1.017 | −3 | 1 | 3 | dir 8: | 0.250 | 0 | 0 | 0 |
| dir 9: | 0.502 | −1 | 0 | −1 | dir 10: | 0.757 | −2 | 1 | −2 | dir 11: | 1.017 | −3 | 1 | −3 |
| dir 12: | 0.250 | 0 | 0 | 0 | dir 13: | 0.500 | 1 | 0 | 0 | dir 14: | 0.750 | 2 | −1 | 0 |
| dir 15: | 1.000 | 3 | −1 | 0 | dir 16: | 0.250 | 0 | 0 | 0 | dir 17: | 0.502 | 1 | 0 | −1 |
| dir 18: | 0.757 | 2 | −1 | −2 | dir 19: | 1.017 | 3 | −1 | −3 | dir 20: | 0.250 | 0 | 0 | 0 |
| dir 21: | 0.502 | 1 | 0 | 1 | dir 22: | 0.757 | 2 | −1 | 2 | dir 23: | 1.017 | 3 | −1 | 3 |

TABLE I-continued dir:dist dx dy dφ carangle 29

| | | | | | | | | | | | | | | |
|---|---|---|---|---|---|---|---|---|---|---|---|---|---|---|
| dir 0: | 0.250 | 0 | 0 | 0 | dir 1: | 0.500 | −1 | 0 | 0 | dir 2: | 0.750 | −2 | 0 | 0 |
| dir 3: | 1.000 | −3 | 1 | 0 | dir 4: | 0.250 | 0 | 0 | 0 | dir 5: | 0.502 | −1 | 0 | 1 |
| dir 6: | 0.757 | −2 | 0 | 2 | dir 7: | 1.017 | −3 | 0 | 3 | dir 8: | 0.250 | 0 | 0 | 0 |
| dir 9: | 0.502 | −1 | 0 | −1 | dir 10: | 0.757 | −2 | 0 | −2 | dir 11: | 1.017 | −3 | 1 | −3 |
| dir 12: | 0.250 | 0 | 0 | 0 | dir 13: | 0.500 | 1 | 0 | 0 | dir 14: | 0.750 | 2 | 0 | 0 |
| dir 15: | 1.000 | 3 | −1 | 0 | dir 16: | 0.250 | 0 | 0 | 0 | dir 17: | 0.502 | 1 | 0 | −1 |
| dir 18: | 0.757 | 2 | 0 | −2 | dir 19: | 1.017 | 3 | −1 | −3 | dir 20: | 0.250 | 0 | 0 | 0 |
| dir 21: | 0.502 | 1 | 0 | 1 | dir 22: | 0.757 | 2 | 0 | 2 | dir 23: | 1.017 | 3 | 0 | 3 | carangle 30

| | | | | | | | | | | | | | | |
|---|---|---|---|---|---|---|---|---|---|---|---|---|---|---|
| dir 0: | 0.250 | 0 | 0 | 0 | dir 1: | 0.500 | −1 | 0 | 0 | dir 2: | 0.750 | −2 | 0 | 0 |
| dir 3: | 1.000 | −3 | 0 | 0 | dir 4: | 0.250 | 0 | 0 | 0 | dir 5: | 0.502 | −1 | 0 | 1 |
| dir 6: | 0.757 | −2 | 0 | 2 | dir 7: | 1.017 | −3 | 0 | 3 | dir 8: | 0.250 | 0 | 0 | 0 |
| dir 9: | 0.502 | −1 | 0 | −1 | dir 10: | 0.757 | −2 | 0 | −2 | dir 11: | 1.017 | −3 | 1 | −3 |
| dir 12: | 0.250 | 0 | 0 | 0 | dir 13: | 0.500 | 1 | 0 | 0 | dir 14: | 0.750 | 2 | 0 | 0 |
| dir 15: | 1.000 | 3 | 0 | 0 | dir 16: | 0.250 | 0 | 0 | 0 | dir 17: | 0.502 | 1 | 0 | −1 |
| dir 18: | 0.757 | 2 | 0 | −2 | dir 19: | 1.017 | 3 | −1 | −3 | dir 20: | 0.250 | 0 | 0 | 0 |
| dir 21: | 0.502 | 1 | 0 | 1 | dir 22: | 0.757 | 2 | 0 | 2 | dir 23: | 1.017 | 3 | 0 | 3 | carangle 31

| | | | | | | | | | | | | | | |
|---|---|---|---|---|---|---|---|---|---|---|---|---|---|---|
| dir 0: | 0.250 | 0 | 0 | 0 | dir 1: | 0.500 | −1 | 0 | 0 | dir 2: | 0.750 | −2 | 0 | 0 |
| dir 3: | 1.000 | −3 | 0 | 0 | dir 4: | 0.250 | 0 | 0 | 0 | dir 5: | 0.502 | −1 | 0 | 1 |
| dir 6: | 0.757 | −2 | 0 | 2 | dir 7: | 1.017 | −4 | 0 | 3 | dir 8: | 0.250 | 0 | 0 | 0 |
| dir 9: | 0.502 | −1 | 0 | −1 | dir 10: | 0.757 | −2 | 0 | −2 | dir 11: | 1.017 | −3 | 0 | −3 |
| dir 12: | 0.250 | 0 | 0 | 0 | dir 13: | 0.500 | 1 | 0 | 0 | dir 14: | 0.750 | 2 | 0 | 0 |
| dir 15: | 1.000 | 3 | 0 | 0 | dir 16: | 0.250 | 0 | 0 | 0 | dir 17: | 0.502 | 1 | 0 | −1 |
| dir 18: | 0.757 | 2 | 0 | −2 | dir 19: | 1.017 | 3 | 0 | −3 | dir 20: | 0.250 | 0 | 0 | 0 |
| dir 21: | 0.502 | 1 | 0 | 1 | dir 22: | 0.757 | 2 | 0 | 2 | dir 23: | 1.017 | 4 | 0 | 3 | carangle 32

| | | | | | | | | | | | | | | |
|---|---|---|---|---|---|---|---|---|---|---|---|---|---|---|
| dir 0: | 0.250 | −1 | 0 | 0 | dir 1: | 0.500 | −2 | 0 | 0 | dir 2: | 0.750 | −3 | 0 | 0 |
| dir 3: | 1.000 | −4 | 0 | 0 | dir 4: | 0.250 | −1 | 0 | 0 | dir 5: | 0.502 | −2 | 0 | 1 |
| dir 6: | 0.757 | −3 | 0 | 2 | dir 7: | 1.017 | −4 | 0 | 3 | dir 8: | 0.250 | −1 | 0 | 0 |
| dir 9: | 0.502 | −2 | 0 | −1 | dir 10: | 0.757 | −3 | 0 | −2 | dir 11: | 1.017 | −4 | 0 | −3 |
| dir 12: | 0.250 | 1 | 0 | 0 | dir 13: | 0.500 | 2 | 0 | 0 | dir 14: | 0.750 | 3 | 0 | 0 |
| dir 15: | 1.000 | 4 | 0 | 0 | dir 16: | 0.250 | 1 | 0 | 0 | dir 17: | 0.502 | 2 | 0 | −1 |
| dir 18: | 0.757 | 3 | 0 | −2 | dir 19: | 1.017 | 4 | 0 | −3 | dir 20: | 0.250 | 1 | 0 | 0 |
| dir 21: | 0.502 | 2 | 0 | 1 | dir 22: | 0.757 | 3 | 0 | 2 | dir 23: | 1.017 | 4 | 0 | 3 | carangle 33

| | | | | | | | | | | | | | | |
|---|---|---|---|---|---|---|---|---|---|---|---|---|---|---|
| dir 0: | 0.250 | 0 | 0 | 0 | dir 1: | 0.500 | −1 | 0 | 0 | dir 2: | 0.750 | −2 | 0 | 0 |
| dir 3: | 1.000 | −3 | 0 | 0 | dir 4: | 0.250 | 0 | 0 | 0 | dir 5: | 0.502 | −1 | 0 | 1 |
| dir 6: | 0.757 | −2 | 0 | 2 | dir 7: | 1.017 | −3 | 0 | 3 | dir 8: | 0.250 | 0 | 0 | 0 |
| dir 9: | 0.502 | −1 | 0 | −1 | dir 10: | 0.757 | −2 | 0 | −2 | dir 11: | 1.017 | −4 | 0 | −3 |
| dir 12: | 0.250 | 0 | 0 | 0 | dir 13: | 0.500 | 1 | 0 | 0 | dir 14: | 0.750 | 2 | 0 | 0 |
| dir 15: | 1.000 | 3 | 0 | 0 | dir 16: | 0.250 | 0 | 0 | 0 | dir 17: | 0.502 | 1 | 0 | −1 |
| dir 18: | 0.757 | 2 | 0 | −2 | dir 19: | 1.017 | 4 | 0 | −3 | dir 20: | 0.250 | 0 | 0 | 0 |
| dir 21: | 0.502 | 1 | 0 | 1 | dir 22: | 0.757 | 2 | 0 | 2 | dir 23: | 1.017 | 3 | 0 | 3 | carangle 34

| | | | | | | | | | | | | | | |
|---|---|---|---|---|---|---|---|---|---|---|---|---|---|---|
| dir 0: | 0.250 | 0 | 0 | 0 | dir 1: | 0.500 | −1 | 0 | 0 | dir 2: | 0.750 | −2 | 0 | 0 |
| dir 3: | 1.000 | −3 | 0 | 0 | dir 4: | 0.250 | 0 | 0 | 0 | dir 5: | 0.502 | −1 | 0 | 1 |
| dir 6: | 0.757 | −2 | 0 | 2 | dir 7: | 1.017 | −3 | −1 | 3 | dir 8: | 0.250 | 0 | 0 | 0 |
| dir 9: | 0.502 | −1 | 0 | −1 | dir 10: | 0.757 | −2 | 0 | −2 | dir 11: | 1.017 | −3 | 0 | −3 |
| dir 12: | 0.250 | 0 | 0 | 0 | dir 13: | 0.500 | 1 | 0 | 0 | dir 14: | 0.750 | 2 | 0 | 0 |
| dir 15: | 1.000 | 3 | 0 | 0 | dir 16: | 0.250 | 0 | 0 | 0 | dir 17: | 0.502 | 1 | 0 | −1 |
| dir 18: | 0.757 | 2 | 0 | −2 | dir 19: | 1.017 | 3 | 0 | −3 | dir 20: | 0.250 | 0 | 0 | 0 |
| dir 21: | 0.502 | 1 | 0 | 1 | dir 22: | 0.757 | 2 | 0 | 2 | dir 23: | 1.017 | 3 | 1 | 3 | carangle 35

| | | | | | | | | | | | | | | |
|---|---|---|---|---|---|---|---|---|---|---|---|---|---|---|
| dir 0: | 0.250 | 0 | 0 | 0 | dir 1: | 0.500 | −1 | 0 | 0 | dir 2: | 0.750 | −2 | 0 | 0 |
| dir 3: | 1.000 | −3 | −1 | 0 | dir 4: | 0.250 | 0 | 0 | 0 | dir 5: | 0.502 | −1 | 0 | 1 |
| dir 6: | 0.757 | −2 | 0 | 2 | dir 7: | 1.017 | −3 | −1 | 3 | dir 8: | 0.250 | 0 | 0 | 0 |
| dir 9: | 0.502 | −1 | 0 | −1 | dir 10: | 0.757 | −2 | 0 | −2 | dir 11: | 1.017 | −3 | 0 | −3 |
| dir 12: | 0.250 | 0 | 0 | 0 | dir 13: | 0.500 | 1 | 0 | 0 | dir 14: | 0.750 | 2 | 0 | 0 |
| dir 15: | 1.000 | 3 | 1 | 0 | dir 16: | 0.250 | 0 | 0 | 0 | dir 17: | 0.502 | 1 | 0 | −1 |
| dir 18: | 0.757 | 2 | 0 | −2 | dir 19: | 1.017 | 3 | 0 | −3 | dir 20: | 0.250 | 0 | 0 | 0 |
| dir 21: | 0.502 | 1 | 0 | 1 | dir 22: | 0.757 | 2 | 0 | 2 | dir 23: | 1.017 | 3 | 1 | 3 | carangle 36

| | | | | | | | | | | | | | | |
|---|---|---|---|---|---|---|---|---|---|---|---|---|---|---|
| dir 0: | 0.250 | 0 | 0 | 0 | dir 1: | 0.500 | −1 | 0 | 0 | dir 2: | 0.750 | −2 | −1 | 0 |
| dir 3: | 1.000 | −3 | −1 | 0 | dir 4: | 0.250 | 0 | 0 | 0 | dir 5: | 0.502 | −1 | 0 | 1 |
| dir 6: | 0.757 | −2 | −1 | 2 | dir 7: | 1.017 | −3 | −1 | 3 | dir 8: | 0.250 | 0 | 0 | 0 |
| dir 9: | 0.502 | −1 | 0 | −1 | dir 10: | 0.757 | −2 | −1 | −2 | dir 11: | 1.017 | −3 | −1 | −3 |
| dir 12: | 0.250 | 0 | 0 | 0 | dir 13: | 0.500 | 1 | 0 | 0 | dir 14: | 0.750 | 2 | 1 | 0 |

TABLE I-continued dir:dist dx dy dφ

| | | | | | | | | | | | | | |
|---|---|---|---|---|---|---|---|---|---|---|---|---|---|
| dir 15: | 1.000 | 3 | 1 | 0 | dir 16: | 0.250 | 0 | 0 | 0 | dir 17: | 0.502 | 1 | 0 | -1 |
| dir 18: | 0.757 | 2 | 1 | -2 | dir 19: | 1.017 | 3 | 1 | -3 | dir 20: | 0.250 | 0 | 0 | 0 |
| dir 21: | 0.502 | 1 | 0 | 1 | dir 22: | 0.757 | 2 | 1 | 2 | dir 23: | 1.017 | 3 | 1 | 3 |
| carangle 37 | | | | | | | | | | | | | | |
| dir 0: | 0.250 | 0 | 0 | 0 | dir 1: | 0.500 | -1 | 0 | 0 | dir 2: | 0.750 | -2 | -1 | 0 |
| dir 3: | 1.000 | -3 | -1 | 0 | dir 4: | 0.250 | 0 | 0 | 0 | dir 5: | 0.502 | -1 | 0 | 1 |
| dir 6: | 0.757 | -2 | -1 | 2 | dir 7: | 1.017 | -3 | -2 | 3 | dir 8: | 0.250 | 0 | 0 | 0 |
| dir 9: | 0.502 | -1 | 0 | -1 | dir 10: | 0.757 | -2 | -1 | -2 | dir 31: | 1.017 | -3 | -1 | -3 |
| dir 12: | 0.250 | 0 | 0 | 0 | dir 13: | 0.500 | 1 | 0 | 0 | dir 14: | 0.750 | 2 | 1 | 0 |
| dir 15: | 1.000 | 3 | 1 | 0 | dir 16: | 0.250 | 0 | 0 | 0 | dir 17: | 0.502 | 1 | 0 | -1 |
| dir 18: | 0.757 | 2 | 1 | -2 | dir 19: | 1.017 | 3 | 1 | -3 | dir 20: | 0.250 | 0 | 0 | 0 |
| dir 21: | 0.502 | 1 | 0 | 1 | dir 22: | 0.757 | 2 | 1 | 2 | dir 23: | 1.017 | 3 | 2 | 3 |
| carangle 38 | | | | | | | | | | | | | | |
| dir 0: | 0.250 | 0 | 0 | 0 | dir 1: | 0.500 | -1 | -1 | 0 | dir 2: | 0.750 | -2 | -1 | 0 |
| dir 3: | 1.000 | -3 | -2 | 0 | dir 4: | 0.250 | 0 | 0 | 0 | dir 5: | 0.502 | -1 | -1 | 1 |
| dir 6: | 0.757 | -2 | -1 | 2 | dir 7: | 1.017 | -3 | -2 | 3 | dir 8: | 0.250 | 0 | 0 | 0 |
| dir 9: | 0.502 | -1 | -1 | -1 | dir 10: | 0.757 | -2 | -1 | -2 | dir 11: | 1.017 | -3 | -2 | -3 |
| dir 12: | 0.250 | 0 | 0 | 0 | dir 13: | 0.500 | 1 | 1 | 0 | dir 14: | 0.750 | 2 | 1 | 0 |
| dir 15: | 1.000 | 3 | 2 | 0 | dir 16: | 0.250 | 0 | 0 | 0 | dir 17: | 0.502 | 1 | 1 | -1 |
| dir 18: | 0.757 | 2 | 1 | -2 | dir 19: | 1.017 | 3 | 2 | -3 | dir 20: | 0.250 | 0 | 0 | 0 |
| dir 21: | 0.502 | 1 | 1 | 1 | dir 22: | 0.757 | 2 | 1 | 2 | dir 23: | 1.017 | 3 | 2 | 3 |
| carangle 39 | | | | | | | | | | | | | | |
| dir 0: | 0.250 | 0 | 0 | 0 | dir 1: | 0.500 | -1 | -1 | 0 | dir 2: | 0.750 | -2 | -1 | 0 |
| dir 3: | 1.000 | -3 | -2 | 0 | dir 4: | 0.250 | 0 | 0 | 0 | dir 5: | 0.502 | -1 | -1 | 1 |
| dir 6: | 0.757 | -2 | -1 | 2 | dir 7: | 1.017 | -2 | -2 | 3 | dir 8: | 0.250 | 0 | 0 | 0 |
| dir 9: | 0.502 | -1 | -1 | -1 | dir 10: | 0.757 | -2 | -1 | -2 | dir 11: | 1.017 | -3 | -2 | -3 |
| dir 12: | 0.250 | 0 | 0 | 0 | dir 13: | 0.500 | 1 | 1 | 0 | dir 14: | 0.750 | 2 | 1 | 0 |
| dir 15: | 1.000 | 3 | 2 | 0 | dir 16: | 0.250 | 0 | 0 | 0 | dir 17: | 0.502 | 1 | 1 | -1 |
| dir 18: | 0.757 | 2 | 1 | -2 | dir 19: | 1.017 | 3 | 2 | -3 | dir 20: | 0.250 | 0 | 0 | 0 |
| dir 21: | 0.502 | 1 | 1 | 1 | dir 22: | 0.757 | 2 | 1 | 2 | dir 23: | 1.017 | 2 | 2 | 3 |
| carangle 40 | | | | | | | | | | | | | | |
| dir 0: | 0.250 | 0 | 0 | 0 | dir 1: | 0.500 | -1 | -1 | 0 | dir 2: | 0.750 | -2 | -2 | 0 |
| dir 3: | 1.000 | -2 | -2 | 0 | dir 4: | 0.250 | 0 | 0 | 0 | dir 5: | 0.502 | -1 | -1 | 1 |
| dir 6: | 0.757 | -2 | -2 | 2 | dir 7: | 1.017 | -2 | -3 | 3 | dir 8: | 0.250 | 0 | 0 | 0 |
| dir 9: | 0.502 | -1 | -1 | -1 | dir 10: | 0.757 | -2 | -2 | -2 | dir 11: | 1.017 | -3 | -2 | -3 |
| dir 12: | 0.250 | 0 | 0 | 0 | dir 13: | 0.500 | 1 | 1 | 0 | dir 14: | 0.750 | 2 | 2 | 0 |
| dir 15: | 1.000 | 2 | 2 | 0 | dir 16: | 0.250 | 0 | 0 | 0 | dir 17: | 0.502 | 1 | 1 | -1 |
| dir 18: | 0.757 | 2 | 2 | -2 | dir 19: | 1.017 | 3 | 2 | -3 | dir 20: | 0.250 | 0 | 0 | 0 |
| dir 21: | 0.502 | 1 | 1 | 1 | dir 22: | 0.757 | 2 | 2 | 2 | dir 23: | 1.017 | 2 | 3 | 3 |
| carangle 41 | | | | | | | | | | | | | | |
| dir 0: | 0.250 | 0 | 0 | 0 | dir 1: | 0.500 | -1 | -1 | 0 | dir 2: | 0.750 | -1 | -2 | 0 |
| dir 3: | 1.000 | -2 | -3 | 0 | dir 4: | 0.250 | 0 | 0 | 0 | dir 5: | 0.502 | -1 | -1 | 1 |
| dir 6: | 0.757 | -1 | -2 | 2 | dir 7: | 1.017 | -2 | -3 | 3 | dir 8: | 0.250 | 0 | 0 | 0 |
| dir 9: | 0.502 | -1 | -1 | -1 | dir 10: | 0.757 | -1 | -2 | -2 | dir 11: | 1.017 | -2 | -2 | -3 |
| dir 12: | 0.250 | 0 | 0 | 0 | dir 13: | 0.500 | 1 | 1 | 0 | dir 14: | 0.750 | 1 | 2 | 0 |
| dir 15: | 1.000 | 2 | 3 | 0 | dir 16: | 0.250 | 0 | 0 | 0 | dir 17: | 0.502 | 1 | 1 | -1 |
| dir 18: | 0.757 | 1 | 2 | -2 | dir 19: | 1.017 | 2 | 2 | -3 | dir 20: | 0.250 | 0 | 0 | 0 |
| dir 21: | 0.502 | 1 | 1 | 1 | dir 22: | 0.757 | 1 | 2 | 2 | dir 23: | 1.017 | 2 | 3 | 3 |
| carangle 42 | | | | | | | | | | | | | | |
| dir 0: | 0.250 | 0 | 0 | 0 | dir 1: | 0.500 | -1 | -1 | 0 | dir 2: | 0.750 | -1 | -2 | 0 |
| dir 3: | 1.000 | -2 | -3 | 0 | dir 4: | 0.250 | 0 | 0 | 0 | dir 5: | 0.502 | -1 | -1 | 1 |
| dir 6: | 0.757 | -1 | -2 | 2 | dir 7: | 1.017 | -2 | -3 | 3 | dir 8: | 0.250 | 0 | 0 | 0 |
| dir 9: | 0.502 | -1 | -1 | -1 | dir 10: | 0.757 | -1 | -2 | -2 | dir 11: | 1.017 | -2 | -3 | -3 |
| dir 12: | 0.250 | 0 | 0 | 0 | dir 13: | 0.500 | 1 | 1 | 0 | dir 14: | 0.750 | 1 | 2 | 0 |
| dir 15: | 1.000 | 2 | 3 | 0 | dir 16: | 0.250 | 0 | 0 | 0 | dir 17: | 0.502 | 1 | 1 | -1 |
| dir 18: | 0.757 | 1 | 2 | -2 | dir 19: | 1.017 | 2 | 3 | -3 | dir 20: | 0.250 | 0 | 0 | 0 |
| dir 21: | 0.502 | 1 | 1 | 1 | dir 22: | 0.757 | 1 | 2 | 2 | dir 23: | 1.017 | 2 | 3 | 3 |
| carangle 43 | | | | | | | | | | | | | | |
| dir 0: | 0.250 | 0 | 0 | 0 | dir 1: | 0.500 | 0 | -1 | 0 | dir 2: | 0.750 | 1 | -2 | 0 |
| dir 3: | 1.000 | -1 | -3 | 0 | dir 4: | 0.250 | 0 | 0 | 0 | dir 5: | 0.502 | 0 | -1 | 1 |
| dir 6: | 0.757 | -1 | -2 | 2 | dir 7: | 1.017 | -1 | -3 | 3 | dir 8: | 0.250 | 0 | 0 | 0 |
| dir 9: | 0.502 | 0 | -1 | -1 | dir 10: | 0.757 | -1 | -2 | -2 | dir 11: | 1.017 | -2 | -3 | -3 |
| dir 12: | 0.250 | 0 | 0 | 0 | dir 13: | 0.500 | 0 | 1 | 0 | dir 14: | 0.750 | 1 | 2 | 0 |
| dir 15: | 1.000 | 1 | 3 | 0 | dir 16: | 0.250 | 0 | 0 | 0 | dir 17: | 0.502 | 0 | 1 | -1 |
| dir 18: | 0.757 | 1 | 2 | -2 | dir 19: | 1.017 | 2 | 3 | -3 | dir 20: | 0.250 | 0 | 0 | 0 |
| dir 21: | 0.502 | 0 | 1 | 1 | dir 22: | 0.757 | 1 | 2 | 2 | dir 23: | 1.017 | 1 | 3 | 3 |
| carangle 44 | | | | | | | | | | | | | | |
| dir 0: | 0.250 | 0 | 0 | 0 | dir 1: | 0.500 | 0 | -1 | 0 | dir 2: | 0.750 | -1 | -2 | 0 |
| dir 3: | 1.000 | -1 | -3 | 0 | dir 4: | 0.250 | 0 | 0 | 0 | dir 5: | 0.502 | 0 | -1 | 1 |

TABLE I-continued dir:dist dx dy dφ

| | | | | | | | | | | | | | |
|---|---|---|---|---|---|---|---|---|---|---|---|---|---|
| dir 6: | 0.757 | −1 | −2 | 2 | dir 7: | 1.017 | −1 | −3 | 3 | dir 8: | 0.250 | 0 | 0 | 0 |
| dir 9: | 0.502 | 0 | −1 | −1 | dir 10: | 0.757 | −1 | −2 | −2 | dir 11: | 1.017 | −1 | −3 | −3 |
| dir 12: | 0.250 | 0 | 0 | 0 | dir 13: | 0.500 | 0 | 1 | 0 | dir 14: | 0.750 | 1 | 2 | 0 |
| dir 15: | 1.000 | 1 | 3 | 0 | dir 16: | 0.250 | 0 | 0 | 0 | dir 17: | 0.502 | 0 | 1 | −1 |
| dir 18: | 0.757 | 1 | 2 | −2 | dir 19: | 1.017 | 1 | 3 | −3 | dir 20: | 0.250 | 0 | 0 | 0 |
| dir 21: | 0.502 | 0 | 1 | 1 | dir 22: | 0.757 | 1 | 2 | 2 | dir 23: | 1.017 | 1 | 3 | 3 | carangle 45

| | | | | | | | | | | | | | | |
|---|---|---|---|---|---|---|---|---|---|---|---|---|---|---|
| dir 0: | 0.250 | 0 | 0 | 0 | dir 1: | 0.500 | 0 | −1 | 0 | dir 2: | 0.750 | 0 | −2 | 0 |
| dir 3: | 1.000 | −1 | −3 | 0 | dir 4: | 0.250 | 0 | 0 | 0 | dir 5: | 0.502 | 0 | −1 | 1 |
| dir 6: | 0.757 | 0 | −2 | 2 | dir 7: | 1.017 | 0 | −3 | 3 | dir 8: | 0.250 | 0 | 0 | 0 |
| dir 9: | 0.502 | 0 | −1 | −1 | dir 10: | 0.757 | 0 | −2 | −2 | dir 11: | 1.017 | −1 | −3 | −3 |
| dir 12: | 0.250 | 0 | 0 | 0 | dir 13: | 0.500 | 0 | 1 | 0 | dir 14: | 0.750 | 0 | 2 | 0 |
| dir 15: | 1.000 | 1 | 3 | 0 | dir 16: | 0.250 | 0 | 0 | 0 | dir 17: | 0.502 | 0 | 1 | −1 |
| dir 18: | 0.757 | 0 | 2 | −2 | dir 19: | 1.017 | 1 | 3 | −3 | dir 20: | 0.250 | 0 | 0 | 0 |
| dir 21: | 0.502 | 0 | 1 | 1 | dir 22: | 0.757 | 0 | 2 | 2 | dir 23: | 1.017 | 0 | 3 | 3 | carangle 46

| | | | | | | | | | | | | | | |
|---|---|---|---|---|---|---|---|---|---|---|---|---|---|---|
| dir 0: | 0.250 | 0 | 0 | 0 | dir 1: | 0.500 | 0 | −1 | 0 | dir 2: | 0.750 | 0 | −2 | 0 |
| dir 3: | 1.000 | 0 | −3 | 0 | dir 4: | 0.250 | 0 | 0 | 0 | dir 5: | 0.502 | 0 | −1 | 1 |
| dir 6: | 0.757 | 0 | −2 | 2 | dir 7: | 1.017 | 0 | −3 | 3 | dir 8: | 0.250 | 0 | 0 | 0 |
| dir 9: | 0.502 | 0 | −1 | −1 | dir 10: | 0.757 | 0 | −2 | −2 | dir 11: | 1.017 | −1 | −3 | −3 |
| dir 12: | 0.250 | 0 | 0 | 0 | dir 13: | 0.500 | 0 | 1 | 0 | dir 14: | 0.750 | 0 | 2 | 0 |
| dir 15: | 1.000 | 0 | 3 | 0 | dir 16: | 0.250 | 0 | 0 | 0 | dir 17: | 0.502 | 0 | 1 | −1 |
| dir 18: | 0.757 | 0 | 2 | −2 | dir 19: | 1.017 | 1 | 3 | −3 | dir 20: | 0.250 | 0 | 0 | 0 |
| dir 21: | 0.502 | 0 | 1 | 1 | dir 22: | 0.757 | 0 | 2 | 2 | dir 23: | 1.017 | 0 | 3 | 3 | carangle 47

| | | | | | | | | | | | | | | |
|---|---|---|---|---|---|---|---|---|---|---|---|---|---|---|
| dir 0: | 0.250 | 0 | 0 | 0 | dir 1: | 0.500 | 0 | −1 | 0 | dir 2: | 0.750 | 0 | −2 | 0 |
| dir 3: | 1.000 | 0 | −3 | 0 | dir 4: | 0.250 | 0 | 0 | 0 | dir 5: | 0.502 | 0 | −1 | 1 |
| dir 6: | 0.757 | 0 | −2 | 2 | dir 7: | 1.017 | 0 | −4 | 3 | dir 8: | 0.250 | 0 | 0 | 0 |
| dir 9: | 0.502 | 0 | −1 | −1 | dir 10: | 0.757 | 0 | −2 | −2 | dir 11: | 1.017 | 0 | −3 | −3 |
| dir 12: | 0.250 | 0 | 0 | 0 | dir 13: | 0.500 | 0 | 1 | 0 | dir 14: | 0.750 | 0 | 2 | 0 |
| dir 15: | 1.000 | 0 | 3 | 0 | dir 16: | 0.250 | 0 | 0 | 0 | dir 17: | 0.502 | 0 | 1 | −1 |
| dir 18: | 0.757 | 0 | 2 | −2 | dir 19: | 1.017 | 0 | 3 | −3 | dir 20: | 0.250 | 0 | 0 | 0 |
| dir 21: | 0.502 | 0 | 1 | 1 | dir 22: | 0.757 | 0 | 2 | 2 | dir 23: | 1.017 | 0 | 4 | 3 | carangle 48

| | | | | | | | | | | | | | | |
|---|---|---|---|---|---|---|---|---|---|---|---|---|---|---|
| dir 0: | 0.250 | 0 | −1 | 0 | dir 1: | 0.500 | 0 | −2 | 0 | dir 2: | 0.750 | 0 | −3 | 0 |
| dir 3: | 1.000 | 0 | −4 | 0 | dir 4: | 0.250 | 0 | 4 | 0 | dir 5: | 0.502 | 0 | −2 | 1 |
| dir 6: | 0.757 | 0 | −3 | 2 | dir 7: | 1.017 | 0 | −4 | 3 | dir 8: | 0.250 | 0 | −1 | 0 |
| dir 9: | 0.502 | 0 | −2 | −1 | dir 10: | 0.757 | 0 | −3 | −2 | dir 11: | 1.017 | 0 | −4 | −3 |
| dir 12: | 0.250 | 0 | 1 | 0 | dir 13: | 0.500 | 0 | 2 | 0 | dir 14: | 0.750 | 0 | 3 | 0 |
| dir 15: | 1.000 | 0 | 4 | 0 | dir 16: | 0.250 | 0 | 1 | 0 | dir 17: | 0.502 | 0 | 2 | 1 |
| dir 18: | 0.757 | 0 | 3 | −2 | dir 19: | 1.017 | 0 | 4 | −3 | dir 20: | 0.250 | 0 | 1 | 0 |
| dir 21: | 0.502 | 0 | 2 | 1 | dir 22: | 0.757 | 0 | 3 | 2 | dir 23: | 1.017 | 0 | 4 | 3 | carangle 49

| | | | | | | | | | | | | | | |
|---|---|---|---|---|---|---|---|---|---|---|---|---|---|---|
| dir 0: | 0.250 | 0 | 0 | 0 | dir 1: | 0.500 | 0 | −1 | 0 | dir 2: | 0.750 | 0 | −2 | 0 |
| dir 3: | 1.000 | 0 | −3 | 0 | dir 4: | 0.250 | 0 | 0 | 0 | dir 5: | 0.502 | 0 | −1 | 1 |
| dir 6: | 0.757 | 0 | −2 | 2 | dir 7: | 1.017 | 0 | −3 | 3 | dir 8: | 0.250 | 0 | 0 | 0 |
| dir 9: | 0.502 | 0 | −1 | −1 | dir 10: | 0.757 | 0 | −2 | −2 | dir 11: | 1.017 | 0 | −4 | −3 |
| dir 12: | 0.250 | 0 | 0 | 0 | dir 13: | 0.500 | 0 | 1 | 0 | dir 14: | 0.750 | 0 | 2 | 0 |
| dir 15: | 1.000 | 0 | 3 | 0 | dir 16: | 0.250 | 0 | 0 | 0 | dir 17: | 0.502 | 0 | 1 | −1 |
| dir 18: | 0.757 | 0 | 2 | −2 | dir 19: | 1.017 | 0 | 4 | −3 | dir 20: | 0.250 | 0 | 0 | 0 |
| dir 21: | 0.502 | 0 | 1 | 1 | dir 22: | 0.757 | 0 | 2 | 2 | dir 23: | 1.017 | 0 | 3 | 3 | carangle 50

| | | | | | | | | | | | | | | |
|---|---|---|---|---|---|---|---|---|---|---|---|---|---|---|
| dir 0: | 0.250 | 0 | 0 | 0 | dir 1: | 0.500 | 0 | −1 | 0 | dir 2: | 0.750 | 0 | −2 | 0 |
| dir 3: | 1.000 | 0 | −3 | 0 | dir 4: | 0.250 | 0 | 0 | 0 | dir 5: | 0.502 | 0 | −1 | 1 |
| dir 6: | 0.757 | 0 | −2 | 2 | dir 7: | 1.017 | 1 | −3 | 3 | dir 8: | 0.250 | 0 | 0 | 0 |
| dir 9: | 0.502 | 0 | −1 | −1 | dir 10: | 0.757 | 0 | −2 | −2 | dir 11: | 1.017 | 0 | −3 | −3 |
| dir 12: | 0.250 | 0 | 0 | 0 | dir 13: | 0.500 | 0 | 1 | 0 | dir 14: | 0.750 | 0 | 2 | 0 |
| dir 15: | 1.000 | 0 | 3 | 0 | dir 16: | 0.250 | 0 | 0 | 0 | dir 17: | 0.502 | 0 | 1 | −1 |
| dir 18: | 0.757 | 0 | 2 | −2 | dir 19: | 1.017 | 0 | 3 | −3 | dir 20: | 0.250 | 0 | 0 | 0 |
| dir 21: | 0.502 | 0 | 1 | 1 | dir 22: | 0.757 | 0 | 2 | 2 | dir 23: | 1.017 | −1 | 3 | 3 | carangle 51

| | | | | | | | | | | | | | | |
|---|---|---|---|---|---|---|---|---|---|---|---|---|---|---|
| dir 0: | 0.250 | 0 | 0 | 0 | dir 2: | 0.500 | 0 | −1 | 0. | dir 2: | 0.750 | 0 | −2 | 0 |
| dir 3: | 1.000 | 1 | −3 | 0 | dir 4: | 0.250 | 0 | 0 | 0 | dir 5: | 0.502 | 0 | −1 | 1 |
| dir 6: | 0.757 | 0 | −2 | 2 | dir 7: | 1.017 | 1 | −3 | 3 | dir 8: | 0.250 | 0 | 0 | 0 |
| dir 9: | 0.502 | 0 | −1 | −1 | dir 10: | 0.757 | 0 | −2 | −2 | dir 11: | 1.017 | 0 | −3 | −3 |
| dir 12: | 0.250 | 0 | 0 | 0 | dir 13: | 0.500 | 0 | 1 | 0 | dir 14: | 0.750 | 0 | 2 | 0 |
| dir 15: | 1.000 | −1 | 3 | 0 | dir 16: | 0.250 | 0 | 0 | 0 | dir 17: | 0.502 | 0 | 1 | −1 |
| dir 18: | 0.757 | 0 | 2 | −2 | dir 19: | 1.017 | 0 | 3 | −3 | dir 20: | 0.250 | 0 | 0 | 0 |
| dir 21: | 0.502 | 0 | 1 | 1 | dir 22: | 0.757 | 0 | 2 | 2 | dir 23: | 1.017 | −1 | 3 | 3 |

TABLE I-continued dir:dist dx dy dφ carangle 52

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | 0 | −1 | 0 | dir 2: | 0.750 | 1 | −2 | 0 |
| dir 3: | 1.000 | 1 | −3 | 0 | dir 4: | 0.250 | 0 | 0 | 0 | dir 5: | 0.502 | 0 | −1 | 1 |
| dir 6: | 0.757 | 1 | −2 | 2 | dir 7: | 1.017 | 1 | −3 | 3 | dir 8: | 0.250 | 0 | 0 | 0 |
| dir 9: | 0.502 | 0 | −1 | −1 | dir 10: | 0.757 | 1 | −2 | −2 | dir 11: | 1.017 | 1 | −3 | −3 |
| dir 12: | 0.250 | 0 | 0 | 0 | dir 13: | 0.500 | 0 | 1 | 0 | dir 14: | 0.750 | −1 | 2 | 0 |
| dir 15: | 1.000 | −1 | 3 | 0 | dir 16: | 0.250 | 0 | 0 | 0 | dir 17: | 0.502 | 0 | 1 | −1 |
| dir 18: | 0.757 | −1 | 2 | −2 | dir 19: | 1.017 | −1 | 3 | −3 | dir 20: | 0.250 | 0 | 0 | 0 |
| dir 21: | 0.502 | 0 | 1 | 1 | dir 22: | 0.757 | −1 | 2 | 2 | dir 23: | 1.017 | −1 | 3 | 3 | carangle 53

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | 0 | −1 | 0 | dir 2: | 0.750 | 1 | −2 | 0 |
| dir 3: | 1.000 | 1 | −3 | 0 | dir 4: | 0.250 | 0 | 0 | 0 | dir 5: | 0.502 | 0 | −1 | 1 |
| dir 6: | 0.757 | 1 | −2 | 2 | dir 7: | 1.017 | 2 | −3 | 3 | dir 8: | 0.250 | 0 | 0 | 0 |
| dir 9: | 0.502 | 0 | −1 | −1 | dir 10: | 0.757 | 1 | −2 | −2 | dir 11: | 1.017 | 1 | −3 | −3 |
| dir 12: | 0.250 | 0 | 0 | 0 | dir 13: | 0.500 | 0 | 1 | 0 | dir 14: | 0.750 | −1 | 2 | 0 |
| dir 15: | 1.000 | −1 | 3 | 0 | dir 16: | 0.250 | 0 | 0 | 0 | dir 17: | 0.502 | 0 | 1 | −1 |
| dir 18: | 0.757 | −1 | 2 | −2 | dir 19: | 1.017 | −1 | 3 | −3 | dir 20: | 0.250 | 0 | 0 | 0 |
| dir 21: | 0.502 | 0 | 1 | 1 | dir 22: | 0.757 | −1 | 2 | 2 | dir 23: | 1.017 | −2 | 3 | 3 | carangle 54

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | 1 | −1 | 0 | dir 2: | 0.750 | 1 | −2 | 0 |
| dir 3: | 1.000 | 2 | −3 | 0 | dir 4: | 0.250 | 0 | 0 | 0 | dir 5: | 0.502 | 1 | −1 | 1 |
| dir 6: | 0.757 | 1 | −2 | 2 | dir 7: | 1.017 | 2 | −3 | 3 | dir 8: | 0.250 | 0 | 0 | 0 |
| dir 9: | 0.502 | 1 | −1 | −1 | dir 10: | 0.757 | 1 | −2 | −2 | dir 11: | 1.017 | 2 | −3 | −3 |
| dir 12: | 0.250 | 0 | 0 | 0 | dir 13: | 0.500 | −1 | 1 | 0 | dir 14: | 0.750 | −1 | 2 | 0 |
| dir 15: | 1.000 | −2 | 3 | 0 | dir 16: | 0.250 | 0 | 0 | 0 | dir 17: | 0.502 | −1 | 1 | −1 |
| dir 18: | 0.757 | −1 | 2 | −2 | dir 19: | 1.017 | −2 | 3 | −3 | dir 20: | 0.250 | 0 | 0 | 0 |
| dir 21: | 0.502 | −1 | 1 | 1 | dir 22: | 0.757 | −1 | 2 | 2 | dir 23: | 1.017 | −2 | 3 | 3 | carangle 55

| | | | | | | | | | | | | | | | |
|---|---|---|---|---|---|---|---|---|---|---|---|---|---|---|---|
| dir 0: | 0.250 | 0 | 6 | 0 | dir 1: | 0.500 | 1 | −1 | 0 | dir 2: | 0.750 | 1 | −2 | 0 |
| dir 3: | 1.000 | 2 | −3 | 0 | dir 4: | 0.250 | 0 | 0 | 0 | dir 5: | 0.502 | 1 | −1 | 1 |
| dir 6: | 0.757 | 1 | −2 | 2 | dir 7: | 1.017 | 2 | −2 | 3 | dir 8: | 0.250 | 0 | 0 | 0 |
| dir 9: | 0.502 | 1 | −1 | −1 | dir 10: | 0.757 | 1 | −2 | −2 | dir 11: | 1.017 | 2 | −3 | −3 |
| dir 12: | 0.250 | 0 | 0 | 0 | dir 13: | 0.500 | −1 | 1 | 0 | dir 14: | 0.750 | −1 | 2 | 0 |
| dir 15: | 1.000 | −2 | 3 | 0 | dir 16: | 0.250 | 0 | 0 | 0 | dir 17: | 0.502 | −1 | 1 | −1 |
| dir 18: | 0.757 | −1 | 2 | −2 | dir 19: | 1.017 | −2 | 3 | −3 | dir 20: | 0.250 | 0 | 0 | 0 |
| dir 21: | 0.502 | −1 | 1 | 1 | dir 22: | 0.757 | −1 | 2 | 2 | dir 23: | 1.017 | −2 | 2 | 3 | carangle 56

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | 1 | −1 | 0 | dir 2: | 0.750 | 2 | −2 | 0 |
| dir 3: | 1.000 | 2 | −2 | 0 | dir 4: | 0.250 | 0 | 0 | 0 | dir 5: | 0.502 | 1 | −1 | 1 |
| dir 6: | 0.757 | 2 | −2 | 2 | dir 7: | 1.017 | 3 | −2 | 3 | dir 8: | 0.250 | 0 | 0 | 0 |
| dir 9: | 0.502 | 1 | −1 | −1 | dir 10: | 0.757 | 2 | −2 | −2 | dir 11: | 1.017 | 2 | −3 | −3 |
| dir 12: | 0.250 | 0 | 0 | 0 | dir 13: | 0.500 | −1 | 1 | 0 | dir 14: | 0.750 | −2 | 2 | 0 |
| dir 15: | 1.000 | −2 | 2 | 0 | dir 16: | 0.250 | 0 | 0 | 0 | dir 17: | 0.502 | −1 | 1 | −1 |
| dir 18: | 0.757 | −2 | 2 | −2 | dir 19: | 1.017 | −2 | 3 | −3 | dir 20: | 0.250 | 0 | 0 | 0 |
| dir 21: | 0.502 | −1 | 1 | 1 | dir 22: | 0.757 | −2 | 2 | 2 | dir 23: | 1.017 | −3 | 2 | 3 | carangle 57

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | 1 | −1 | 0 | dir 2: | 0.750 | 2 | −1 | 0 |
| dir 3: | 1.000 | 3 | −2 | 0 | dir 4: | 0.250 | 0 | 0 | 0 | dir 5: | 0.502 | 1 | −1 | 1 |
| dir 6: | 0.757 | 2 | −1 | 2 | dir 7: | 1.017 | 3 | −2 | 3 | dir 8: | 0.250 | 0 | 0 | 0 |
| dir 9: | 0.502 | 1 | −1 | −1 | dir 10: | 0.757 | 2 | −1 | −2 | dir 11: | 1.017 | 2 | −2 | −3 |
| dir 12: | 0.250 | 0 | 0 | 0 | dir 13: | 0.500 | −1 | 1 | 0 | dir 14: | 0.750 | −2 | 1 | 0 |
| dir 15: | 1.000 | −3 | 2 | 0 | dir 16: | 0.250 | 0 | 0 | 0 | dir 17: | 0.502 | −1 | 1 | −1 |
| dir 18: | 0.757 | −2 | 1 | −2 | dir 19: | 1.017 | −2 | 2 | −3 | dir 20: | 0.250 | 0 | 0 | 0 |
| dir 21: | 0.502 | −1 | 1 | 1 | dir 22: | 0.757 | −2 | 1 | 2 | dir 23: | 1.017 | −3 | 2 | 3 | carangle 58

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | 1 | −1 | 0 | dir 2: | 0.750 | 2 | −1 | 0 |
| dir 3: | 1.000 | 3 | −2 | 0 | dir 4: | 0.250 | 0 | 0 | 0 | dir 5: | 0.502 | 1 | −1 | 1 |
| dir 6: | 0.757 | 2 | −1 | 2 | dir 7: | 1.017 | 3 | −2 | 3 | dir 8: | 0.250 | 0 | 0 | 0 |
| dir 9: | 0.502 | 1 | −1 | −1 | dir 10: | 0.757 | 2 | −1 | −2 | dir 11: | 1.017 | 3 | −2 | −3 |
| dir 12: | 0.250 | 0 | 0 | 0 | dir 13: | 0.500 | −1 | 1 | 0 | dir 14: | 0.750 | −2 | 1 | 0 |
| dir 15: | 1.000 | −3 | 2 | 0 | dir 16: | 0.250 | 0 | 0 | 0 | dir 17: | 0.502 | −1 | 1 | −1 |
| dir 18: | 0.757 | −2 | 1 | −2 | dir 19: | 1.017 | −3 | 2 | −3 | dir 20: | 0.250 | 0 | 0 | 0 |
| dir 21: | 0.502 | −1 | 1 | 1 | dir 22: | 0.757 | −2 | 1 | 2 | dir 23: | 1.017 | −3 | 2 | 3 | carangle 59

| | | | | | | | | | | | | | | | |
|---|---|---|---|---|---|---|---|---|---|---|---|---|---|---|---|
| dir 0: | 0.250 | 0 | 0 | 0 | dir 1: | 0.500 | 1 | 0 | 0 | dir 2: | 0.750 | 2 | −1 | 0 |
| dir 3: | 1.000 | 3 | −1 | 0 | dir 4: | 0.250 | 0 | 0 | 0 | dir 5: | 0.502 | 1 | 0 | 1 |
| dir 6: | 0.757 | 2 | −1 | 2 | dir 7: | 1.017 | 3 | −1 | 3 | dir 8: | 0.250 | 0 | 0 | 0 |
| dir 9: | 0.502 | 1 | 0 | −1 | dir 10: | 0.757 | 2 | −1 | −2 | dir 11: | 1.017 | 3 | −2 | −3 |
| dir 12: | 0.250 | 0 | 0 | 0 | dir 13: | 0.500 | −1 | 0 | 0 | dir 14: | 0.750 | −2 | 1 | 0 |

TABLE I-continued dir:dist dx dy dφ

| | | | | | | | | | | | | | | |
|---|---|---|---|---|---|---|---|---|---|---|---|---|---|---|
| dir 15: | 1.000 | −3 | 1 | 0 | dir 16: | 0.250 | 0 | 0 | 0 | dir 17: | 0.502 | −1 | 0 | −1 |
| dir 18: | 0.757 | −2 | 1 | −2 | dir 19: | 1.017 | −3 | 2 | −3 | dir 20: | 0.250 | 0 | 0 | 0 |
| dir 21: | 0.502 | −1 | 0 | 1 | dir 22: | 0.757 | −2 | 1 | 2 | dir 23: | 1.017 | −3 | 1 | 3 |
| carangle 60 | | | | | | | | | | | | | | |
| dir 0: | 0.250 | 0 | 0 | 0 | dir 1: | 0.500 | 1 | 0 | 0 | dir 2: | 0.750 | 2 | −1 | 0 |
| dir 3: | 1.000 | 3 | −1 | 0 | dir 4: | 0.250 | 0 | 0 | 0 | dir 5: | 0.502 | 1 | 0 | 1 |
| dir 6: | 0.757 | 2 | −1 | 2 | dir 7: | 1.017 | 3 | −1 | 3 | dir 8: | 0.250 | 0 | 0 | 0 |
| dir 9: | 0.502 | 1 | 0 | −1 | dir 10: | 0.757 | 2 | −1 | −2 | dir 11: | 1.017 | 3 | −1 | 0 |
| dir 12: | 0.250 | 0 | 0 | 0 | dir 13: | 0.500 | −1 | 0 | 0 | dir 14: | 0.750 | −2 | 1 | 0 |
| dir 15: | 1.000 | −3 | 1 | 0 | dir 16: | 0.250 | 0 | 0 | 0 | dir 17: | 0.502 | −1 | 0 | −1 |
| dir 18: | 0.757 | −2 | 1 | −2 | dir 19: | 1.017 | −3 | 1 | −3 | dir 20: | 0.250 | 0 | 0 | 0 |
| dir 21: | 0.502 | −1 | 0 | 1 | dir 22: | 0.757 | −2 | 1 | 2 | dir 23: | 1.017 | −3 | 1 | 3 |
| carangle 61 | | | | | | | | | | | | | | |
| dir 0: | 0.250 | 0 | 0 | 0 | dir 1: | 0.500 | 1 | 0 | 0 | dir 2: | 0.750 | 2 | 0 | 0 |
| dir 3: | 1.000 | 3 | −1 | 0 | dir 4: | 0.250 | 0 | 0 | 0 | dir 5: | 0.502 | 1 | 0 | 1 |
| dir 6: | 0.757 | 2 | 0 | 2 | dir 7: | 1.017 | 3 | 0 | 3 | dir 8: | 0.250 | 0 | 0 | 0 |
| dir 9: | 0.502 | 1 | 0 | −1 | dir 10: | 0.757 | 2 | 0 | −2 | dir 11: | 1.017 | 3 | −1 | −3 |
| dir 12: | 0.250 | 0 | 0 | 0 | dir 13: | 0.500 | −1 | 0 | 0 | dir 14: | 0.750 | −2 | 0 | 0 |
| dir 15: | 1.000 | −3 | 1 | 0 | dir 16: | 0.250 | 0 | 0 | 0 | dir 17: | 0.502 | −1 | 0 | −1 |
| dir 18: | 0.757 | −2 | 0 | −2 | dir 19: | 1.017 | −3 | 1 | −3 | dir 20: | 0.250 | 0 | 0 | 0 |
| dir 21: | 0.502 | −1 | 0 | 1 | dir 22: | 0.757 | −2 | 0 | 2 | dir 23: | 1.017 | −3 | 0 | 3 |
| carangle 62 | | | | | | | | | | | | | | |
| dir 0: | 0.250 | 0 | 0 | 0 | dir 1: | 0.500 | 1 | 0 | 0 | dir 2: | 0.750 | 2 | 0 | 0 |
| dir 3: | 1.000 | 3 | 0 | 0 | dir 4: | 0.250 | 0 | 0 | 0 | dir 5: | 0.502 | 1 | 0 | 1 |
| dir 6: | 0.757 | 2 | 0 | 2 | dir 7: | 1.017 | 3 | 0 | 3 | dir 8: | 0.250 | 0 | 0 | 0 |
| dir 9: | 0.502 | 1 | 0 | −1 | dir 10: | 0.757 | 2 | 0 | −2 | dir 11: | 1.017 | 3 | −1 | −3 |
| dir 12: | 0.250 | 0 | 0 | 0 | dir 13: | 0.500 | −1 | 0 | 0 | dir 14: | 0.750 | −2 | 0 | 0 |
| dir 15: | 1.000 | −3 | 0 | 0 | dir 16: | 0.250 | 0 | 0 | 0 | dir 17: | 0.502 | −1 | 0 | −1 |
| dir 18: | 0.757 | −2 | 0 | −2 | dir 19: | 1.017 | −3 | 1 | −3 | dir 20: | 0.250 | 0 | 0 | 0 |
| dir 21: | 0.502 | −1 | 0 | 1 | dir 22: | 0.757 | −2 | 0 | 2 | dir 23: | 1.017 | −3 | 0 | 3 |
| carangle 63 | | | | | | | | | | | | | | |
| dir 0: | 0.250 | 0 | 0 | 0 | dir 1: | 0.500 | 1 | 0 | 0 | dir 2: | 0.750 | 2 | 0 | 0 |
| dir 3: | 1.000 | 3 | 0 | 0 | dir 4: | 0.250 | 0 | 0 | 0 | dir 5: | 0.502 | 1 | 0 | 1 |
| dir 6: | 0.757 | 2 | 0 | 2 | dir 7: | 1.017 | 4 | 0 | 3 | dir 8: | 0.250 | 0 | 0 | 0 |
| dir 9: | 0.502 | 1 | 0 | −1 | dir 10: | 0.757 | 2 | 0 | −2 | dir 11: | 1.017 | 3 | 0 | −3 |
| dir 12: | 0.250 | 0 | 0 | 0 | dir 13: | 0.500 | −1 | 0 | 0 | dir 14: | 0.750 | −2 | 0 | 0 |
| dir 15: | 1.000 | −3 | 0 | 0 | dir 16: | 0.250 | 0 | 0 | 0 | dir 17: | 0.502 | −1 | 0 | −1 |
| dir 18: | 0.757 | −2 | 0 | −2 | dir 19: | 1.017 | −3 | 0 | −3 | dir 20: | 0.250 | 0 | 0 | 0 |
| dir 21: | 0.502 | −1 | 0 | 1 | dir 22: | 0.757 | −2 | 0 | 2 | dir 23: | 1.017 | −4 | 0 | 3 |

APPENDIX A

```
/* printout of file: bud.c */
/***************************************/ include <stdio.h>
include <math.h>
#include "defines.h"
include "externs.h"
#define SUCCESSFUL TRUE
#define FAIL FALSE
#define cost(n)              configspace[(n).z][(n).x][(n).y].cost_to_goal
#define copy(i,j)            { tree[j] = tree[i]; j = i; }
#define finish(h)            { tree[h] = *picked_node; return(SUCCESSFUL); }
#define TREESIZE             MAXHEAP
#define FINISHED 0
#define BUSY     1
/*#define STOPPINGCGND*/
int supercounter;

XYNODE tree[TREESIZE], tmp;
int unusednodes = 1;

HEAPNODE perimeter[MAXPERIM+1];  /* heap uses locations 1-> MAXHEAP */
                                  /* location 0 isn't used to hasten indexing */ int perim;

static int bottom_of_heap;

static int budcounter;

static int neighbornode;

add_to_tree(p)
XYNODE p;
{
    register float new_child_cost;
    register int child, parent;
#ifdef DEBUG
    if ((p.x < 0) !! (p.y < 0) !! (p.z < 0) !!
        (p.x >= XSIZE) !! (p.y >= YSIZE) !! (p.z >= CPLANES))
    {
        printf("ERROR adding bad state: %d,%d,%d0:p.x,p.y,p.z);
    }
endif
    if ((child = unusednodes++) >= TREESIZE)
    {
        printf("PANIC: bottom of heap reached at %d,0,TREESIZE);
        exit(0);
    }
                        1
```

```
                new_child_cost = cost(p);  /* node cost we're putting in*/
        while((parent = (child/2)) && (cost(tree[parent]) > new_child_cost))
                copy(parent,child);

tree[child] = p; /* put the child into the open node */
} delete_from_tree(p)
XYNODE *p;
{
        register hole, rchild, lchild;
        register XYNODE *picked_node;
        register float picked_node_cost, leftchild_val, rightchild_val;

if (unusednodes == 1)
        {
                /*printf("end of tree0);*/
                return(NULL);  /* there are no items in tree */
        }

*p = tree[1];

picked_node = &tree[--unusednodes];
        picked_node_cost = cost(*picked_node);
        hole = 1;

for (;;)
        {
                /* keep moving down with the smaller of the 2 children */
                /* until at bottom edge of tree */ if ((rchild = (lchild = hole << 1) | 1) >= unusednodes)
                {
                        if (rchild == unusednodes &&
                                (cost(tree[lchild]) < picked_node_cost))
                                        copy(lchild,hole);

finish(hole);
                        /* at right place or at bottom -> fill hole */
                } leftchild_val = cost(tree[lchild]);
                rightchild_val = cost(tree[rchild]);

if (rightchild_val < leftchild_val)
                {
                        if (rightchild_val < picked_node_cost)
                                copy(rchild,hole);
                        else finish(hole); /* at right place -> fill hole */
                }
                else
                {
                        if (leftchild_val < picked_node_cost)
```

```
                                copy(lchild,hole)
                          else finish(hole); /* at right place -> fill hole */
          }
    } remove_goal(gx,gy,gz)
    int gx,gy,gz;
    {
          configspace[gz][gx][gy].cost_to_goal = UNCOSTED;
          configspace[gz][gx][gy].vector = (unsigned)IP;
          /* goal doesn't point anywhere */
          printf("removing goal from configspace[%d][%d][%d]0,gz,gx,gy);
    } budinit()
    {
          int x,y,z;
          int o,p;

bottom_of_heap = 1; /* next free spot in heap */ perim=MAXPERIM;

/*
          printf("TREESIZE= %d, cs is %d bytes0,
                  TREESIZE, XSIZE*YSIZE*ZSIZE*sizeof(CSNODE));
          */
          if((configspace = (CSNODE (*)[XSIZE][YSIZE])
                  valloc(XSIZE*YSIZE*ZSIZE*sizeof(CSNODE))) == NULL)
          {
                printf("Unable to malloc configspace0);
          }
          for(z=0; z<ZSIZE; z++)
          {
                for(x=0; x<XSIZE; x++)
                {
                      for(y=0; y<YSIZE; y++)
                      {
                            configspace[z][x][y]= uncost_node;
                      }
                }
          }
          for(x=0; x < PRIMARY_DIRECTIONS*STATES_PER_UNIT; x++)
          {
                /* set up the bit patterns of what 'opposing' means */
                p = (int) x/STATES_PER_UNIT;/* PRIMARY DIRECTION */
                o= (p+REVERSE)%PRIMARY_DIRECTIONS;/*opposing direction */
                opposing[x]= (o * STATES_PER_UNIT) + (x%STATES_PER_UNIT);
                /*printf("opposing[%d]=%d0,x,opposing[x]);*/
          }
```

```
                       }
int look(xcoord,ycoord,zcoord,dir)
int newx, newy, newz;
int xcoord, ycoord, zcoord;
int dir;
{
    /* returns FALSE if COST is infinity or cant move there. TRUE else */
    int newx, newy, newz;
    COSTTYPE transition_cost;
    VECTTYPE newvector;
    COSTTYPE cost_to_newnode;
    register CSNODE *new_csptr;     /* pt to the new node */
    XYNODE newnode;
    COSTTYPE c,ac;

int i,veccount;

#ifdef DEBUG
    printf("LOOKING from z,x,y. %d,%d,%d DIRECTION: %d0,
      zcoord,xcoord,ycoord,dir);
    if(zcoord < 0)
    {
        printf("stopping.. hit <cr>:");
        getchar();
    }
endif if(NOT_VALID == neighbor(&transition_cost,xcoord,ycoord,zcoord,
                      dir,&newx,&newy,&newz))
    { /*printf("NOT VALID neighbor newx,newy,newz= %d,%d,%d,
      newz,newx,newy);*/
      return(FALSE);
    }
#ifdef DEBUG
    printf("tst1. newz,newx,newy= %d,%d,%d0,newz,newx,newy);
#endif
    if(configspace[newz][newx][newy].cost_to_goal == INFINITY)
    {
#ifdef DEBUG
      printf("cost at %d,%d,%d is INFO,newz,newx,newy);
#endif
      return(FALSE);
    }
#ifdef DEBUG
    else
      printf("cost at %d,%d,%d is %f0,newz,newx,newy,
              configspace[newz][newx][newy].cost_to_goal);
endif ifdef DEBUG
    printf("transition cost from %d,%d,%d to %d,%d,%d = %f0,
```

4

```
endif
            zcoord,xcoord,ycoord,newz,newx,newy,transition_cost);
#endif
         cost_to_newnode = transition_cost +
            configspace[zcoord][xcoord][ycoord].cost_to_goal;
#ifdef DEBUG
         printf("total cost to new node=%f0,cost_to_newnode);
#endif
         newvector = *(opposing+dir);

#ifdef DEBUG
         printf("opposing vector =%d0,newvector);
#endif
         new_csptr = &(configspace[newz][newx][newy]);
         c=cost_to_newnode-new_csptr->cost_to_goal;
         if(c<0) ac = (-c);
         else    ac = c;
         if( c <-ACCURACY ) /* new is improvement */
         {
            /* this is distictly best path, overwrite cost & vector*/
            /* it's only marginally better */ new_csptr->cost_to_goal = cost_to_newnode;
            new_csptr->vector = newvector;
            new_csptr->parent_x=xcoord;
            new_csptr->parent_y=ycoord;
            new_csptr->parent_c=zcoord;

newnode.x=newx;
            newnode.y=newy;
            newnode.z=newz;
            /*
            printf("adding to tree(%d,%d,%d0,
                   newx,newy,newz);
            */
            add_to_tree(newnode);
         }
         else if(ac < ACCURACY)
         {
            if((dir/STATES_PER_UNIT) == (new_csptr->vector /STATES_PER_UNIT)) { /* directions are on the same fiber */
               if(dir > new_csptr->vector)
               {
                  /*
                  !IMPORTANT:
```

```
                    /* In this case, the costs are so close
                       that they may be considered equivalent.
                       We will choose the vector with the
                       longer length rather than 'adding to existing vectors'
                       as might be the case in the 'robot path planner'
                     */
#ifdef DEBUG
                    supercounter++;
                    printf("current dir %d (norm: %d) at cost %f supercedes dir %d (norm %d) at cost %f0,
                        dir, dir%STATES_PER_UNIT,cost_to_newnode,new_csptr->vector,
                        (new_csptr->vector) % STATES_PER_UNIT,
                        new_csptr->cost_to_goal);
#endif
                    new_csptr->cost_to_goal = cost_to_newnode;
                    new_csptr->vector = newvector;
                    new_csptr->parent_x = xcoord;
                    new_csptr->parent_y = ycoord;
                    new_csptr->parent_z = zcoord;

newnode.x=newx;
                    newnode.y=newy;
                    newnode.z=newz;

}
            }
        }
    }
    return(TRUE);
} show_cdt()
{
    int x,y,z;
    for(x=0;x<XSIZE;x++)
    {
        for(y=0;y<YSIZE;y++)
        {
            for(z=0;z<ZSIZE;z++)
            {
                printf("[%d,%d,%d]=(%f,%4x) ",x,y,z,
                    configspace[z][x][y].cost_to_goal,
                    configspace[z][x][y].vector);
            }
        }
        putchar('\n');
    }
} bud(sx,sy,sz)    /* bud out till this start is stable */
int sx, sy, sz;
{
    XYNODE newnode;
    int index, indexy, indexz;
    int i;   /* direction in the ordinal sense eg. 1,2,3,4,5 */
```

```
        int notdonebefore;      /* have reported shortcut before?? */
        int majordir;
#ifdef DEBUG
        printf("Entering bud. %d states exist0.XSIZE*YSIZE*CPLANES);
#endif
        budcounter=0;
        /*supercounter=0;*/
        notdonebefore = TRUE;

/* the first seed */
        /*init();     set up goal in config space and heap */
        /*printf("start of budding0);
        system("date");
        */
        while(delete_from_tree(&newnode))    /* is legal- ie non zero */
        {
                indexx = newnode.x;
                indexy = newnode.y;
                indexz = newnode.z;
/*      bud the whole space if next stopping criterion isn't in */
#ifdef STOPPINGCOND
                if((configspace[indexz][indexy][indexx].cost_to_goal
                    > starts_address->cost_to_goal)
                    && (notdonebefore))
                /* we're done */
                {
                        printf("SHORTCUT REPORT ******* at bud #%d0.
                                budcounter);
                        system("date");
                        find_and_draw_shortest_path2(istart,
                                jstart,kstart);
                        printf("0);
                        system("sleep 5");
                        find_and_draw_shortest_path2(istart,
                                jstart,kstart);
                        notdonebefore = FALSE;
                        /*break;      remove this?*/
                }
endif
                for(majordir=0;majordir < PRIMARY_DIRECTIONS;majordir++)
                {
                        /* keep looking along a primary direction until:
                                an obstacle is hit,
                                we hit the edge of configspace,
                                or we run the full length of the direction */ for(i=STATES_PER_UNIT*majordir;
```

```
                              (i<(STATES_PER_UNIT*(majordir+1))) &&
                              look(indexx,indexy,indexz,i);i++);
      budcounter++;
      if ((budcounter % 5000) == 0)
           printf("At bud %d. Top heap cost=%f0.
                    budcounter,
                    cost(tree[1]));
    }
   /*printf("end of budding0);
   system("date");
   */
   printf("budded out %d times0,budcounter);
   /*printf("supercounter=%d0,supercounter);*/
   /*
   printf("save cs?->");
   scanf("%s",str);
   if(str[0] == 'y')
        savecs();
        */
} clear_influence() /* clear the influence */
{
   int x,y,z;
   XYNODE tmpnode, newnode;
   int newx, newy, newz;
   int dir;
   unsigned lookbackvector;
   CSNODE *xy_node_ptr, *newxy_node_ptr;
   COSTTYPE dummy;

while(delete_from_tree(&tmpnode))
   {
      printf("should not enter here 0);
      x=tmpnode.x;
      y=tmpnode.y;
      z=tmpnode.z;

xy_node_ptr = &(configspace[z][x][y]);
      if ((int)(xy_node_ptr->cost_to_goal) == (int)UNCOSTED)
      {
             /*been here... continue */
             continue;    /* been here */
      }

/* look in all 'free' directions */
      for (dir=0;dir<DIRECTION_COUNT;dir++)
      {
             if(NOT_VALID == neighbor(&dummy,x,y,z,dir,
                             &newx, &newy, &newz))
                 continue;
```

```c
                  newxy_node_ptr = &(configspace[newx][newy]);
                  lookbackvector = *(opposing+dir);

if((newxy_node_ptr->vector & lookbackvector) &&
                     ((newxy_node_ptr->cost_to_goal + ACCURACY) >
                       xy_node_ptr->cost_to_goal))
                  {
                          newnode.x=newx;
                          newnode.y=newy;
                          newnode.z=newz;
                          add_to_tree(newnode);
                                  /* neighbor IS part of */
                                  /* influenced area */
                  }
                  else if((newxy_node_ptr->cost_to_goal + ACCURACY) <
                          xy_node_ptr->cost_to_goal)
                  {
                          /* perimeter */
                          perimeter[perim] = newnode;
                          perim++;
                  }
          }
#ifdef DEBUG
          if(dir != DIRECTION_COUNT)
                  printf("premature breakout0);
#endif
          xy_node_ptr->cost_to_goal=UNCOSTED;
          xy_node_ptr->vector = (VECTTYPE) IP;
        }
        /* now set up the perimeter in the heap */
#ifdef DEBUG
        printf("perimeter:0);
#endif
        while(++perim <= MAXPERIM)
        {
                if ((int)
                   ((&(configspace[perimeter[perim].x]
                       [perimeter[perim].y])->cost_to_goal)
                       [perimeter[perim].y])
                      != (int)UNCOSTED)
                {
                        add_to_tree(&(perimeter[perim]));
#ifdef DEBUG
                        printf("add_perimeter:%d,%d,%d0,perimeter[perim].z,
                             perimeter[perim].x,perimeter[perim].y);
#endif
                }
#ifdef DEBUG
                else printf("node is not added because UNCOSTED.0);
#endif
        }
```

```
        plot_canvas1();
        plot_canvas2();
        system("scdump");
        system("sleep 15");
#endif
} check_new_obs_and_rmd_goals() /* the neighbors that are 'looking back at' */
                              /* the newly added obstacles are */
                              /* added to the 'unbudding' heap. */
{
    int x,y,z;
    int newx, newy, newz;
    XYNODE newnode;
    COSTTYPE dummy;
    int dir;
    unsigned lookbackvector;
    CSNODE *xy_node_ptr, *newxy_node_ptr;
    int i;

i=addobscounter;
    while(i)
    {                           /* set up configuration space */
        printf("#1should not enter check_new_obs_and_rmd_goals()0);
        x=addobs[--i].x;
        y=addobs[i].y;
        z=addobs[i].z;
        configspace[z][x][y].vector=IP;
        configspace[z][x][y].cost_to_goal = INFINITY;
    } while(addobscounter) /* there's more constraints */
    {
        printf("#2should not enter check_new_obs_and_rmd_goals()0);
        x=addobs[--addobscounter].x;
        y=addobs[addobscounter].y;
        z=addobs[addobscounter].z;

xy_node_ptr = &(configspace[z][x][y]);

/* look in all directions */
        for (dir=0;dir<DIRECTION_COUNT;dir++)
        {
                                /* find indicies of neighbor in direction dir */
            printf("#3should not enter check_new_obs_and_rmd_goals()0);
            if(NOT_VALID == neighbor(&dummy, x,y,z,dir,
                                     &newx, &newy,&newz) )
                continue;

newxy_node_ptr = &(configspace[newz][newx][newy]);

/* put the full contour of the obstacle into the */
```

```
                                            /* perimeter */ lookbackvector = *(opposing+dir));

/* next test gives downstream contour */
                            /* these nodes and their children will be cleared */ if(newxy_node_ptr->vector & lookbackvector)
                            /* looking back */
                            {
                                    newnode.x=newx;
                                    newnode.y=newy;
                                    newnode.z=newz;
                                    add_to_tree(newnode);

}
                            else if(newxy_node_ptr->cost_to_goal != INFINITY)
                            /* a contour to an obstacle */
                            {
                                    newnode.x=newx;
                                    newnode.y=newy;
                                    newnode.z=newz;
                                    perimeter[perim] = newnode;
                                    perim++;
                            }

}
             /* now add the removed goals */
             /* remgoalcounter points to next unfilled index */
             while(remgoalcounter)   /* there are some removed goals */
             {
                     remgoalcounter--;
                     newnode = remgoals[remgoalcounter];
                     add_to_tree(newnode);
                     printf("adding removed goal #%d: %d,%d,%d to heap for un-buddingO.
                     remgoalcounter,x,y,z);
             }

} check_free_obs_and_new_goals()
             /* the neighbors that are 'looking back at' */
             /* the freed added obstacles are */
             /* added to the 'unbudding' heap. */
{
             int x,y,z;
             int dir;
             unsigned lookbackvector;
             CSNODE *xy_node_ptr, *newxy_node_ptr;
             int i,j,k;
             XYNODE newnode;
             COSTTYPE dummy;

/* set up configuration space */

11
```

```
i=remobscounter;
while(i)
{
    printf("%5should not enter check_free_obs_and new goals()0);
        x=remobs[--i].x;
        y=remobs[i].y;
        z=remobs[i].z;
        configspace[z][x][y].vector=IP;
        configspace[z][x][y].cost_to_goal = UNCOSTED;
} while(remobscounter) /* more newly freed obstacles */
{
    printf("#6should not enter check_free_obs_and new goals()0);
        x=remobs[--remobscounter].x;
        y=remobs[remobscounter].y;
        z=remobs[remobscounter].z;

xy_node_ptr = &(configspace[z][x][y]);
        /* look in all directions */
        /* for neighbors with 'genuine' costs */
        /* (not UNCOSTED or INFINITE) */ for (dir=0;dir<DIRECTION_COUNT;dir++)
        {
            if(NOT_VALID == neighbor(&dummy,z,x,y,dir,
                &(newnode.z),&(newnode.x),&(newnode.y)))
                    continue;

newxy_node_ptr = &(configspace[newnode.z]
                [newnode.x][newnode.y]);
            if(newxy_node_ptr->cost_to_goal < UNCOSTED)
                    add_to_tree(newnode));
        }
}

/* now add the new goals */
while(newgoalcounter)
{
    newgoalcounter--;
    add_to_tree(newgoals[newgoalcounter]);

x=newgoals[newgoalcounter].x;
    y=newgoals[newgoalcounter].y;
    z=newgoals[newgoalcounter].z;

/*printf("adding goal at %d,%d0,z,x,y);*/ configspace[z][x][y].vector = IP;
    configspace[z][x][y].cost_to_goal = 0;
}

}
clear_vectors_and_costs(should_keep_goals)
```

```
int should_keep_goals;
register CSNODE *csptr;
int x,y,z;
    printf("A. should_keep_goals = %d0,should_keep_goals);
    for(z=0;z<ZSIZE;z++)
        for(x=0;x<XSIZE;x++)
            for(y=0;y<YSIZE;y++)
            {
/* MARKER */
                printf("BO");          csptr= &(configspace[z][x][y]);
                printf("EO");          /* don't touch goals, or obstacles */
                                       if(csptr->cost_to_goal == 0)/* goal */
                printf("DO");          {
                                            if(should_keep_goals == KILLGOALS)
                                                csptr->cost_to_goal=
                                                            UNCOSTED;
                                            else /* add this goal */
                                            {
                       printf("adding goal from clear_vectors0);
/* new */
                                                add_to_goals(x,y,z);
                                                show_goal(x,y,z);
                                                /*add_goal_in_task_space(x,y,z);*/
                                                csptr->vector=IP;
                                            }
                                       else if(configspace[z][x][y].cost_to_goal != INFINITY)
                                       {
                printf("CO");              csptr->cost_to_goal= UNCOSTED;
                                           csptr->vector=IP;
                                       }
#ifdef USINGOLD
                                       /*else if(con[x][y][z])*/
                                       /* is an obstacle, ensure blocking */
                                       {
                                           csptr->cost_to_goal= INFINITY;
                                           csptr->vector=IP;
                                       }
endif
            }
}

13
```

```
/* printout of file: canvas.c */
/*******************************/
#include "defines.h"
include "externs.h"
extern main();

/***********************************************************************
                canvas.c
                canvases declation and initialization
history:    created 198609xx Leo Dorst
            mod     19861113 Leo + Karen
************************************************************************/
/*                                                                     */
/*              canvas handlers                                        */
/*                                                                     */
/***********************************************************************/ check_for_goal_change() /* test if goals have changed since last time */
{
    if (remgoalcounter != newgoalcounter ) {
            regeneration_needed = TRUE;
    }
} process_goal(i,j,k)
int i,j,k;
{
    int numknown;

if ((numknown=goal_known(i,j,k)) != goalcounter) {
            remove_from_goals(i,j,k,numknown);
    } else {
            add_to_goals(i,j,k);
    }
} int goal_known(i,j,k) /* test if a goal at this location was known */
                     /* return goal number if known */
                     /* return next free (goalcounter) if unknown */
int i,j,k;
{
    register int m;

for (m=0; m<goalcounter; m++) {
            if (goal[m].x == i && goal[m].y == j && goal[m].z == k )
                    return(m);
    }
    return(goalcounter);
}

14
```

```c
add_to_goals(i,j,k)
int i,j,k;
{
    register int m;

/* put goal in newgoal array */
    newgoals[newgoalcounter].x = i;
    newgoals[newgoalcounter].y = j;
    newgoals[newgoalcounter++].z = k;

printf("addtogoals[%d](%d,%d,%d)0,newgoalcounter-1,i,j,k);

/* put goal in goal array */
    goal[goalcounter].x = i;
    goal[goalcounter].y = j;
    goal[goalcounter++].z = k;

/* check if this goal was just removed, if so remove from remgoals */
    for (m=0; m<remgoalcounter; m++) {
        if (remgoals[m].x == i
            && remgoals[m].y == j
            && remgoals[m].z == k) {
            /* substitute last element for this one */
            remgoals[m].x = remgoals[--remgoalcounter].x;
            remgoals[m].y = remgoals[remgoalcounter].y;
            remgoals[m].z = remgoals[remgoalcounter].z;
            printf("this goal just removed0);
        }
    } if (newgoalcounter == MAX_GOAL_NUMBER ||
        goalcounter == MAX_GOAL_NUMBER)
            printf("No more goals can be added!0);
} remove_from_goals(i,j,k,number)
int i,j,k;
{
    register int m;

/* put goal in remgoal-array */
    remgoals[remgoalcounter].x = i;
    remgoals[remgoalcounter].y = j;
    remgoals[remgoalcounter++].z = k;
    printf("remfromgoals[%d](%d,%d,%d)0,remgoalcounter-1,i,j,k);

/* place last goal in new empty position in goal -array */
    goal[number].x = goal[--goalcounter].x;
    goal[number].y = goal[goalcounter].y;
    goal[number].z = goal[goalcounter].z;

/* check if this goal is just new, if so remove from newgoals */
    for (m=0; m<newgoalcounter; m++) {
```

```
        if (newgoals[m].x == i
            && newgoals[m].y == j
            && newgoals[m].z == k) {
            /* substitute last element for this one */
            newgoals[m].x = newgoals[--newgoalcounter].x;
            newgoals[m].y = newgoals[newgoalcounter].y;
            newgoals[m].z = newgoals[newgoalcounter].z;
            printf("this goal just added0);
            return; /* don't add to added goals */
        }
    }
    if (remgoalcounter == MAX_GOAL_NUMBER)
        printf("No more goals can be removed!0);
} report_about(i,j,k)
int i,j,k;
{
    printf("pt(%d,%d), cost=%f, vect=%x(%x)0,i,j,k,
    configspace[k][i][j].cost_to_goal,
    configspace[k][i][j].vector);
} regenerate()     /* Regenerate landscapes */
{
#ifdef USINGCANVAS
    set_prog_item(PROPAGATE);
#endif
    check_new_obs_and_rmd_goals();
        /* add perimeter of new obs & removed_goals */
        /* to the unbudding heap */
    clear_influence(); /* leaves perimeter in heap */
    /* intermediate display: strange for metric change */
    check_free_obs_and_new_goals();
    /* clear_vectors_and_costs(KEEPGOALS); */
    bud(istart,jstart,kstart);

show_state(istart,jstart,kstart);
    regeneration_needed = FALSE;
} show_message()
{
    printf("Can't get there! 0);
} remove_message()
{
} add_goal_in_task_space() {}
plot_goals_in_task_space() {}
remove_goal_in_task_space() {}
```

```
/* printout of file: car.c */
/****************************************/

/*
 *    FILE :      car.c
 *    AUTHOR :    Sandeep Mehta, R&FA, Philips Labs, Briarcliff Manor, NY
 *
 *    DATE:       Tue Mar 22 13:00:08 EST 1988
 *    PURPOSE:    routines to draw and manipulate car in parking lot
 *
 *    DESCRIPTION:
 *    FUNCTIONS:
 *    LIBRARIES:
 *
 *    Modification History:
 *    - created Tue Mar 22 13:00:08 EST 1988 - sxm
 */
#ifndef lint
static char car_c_sccsinfo[] = "%Z% %M% %I% %D%";
#endif
extern int errno;

#include <stdio.h>
#include <math.h>        /* standard C library */
#include "defines.h"
include "externs.h"

move_car(dx,dy)
    int dx,dy;
{
    register int i;

for (i = 0; i < MAXVERTS; i++)       /* update car vertex list */
    {
        car_vlst[i].x = unit_vlst[i].x + dx;
        car_vlst[i].y = unit_vlst[i].y + dy;
        cov_lst[i].x = unit_cov[i].x + dx;
        cov_lst[i].y = unit_cov[i].y + dy;
    }
    for (i = 0; i < WHEELS; i++)
    {
        fw_lst[i].x = unit_fw[i].x + dx;
        fw_lst[i].y = unit_fw[i].y + dy;
    }
} translate_car(tx,ty)
    int tx,ty;
{
    register int i;
    for (i = 0; i < MAXVERTS; i++)
    {
```

```
            car_vlst[i].x += tx;      /* update car vertex list */
            car_vlst[i].y += ty;
            cov_lst[i].x += tx;
            cov_lst[i].y += ty;
        }
        for (i = 0; i < WHEELS; i++)
        {
            fw_lst[i].x += tx;
            fw_lst[i].y += ty;
        }
    } scale_car(sx, sy)
    double sx, sy;
    {
        register int i;
        int offx = (int) (cov_lst[2].x+cov_lst[3].x)/2.0;
        int offy = (int) (cov_lst[2].y+cov_lst[3].y)/2.0;

translate_car(-offx,-offy);
        for (i = 0; i < MAXVERTS; i++)
        {
            car_vlst[i].x = car_vlst[i].x * sx;
            car_vlst[i].y = car_vlst[i].y * sy;
            cov_lst[i].x = cov_lst[i].x * sx;
            cov_lst[i].y = cov_lst[i].y * sy;
            unit_vlst[i].x = unit_vlst[i].x * sx;
            unit_vlst[i].y = unit_vlst[i].y * sy;
            unit_cov[i].x = unit_cov[i].x * sx;
            unit_cov[i].y = unit_cov[i].y * sy;
        }
        for (i = 0; i < WHEELS; i++)
        {
            fw_lst[i].x = fw_lst[i].x * sx;
            fw_lst[i].y = fw_lst[i].y * sy;
            unit_fw[i].x = unit_fw[i].x * sx;
            unit_fw[i].y = unit_fw[i].y * sy;
        }
        translate_car(offx,offy);    /* translate back to original place */
    }

/*
    ** FUNCTION:     rotate_car()
    ** PURPOSE:      rotate car about it's axis i.e. the point defined
    **               as the "center of vehicle". To do this correctly without
    **               skewing the car, we need to translate COV to the origin
    **               rotate it, and translate it back to where it was originally.
    */
    rotate_car(rad)
    double rad;
    {
        register int i;
        double offx = (cov_lst[2].x+cov_lst[3].x)/2.0;
```

```
    double offy = (cov_lst[2].y+cov_lst[3].y)/2.0;
    /*
     * compute rotation for vehicle & center of vehicle
     */
    for (i = 0; i < MAXVERTS; i++)
    {
        car_vlst[i].x = (int) unit_vlst[i].x*cos(rad)-unit_vlst[i].y*sin(rad)+0.5;
        car_vlst[i].y = (int) unit_vlst[i].x*sin(rad)+unit_vlst[i].y*cos(rad)+0.5;
        cov_lst[i].x = (int) unit_cov[i].x*cos(rad)-unit_cov[i].y*sin(rad)+0.5;
        cov_lst[i].y = (int) unit_cov[i].x*sin(rad)+unit_cov[i].y*cos(rad)+0.5;
    }
    for (i = 0; i < WHEELS; i++)
    {
        fw_lst[i].x = (int) unit_fw[i].x*cos(rad)-unit_fw[i].y*sin(rad)+0.5;
        fw_lst[i].y = (int) unit_fw[i].x*sin(rad)+unit_fw[i].y*cos(rad)+0.5;
    }
    translate_car((int) offx,(int) offy);/* translate back to original place */
} rotate_wheels(rad)
    double rad;
{
    register int i;
    double u1x = (unit_fw[0].x+unit_fw[1].x)/2.0;
    double u1y = (unit_fw[0].y+unit_fw[1].y)/2.0;
    double u2x = (unit_fw[2].x+unit_fw[3].x)/2.0;
    double u2y = (unit_fw[2].y+unit_fw[3].y)/2.0;

double w1x = (fw_lst[0].x+fw_lst[1].x)/2.0;
    double w1y = (fw_lst[0].y+fw_lst[1].y)/2.0;
    double w2x = (fw_lst[2].x+fw_lst[3].x)/2.0;
    double w2y = (fw_lst[2].y+fw_lst[3].y)/2.0;
#ifdef DEBUG
    for ( i = 0; i < WHEELS/2; i++)
        fprintf(stderr,"UNIT W%d(x,y)=%d,%d0,i,unit_fw[i].x,unit_fw[i].y);
    fprintf(stderr,"UX #1=%d,%d #2=%d,%d0,u1x,u1y,u2x,u2y);
#endif
    unit_fw[0].x -= u1x;
    unit_fw[0].y -= u1y;
    unit_fw[1].x -= u1x;
    unit_fw[1].y -= u1y;

unit_fw[2].x -= u2x;
    unit_fw[2].y -= u2y;
    unit_fw[3].x -= u2x;
    unit_fw[3].y -= u2y;
#ifdef DEBUG
    for ( i = 0; i < WHEELS/2; i++)
        fprintf(stdout,"UNIT W%d(x,y)=%d,%d0,i,unit_fw[i].x,unit_fw[i].y);
    for ( i = 0; i < WHEELS/2; i++)
        fprintf(stderr,"FRONT W%d(x,y)=%d,%d0,i,fw_lst[i].x,fw_lst[i].y);
#endif
    for (i = 0; i < WHEELS/2; i++)
```

```
            fw_lst[i].x = (int) unit_fw[i].x*cos(rad)-unit_fw[i].y*sin(rad)+0.5;
            fw_lst[i].y = (int) unit_fw[i].x*sin(rad)+unit_fw[i].y*cos(rad)+0.5;
     }
#ifdef DEBUG
    for ( i = 0; i < WHEELS/2; i++)
        fprintf(stderr,"RFRONT W%d(x,y)=%d,%d0,i,fw_lst[i].x,fw_lst[i].y);
#endif
    unit_fw[0].x += u1x;
    unit_fw[0].y += u1y;
    unit_fw[1].x += u1x;
    unit_fw[1].y += u1y;
    unit_fw[2].x += u2x;
    unit_fw[2].y += u2y;
    unit_fw[3].x += u2x;
    unit_fw[3].y += u2y;
#ifdef DEBUG
 fprintf(stderr,"WX #1=%d,%d #2=%d,%d0,u1x,u1y,u2x,u2y);
#endif
    fw_lst[0].x += u1x;
    fw_lst[0].y += u1y;
    fw_lst[1].x += u1x;
    fw_lst[1].y += u1y;
    fw_lst[2].x += u2x;
    fw_lst[2].y += u2y;
    fw_lst[3].x += u2x;
    fw_lst[3].y += u2y;
#ifdef DEBUG
    for ( i = 0; i < WHEELS/2; i++)
        fprintf(stderr,"TRFRONT W%d(x,y)=%d,%d0,i,fw_lst[i].x,fw_lst[i].y);
#endif
}

/*
 * FUNCTION  :  build_car()
 * PURPOSE   :  to build car from given params.
 */
build_car(clen,cwid,cfr,cff)
    int clen,cwid,cfr,cff;
{
    int halfw = cwid/2;
    int front = 4*cff/5;                  /* Build car vertex list */
    int i;

car_vlst[0].x = 0-cfr;
    car_vlst[0].y = 0-halfw;
    car_vlst[1].x = cff;
    car_vlst[1].y = 0-halfw;
    car_vlst[2].x = cff;
    car_vlst[2].y = halfw;
    car_vlst[3].x = 0-cfr;
```

```
car_vlst[3].y = halfw;              /* Build center of vehicle */ cov_lst[0].x = 0;
cov_lst[0].y = 0-halfw/2;
cov_lst[1].x = 0;
cov_lst[1].y = halfw/2;
cov_lst[2].x = 0-cfr/2;
cov_lst[2].y = 0;
cov_lst[3].x = cfr/2;
cov_lst[3].y = 0;

fw_lst[4].x = 0-(2*cfr/3);          /* Build rear wheels */
fw_lst[4].y = 0-halfw-WHEELS_OFF;
fw_lst[5].x = (2*cfr/3);
fw_lst[5].y = 0-halfw-WHEELS_OFF;
fw_lst[6].x = 0-(2*cfr/3);
fw_lst[6].y = halfw+WHEELS_OFF;
fw_lst[7].x = (2*cfr/3);
fw_lst[7].y = halfw+WHEELS_OFF;

fw_lst[0].x = fw_lst[4].x+front;    /* Build front wheels */
fw_lst[0].y = fw_lst[4].y;
fw_lst[1].x = fw_lst[5].x+front;
fw_lst[1].y = fw_lst[5].y;
fw_lst[2].x = fw_lst[6].x+front;
fw_lst[2].y = fw_lst[6].y;
fw_lst[3].x = fw_lst[7].x+front;
fw_lst[3].y = fw_lst[7].y;

for ( i = 0 ; i < MAXVERTS; i++)
{
    unit_vlst[i].x = car_vlst[i].x;
    unit_vlst[i].y = car_vlst[i].y;
    unit_cov[i].x = cov_lst[i].x;
    unit_cov[i].y = cov_lst[i].y;
}
for ( i = 0 ; i < WHEELS ; i++ )
{
    unit_fw[i].x = fw_lst[i].x;
    unit_fw[i].y = fw_lst[i].y;
}
```

21

```
/* printout of file: car.pr */
/*********************************/

/* Format_version=1, Width=32, Height=16, Depth=1, Valid_bits_per_item=16
*/
    0x0000, 0x0000,
    0x0000, 0x0000,
    0x0000, 0x0000,
    0x0000, 0x0000,
    0x0000, 0x0000,
    0x0000, 0x0000,
    0x0000, 0x0000,
    0x0000, 0x0000,
    0x0000, 0x0000,
    0x0000, 0x0000,
    0x0000, 0x0000,
    0x0000, 0x0000,
    0x0000, 0x0000,
    0x0000, 0x0000,
    0x0000, 0x0000,
    0x0000, 0x0000,
```

```
/* printout of file: cargoal.icon */
/*****************************/
/* Format_version=1, Width=64, Height=64, Depth=1, Valid_bits_per_item=16
*/
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x000E, 0x0000, 0x0000, 0x0000, 0x0000, 0x0000,
0x0000, 0x002A, 0x000E, 0x0000, 0x0000, 0x0000, 0x0000, 0x0000,
0x0000, 0x002A, 0x0C000, 0x0000, 0x0000, 0x0000, 0x0000, 0x0000,
0x0000, 0x006A, 0x0C000, 0x0000, 0x0035, 0x0B000, 0x0000, 0x0000,
0x0000, 0x002A, 0x3000, 0x0000, 0x0055, 0x4000, 0x0000, 0x0000,
0x0000, 0x000E, 0x0000, 0x0000, 0x0035, 0x0B000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000
```

```
/* printout of file: collide.pr */
/*************************************/

/* Format_version=1, Width=64, Height=64, Depth=1, Valid_bits_per_item=16
*/
0x0000, 0x0000, 0x0000, 0x0000, 0x0000, 0x0000, 0x0000, 0x0000, 0x0000, 0x0000, 0x0000, 0x0000, 0x0000, 0x0000, 0x0000, 0x0000,
0x1C71, 0xC700, 0x0000, 0x0000, 0x0000, 0x1249, 0x2480, 0x0000, 0x0000, 0x0000, 0x1C71, 0xC700, 0x0000, 0x0000, 0x0000, 0x0000,
0x1249, 0x2480, 0x0000, 0x0000, 0x0000, 0x0000, 0x1C71, 0xC700, 0x0000, 0x0000, 0x0000, 0x0000, 0x0000, 0x0000, 0x0000, 0x0000,
0x1041, 0x0400, 0x0000, 0x0000, 0x0000, 0x0000, 0x1041, 0x0400, 0x0000, 0x0000, 0x0000, 0x0000, 0x0000, 0x0000, 0x0000, 0x0000,
0x0000, 0x0000, 0x0000, 0x0000, 0x0000, 0x0000, 0x2040, 0x0000, 0x0000, 0x0000, 0x0000, 0x0000, 0x0000, 0x0000, 0x0000, 0x0000,
0x3B00, 0xE1C1, 0x0004, 0x0000, 0x0000, 0x0000, 0x4400, 0x2040, 0x0000, 0x0000, 0x0000, 0x0000, 0x0000, 0x0000, 0x0000, 0x0000,
0x4070, 0x2047, 0x071C, 0x1C58, 0x4088, 0x2041, 0x4088, 0x2041, 0x0884, 0x2264, 0x0000, 0x0000, 0x0000, 0x0000, 0x0000, 0x0000,
0x40B8, 0x2041, 0x06C4, 0x2244, 0x4088, 0x2041, 0x2041, 0x0104, 0x2244, 0x0000, 0x0000, 0x0000, 0x0000, 0x0000, 0x0000, 0x0000,
0x44B8, 0x2041, 0x09B4, 0x2244, 0x40B8, 0x2041, 0x3B70, 0x2041, 0x0704, 0x1C44, 0x0000, 0x0000, 0x0000, 0x0000, 0x0000, 0x0000,
0x0000, 0x0000, 0x0000, 0x0000, 0x0000, 0x0300, 0x0000, 0x0000, 0x00E0, 0x0000, 0x0000, 0x0000, 0x0000, 0x0000, 0x0000, 0x0000,
0x0000, 0x0000, 0x0000, 0x0170, 0x0000, 0x0000, 0x0000, 0x0000, 0x025B, 0x0000, 0x0000, 0x0000, 0x0000, 0x0000, 0x0000, 0x0000,
0x0000, 0x0000, 0x0000, 0x045B, 0x0000, 0x0000, 0x0000, 0x086C, 0x0000, 0x0000, 0x0000, 0x0000, 0x0000, 0x0000, 0x0000, 0x0000,
0x0006, 0xC000, 0x3021, 0x00FE, 0x0018, 0x3001, 0x0031, 0x60B2, 0x0000, 0x0000, 0x0000, 0x0000, 0x0000, 0x0000, 0x0000, 0x0000,
0x0080, 0x30BB, 0xFFFF, 0xC0B2, 0x00B0, 0x0CB4, 0x0030, 0x60B2, 0x0000, 0x0000, 0x0000, 0x0000, 0x0000, 0x0000, 0x0000, 0x0000,
0x0060, 0x0F02, 0x0030, 0xFFFF, 0xFFFE, 0x0100, 0xC050, 0xFFFF, 0xFFFE, 0x0000, 0x0000, 0x0000, 0x0000, 0x0000, 0x0000, 0x0000,
0x0107, 0x0040, 0xFFFF, 0xFFB2, 0x011B, 0x0020, 0xFFFF, 0xFFB2, 0x0000, 0x0000, 0x0000, 0x0000, 0x0000, 0x0000, 0x0000, 0x0000,
0x0260, 0x0020, 0xFFFF, 0xFFB2, 0x0400, 0x0390, 0x0020, 0xE3FF, 0x6FB2, 0x0000, 0x0000, 0x0000, 0x0000, 0x0000, 0x0000, 0x0000,
0x0600, 0x01C0, 0x7A00, 0xDDFF, 0x0200, 0x0107, 0x3220, 0x2200, 0xBB00, 0x0000, 0x0000, 0x0000, 0x0000, 0x0000, 0x0000, 0x0000,
0x0100, 0xC1C0, 0x0EP0, 0x77FE, 0xAB00, 0x00BB, 0x7000, 0x0000, 0xB800, 0x0000, 0x0000, 0x0000, 0x0000, 0x0000, 0x0000, 0x0000,
0x008C, 0xB000, 0x1C00, 0x7000, 0x00BB, 0x8000, 0x0000, 0x0000, 0x0000, 0x0000, 0x0000, 0x0000, 0x0000, 0x0000, 0x0000, 0x0000,
0x004B, 0xB000, 0x0000, 0x0000, 0x0300, 0x0000, 0x0307, 0x0000, 0x0000, 0x0000, 0x0000, 0x0000, 0x0000, 0x0000, 0x0000, 0x0000,
0x0000, 0x0000, 0x0000, 0x0000, 0x0000, 0x0000, 0x0380, 0x0000, 0x1000, 0x0000, 0x0000, 0x0000, 0x0000, 0x0000, 0x0000, 0x0000,
0x0440, 0x0000, 0x0000, 0x0000, 0x0000, 0x0407, 0x1000, 0x004F, 0x1622, 0x7070, 0xE000, 0x0000, 0x0000, 0x0000, 0x0000, 0x0000,
0x03BB, 0x9922, 0x1089, 0x1000, 0x0000, 0x044B, 0x9008, 0x1014, 0x1081, 0xE000, 0x0000, 0x0000, 0x0000, 0x0000, 0x0000, 0x0000,
0x0387, 0x1008, 0x1070, 0xE000, 0x0000, 0x0000, 0x0000, 0x1089, 0x1000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000, 0x0000, 0x0000, 0x0000, 0x0000, 0x0000, 0x0000, 0x0000, 0x0000,
0x0000, 0x0000, 0x0000, 0x0000, 0x0000, 0x0000, 0x0000, 0x0000, 0x0000, 0x0000, 0x0000, 0x0000, 0x0000, 0x0000, 0x0000, 0x0000
```

```
/* printout of file: copyright.def */
/*******************************/
char copyright[]="0(c) copyright 1988 Philips Laboratories. All rights reserved.0;
```

```
/* printout of file: copyright.extern */
/*******************************/
extern char copyright[];
```

```
/* printout of file: cov.pr */
/********************************/

/* Format_version=1, Width=16, Height=16, Depth=1, Valid_bits_per_item=16
 */
    0x0000, 0x0000, 0x0700, 0x1FC0, 0x1FC0, 0x3FE0, 0x3FE0, 0x3FE0,
    0x1FC0, 0x1FC0, 0x0700, 0x0000, 0x0000, 0x0000, 0x0000, 0x0000
```

```
/* printout of file: create.c */
/*****************************/
/*
 *      FILE :          create.c
 *      AUTHOR :        Sandeep Mehta, R&FA, Philips Labs, Briarcliff Manor, NY
 *
 *      DATE:           Mon Mar 21 13:46:46 EST 1988
 *      PURPOSE:        create components of "park" interface
 *
 *      DESCRIPTION:
 *      FUNCTIONS:
 *      LIBRARIES:
 *
 *      Modification History:
 *      - created Mon Mar 21 13:46:46 EST 1988 - sxm
 */
#ifndef lint
static char create_c_sccsinfo[] = " %Z% %M% %I% %D%";
#endif
extern int errno;

#include <stdio.h>                       /* standard C library */
#include "rgb.h"
#include "defines.h"
include "externs.h"

static short collide_image[] =
{
#include "collide.pr"
};
mpr_static(collide_pr,64,1,collide_image);

void
create_panel()
{
    Pixfont *pf;
    void clr_panel(), done_proc(), zoom_proc(), rotate_proc(),
         rotate_wheels_proc(), park_proc(), delay_proc(), sweep_proc(),
         load_proc(), store_proc(), grid_proc(), goal_proc(), patent_proc(),
         clrgoal_proc(), diag_proc();

pf = pf_open("/usr/lib/fonts/fixedwidthfonts/cour.r.18");
    ctrl_panel = window_create(base_frame, PANEL,
                      WIN_FONT, pf,0);

(void) panel_create_item ( ctrl_panel, PANEL_MESSAGE,
                PANEL_ITEM_X, ATTR_COL(5),
                PANEL_ITEM_Y, ATTR_ROW(1),
                PANEL_LABEL_STRING, "VEHICLE PARAMETERS",
                0);
    center = panel_create_item(ctrl_panel, PANEL_TEXT,
                PANEL_VALUE_DISPLAY_LENGTH, MAXSTRLEN,
```

```
                    PANEL_ITEM_X, ATTR_COL(1),
                    PANEL_ITEM_Y, ATTR_ROW(2),
                    PANEL_LABEL_STRING, "Position of Vehicle: ",
                    PANEL_LABEL_BOLD, TRUE,
                    0);
/* kit: 8/15/88 changed above to 'Differential of Vehicle' */
/* the 'center' is located at the differential- halfway between
the rear tires */ angle = panel_create_item(ctrl_panel, PANEL_TEXT,
                    PANEL_VALUE_DISPLAY_LENGTH, MAXSTRLEN,
                    PANEL_ITEM_X, ATTR_COL(1),
                    PANEL_ITEM_Y, ATTR_ROW(3),
                    PANEL_LABEL_STRING, "Angle of Vehicle: ",
                    PANEL_LABEL_BOLD, TRUE,
                    0);

wheel = panel_create_item(ctrl_panel, PANEL_TEXT,
                    PANEL_VALUE_DISPLAY_LENGTH, MAXSTRLEN,
                    PANEL_ITEM_X, ATTR_COL(1),
                    PANEL_ITEM_Y, ATTR_ROW(4),
                    PANEL_LABEL_STRING, "Angle of Wheels: ",
                    PANEL_LABEL_BOLD, TRUE,
                    0);

(void) panel_create_item (ctrl_panel, PANEL_MESSAGE,
                    PANEL_ITEM_X, ATTR_COL(45),
                    PANEL_ITEM_Y, ATTR_ROW(1),
                    PANEL_LABEL_STRING, "OBSTACLE PARAMETERS",
                    0);

obs1 = panel_create_item(ctrl_panel, PANEL_TEXT,
                    PANEL_VALUE_DISPLAY_LENGTH, MAXSTRLEN*2,
                    PANEL_ITEM_X, ATTR_COL(41),
                    PANEL_ITEM_Y, ATTR_ROW(2),
                    PANEL_LABEL_BOLD, TRUE,
                    PANEL_LABEL_STRING, "#1 (x,y): ",
                    0);

obs2 = panel_create_item(ctrl_panel, PANEL_TEXT,
                    PANEL_VALUE_DISPLAY_LENGTH, MAXSTRLEN*2,
                    PANEL_ITEM_X, ATTR_COL(41),
                    PANEL_ITEM_Y, ATTR_ROW(3),
                    PANEL_LABEL_BOLD, TRUE,
                    PANEL_LABEL_STRING, "#2 (x,y): ",
                    0);

a_slider = panel_create_item(ctrl_panel, PANEL_SLIDER,
                    PANEL_ITEM_X, ATTR_COL(41),
                    PANEL_ITEM_Y, ATTR_ROW(4),
                    PANEL_LABEL_STRING, "Theta : ",
                    PANEL_LABEL_BOLD, TRUE,
                    PANEL_VALUE, 0,
                    PANEL_MIN_VALUE, 0,
                    PANEL_MAX_VALUE, CPLANES,
                    PANEL_SLIDER_WIDTH, CPLANES*3,
                    PANEL_NOTIFY_PROC, rotate_proc,
                    PANEL_NOTIFY_LEVEL, PANEL_ALL,
```

```
                    0);
w_slider = panel_create_item(ctrl_panel, PANEL_SLIDER,
                    PANEL_ITEM_X, ATTR_COL(41),
                    PANEL_ITEM_Y, ATTR_ROW(6),
                    PANEL_LABEL_STRING, "Wheel :",
                    PANEL_LABEL_BOLD, TRUE,
                    PANEL_VALUE, 0,
                    PANEL_MIN_VALUE, 0,
                    PANEL_MAX_VALUE, CPLANES,
                    PANEL_SLIDER_WIDTH, CPLANES*3,
                    PANEL_NOTIFY_PROC, rotate_wheels_proc,
                    PANEL_NOTIFY_LEVEL, PANEL_ALL,
                    0);
(void) panel_create_item(ctrl_panel, PANEL_SLIDER,
                    PANEL_ITEM_X, ATTR_COL(41),
                    PANEL_ITEM_Y, ATTR_ROW(8),
                    PANEL_LABEL_STRING, "Delay :",
                    PANEL_LABEL_BOLD, TRUE,
                    PANEL_VALUE, 0,
                    PANEL_MIN_VALUE, 0,
                    PANEL_MAX_VALUE, 10,
                    PANEL_SLIDER_WIDTH, 100,
                    PANEL_NOTIFY_PROC, delay_proc,
                    PANEL_NOTIFY_LEVEL, PANEL_ALL,
                    0);
sweep = panel_create_item (ctrl_panel, PANEL_CYCLE,
                    PANEL_LABEL_STRING, "Visible Trace :",
                    PANEL_CHOICE_STRINGS, "Off", "On", 0,
                    PANEL_CHOICES_BOLD, TRUE,
                    PANEL_ITEM_X, ATTR_COL(1),
                    PANEL_ITEM_Y, ATTR_ROW(5),
                    PANEL_NOTIFY_PROC, sweep_proc,
                    0);
(void) panel_create_item (ctrl_panel, PANEL_CYCLE,
                    PANEL_LABEL_STRING, "Grid :",
                    PANEL_CHOICE_STRINGS, "Off", "On", 0,
                    PANEL_CHOICES_BOLD, TRUE,
                    PANEL_ITEM_X, ATTR_COL(25),
                    PANEL_ITEM_Y, ATTR_ROW(5),
                    PANEL_NOTIFY_PROC, grid_proc,
                    0);
(void) panel_create_item(ctrl_panel, PANEL_BUTTON,
                    PANEL_LABEL_IMAGE, panel_button_image(ctrl_panel, "LOADCS", 0, 0),
                    PANEL_ITEM_X, ATTR_COL(1),
                    PANEL_ITEM_Y, ATTR_ROW(6),
                    PANEL_NOTIFY_PROC, load_proc,
                    0);
(void) panel_create_item(ctrl_panel, PANEL_BUTTON,
                    PANEL_LABEL_IMAGE, panel_button_image(ctrl_panel, "STORECS", 0, 0),
                    PANEL_ITEM_X, ATTR_COL(10),
                    PANEL_ITEM_Y, ATTR_ROW(6),
                    PANEL_NOTIFY_PROC, store_proc,
                    0);
```

```
(void) panel_create_item(ctrl_panel, PANEL_BUTTON,
        PANEL_LABEL_IMAGE, panel_button_image(ctrl_panel,"SETGOAL",0,0),
        PANEL_ITEM_X, ATTR_COL(20),
        PANEL_ITEM_Y, ATTR_ROW(6),
        PANEL_NOTIFY_PROC, goal_proc,
        0);
(void) panel_create_item(ctrl_panel, PANEL_BUTTON,
        PANEL_LABEL_IMAGE, panel_button_image(ctrl_panel,"DIAG",0,0),
        PANEL_ITEM_X, ATTR_COL(30),
        PANEL_ITEM_Y, ATTR_ROW(6),
        PANEL_NOTIFY_PROC, diag_proc,
        0);
/* temp change -- kit */
/*
(void) panel_create_item(ctrl_panel, PANEL_BUTTON,
        PANEL_LABEL_IMAGE, panel_button_image(ctrl_panel,"CLRGOAL",0,0),
        PANEL_ITEM_X, ATTR_COL(30),
        PANEL_ITEM_Y, ATTR_ROW(6),
        PANEL_NOTIFY_PROC, clrgoal_proc,
        0);
*/
prompt_item = panel_create_item(ctrl_panel, PANEL_TEXT,
        PANEL_LABEL_X, ATTR_COL(1),
        PANEL_LABEL_Y, ATTR_ROW(7),
        PANEL_VALUE_DISPLAY_LENGTH, 24,
        PANEL_LABEL_STRING, "filename: ",
        0);
(void) panel_create_item(ctrl_panel, PANEL_BUTTON,
        PANEL_LABEL_IMAGE, panel_button_image(ctrl_panel,"DONE",0,0),
        PANEL_ITEM_X, ATTR_COL(1),
        PANEL_ITEM_Y, ATTR_ROW(8),
        PANEL_NOTIFY_PROC, done_proc,
        0);
(void) panel_create_item(ctrl_panel, PANEL_BUTTON,
        PANEL_LABEL_IMAGE, panel_button_image(ctrl_panel,"CLEAR",0,0),
        PANEL_ITEM_X, ATTR_COL(10),
        PANEL_ITEM_Y, ATTR_ROW(8),
        PANEL_NOTIFY_PROC, clr_panel,
        0);
(void) panel_create_item(ctrl_panel, PANEL_BUTTON,
        PANEL_LABEL_IMAGE, panel_button_image(ctrl_panel,"PARK",0,0),
        PANEL_ITEM_X, ATTR_COL(20),
        PANEL_ITEM_Y, ATTR_ROW(8),
        PANEL_NOTIFY_PROC, park_proc,
        0);
(void) panel_create_item (ctrl_panel, PANEL_CYCLE,
        PANEL_LABEL_STRING, "",
        PANEL_CHOICE_STRINGS, "No", "Yes", 0,
        PANEL_CHOICES_BOLD, TRUE,
        PANEL_ITEM_X, ATTR_COL(30),
        PANEL_ITEM_Y, ATTR_ROW(8),
        PANEL_NOTIFY_PROC, patent_proc,
        0);
```

```
        window_fit_height(ctrl_panel);
} create_canvas(wid,ht)
        int wid, ht;
{
        unsigned char red[RGBSIZE];
        unsigned char green[RGBSIZE];
        unsigned char blue[RGBSIZE];
        extern mse_handler();

park_canvas = window_create(base_frame, CANVAS,
                                WIN_BELOW,           ctrl_panel,
                                WIN_WIDTH,           wid,
                                WIN_HEIGHT,          ht,
                                WIN_CONSUME_PICK_EVENTS, LOC_DRAG,
                                                        MS_LEFT,
                                                        MS_RIGHT,
                                                        MS_MIDDLE,
                                                        0,
                                WIN_EVENT_PROC,      mse_handler,
                                CANVAS_FIXED_IMAGE,  FALSE,
                                CANVAS_RETAINED,     FALSE,
                                CANVAS_FAST_MONO,    TRUE,
                                0);
        park_canvas_pw = canvas_pixwin(park_canvas);

rgbsetup(red,green,blue);
        pw_setcmsname(park_canvas_pw, RGB);
        pw_putcolormap(park_canvas_pw, 0, RGBSIZE, red, green, blue);
        window_set(park_canvas,CANVAS_RETAINED, TRUE, 0);
        window_fit(park_canvas);
} create_tty()
{
        tty = window_create(base_frame, TTY,
                        WIN_X, 0,
                        WIN_BELOW, park_canvas,
                        0);
        tty_fd = (int) window_get(tty, TTY_TTY_FD);
        dup2(tty_fd, STDOUT);
        dup2(tty_fd, STDIN);
        dup2(tty_fd, 2);           /* temp. hack to redef. stderr */
} create_collide_panel()
{
        int x,y, maxx, maxy;
        void collide_done();

collide_frame = window_create(base_frame,FRAME,FRAME_SHOW_LABEL, FALSE,
                                FRAME_NO_CONFIRM, TRUE,
```

32

```
        O);
collide_panel = window_create(collide_frame, PANEL, 0);
panel_create_item(collide_panel,PANEL_MESSAGE,
          PANEL_LABEL_STRING, "VEHICLE IN COLLISION COURSE",
          0);
panel_create_item(collide_panel,PANEL_MESSAGE,
          PANEL_LABEL_IMAGE, (struct pixrect *) &collide_pr,
          0);
window_fit(collide_panel);
window_fit(collide_frame);
maxx = (int) window_get(base_frame, WIN_WIDTH);
maxy = (int) window_get(base_frame, WIN_HEIGHT);
x = (int) window_get(collide_frame, WIN_WIDTH);
y = (int) window_get(collide_frame, WIN_HEIGHT);
window_set(collide_frame,
          WIN_X, (maxx-x)/2,
          WIN_Y, (maxy-y)/2,
          0);
window_set(collide_frame,WIN_SHOW, FALSE, 0);
}
```

```
/* printout of file: csload.c */
/*****************************/ include <stdio.h>
include "externs.h"

#define headerfmt "%d%d%d"

loadcs(filename)
char *filename;
{
    load_header();
} storecs(filename)
char *filename;
{
    file *sfp;   /* stored file pointer */
    fopen(filename,"w");
    store_header(sfp);
} store_header(fp)
file *fp;
{
    fprintf(fp,HEADERFMT,
        xsize,ysize,zsize,resolution,states_per_unit,
        streetlength,streetwidth);
} load_header(fp)
file *fp;
{
    fscanf(fp,HEADERFMT,
        &xsize,&ysize,&zsize,&resolution,&states_per_unit,
        &streetlength,&streetwidth);
}
```

34

```
/* printout of file: curb.pr */
/*****************************/

/* Format_version=1, Width=8, Height=4, Depth=1, Valid_bits_per_item=16
*/
    0x0F00,
    0x0F00,
    0x0F00,
    0x0F00
```

```
/* printout of file: defines.h */
/******************************************/ include <math.h>
define TRUE 1
define FALSE 0 define VALID YES
define NOT_VALID NO

/******************************************************************/
/*      defines.h                                                  */
/*      history:                                                   */
/*              created 1986/09/xx Leo Dorst                       */
/*              mod     1986/11/13 Leo + Karen                     */
/******************************************************************/
#define CENTIMETER 4       /* number of pixels per centimeter */
                           /* since obstacles are saved in the bitplanes
                              of the array con, the number of obstacles
define NUMOBS 10            should not exceed sizeof(type of con) */ define FLOATWORLD YES define MAXOBS 1000 define COST_DIST_RATIO 1000
/* the Cost is 1000 times the distance */ define LOWRES
/*******************************************/ ifdef LOWRES
define STATES_PER_UNIT 4       /* change RESOLUTION */
#define RESOLUTION .25
#else
#define STATES_PER_UNIT 10      /* change RESOLUTION */
#define RESOLUTION .1
endif define RESOLUTION100 ((int)(RESOLUTION*100))
/* I was here-- kit! */         /* feet/state */ define PRIMARY_DIRECTIONS 6 define DIRECTION_COUNT 24
/* number of neighbors to each node (max) */ define CARLENGTH 3.0    /* total car length */
define WHEELBASE 2      /* distance between front and rear axles */
#define HALFWIDTH .75    /* half the width of the car */
#define REAR 0.50        /* distance between rear axle and back bumper */
```

```c
#ifdef CAR_FOR_2_RES
#define CARLENGTH (16*RESOLUTION)       /* total car length */
#define WHEELBASE (9*RESOLUTION)        /* distance between front and rear axles */
#define HALFWIDTH (4*RESOLUTION)        /* half the width of the car */
define REAR (3*RESOLUTION)             /* distance between rear axle and back bumper */ endif define FRONT (CARLENGTH - REAR)
                                        /* dist between front bumper and rear axle */ define CPLANES 64 /* number of states in the C direction */
define TWOPI (2*PI)
define CINC (double)(TWOPI/CPLANES)    /* radians per C slice */ define CRAD ((TWOPI)/CPLANES)

define STREETLENGTH 9 /* length of street in question */
define STREETWIDTH  6 /* street area + side parking */ define XSIZE (int) (STREETLENGTH / RESOLUTION)
/* the number of states in x direction */ define YSIZE (int) (STREETWIDTH / RESOLUTION)
/* the number of states in y direction */ define ZSIZE CPLANES   /* for the sake of simplicity */ define HIRES 1         /* 1 if you want hires screen options, 0 otherwise */
define CMARGIN 20 define CSTEP       0           /* this includes 1 pixel cell boundary */
/*#define CELL_SIZE  (512/XSIZE)*/
/*#define CXSIZE              (2*CMARGIN+XSIZE*(CSTEP+CELL_SIZE)+CSTEP)*/
/*#define CYSIZE              (2*CMARGIN+YSIZE*(CSTEP+CELL_SIZE)+CSTEP)*/
#define PNT_OFFSET  ( CMARGIN + CSTEP + 1 )
#define MAXDIM 16       /* maximum dimension for basic pattern */
#define MAXSIZE         (MAXDIM*MAXDIM)
/* if direction count is restored to 16. ADD the initialed values*/
/*that are in globals.h!!!! */
/* #define DIRECTION_COUNT 16*/ define INFINITY        (COSTTYPE) 9e6
/*(MAXFLOAT/2.) /* code for infinite values */ define UNCOSTED        (COSTTYPE) 8e6
/*(INFINITY * .999999) /* code for undetermined values */ define CONSTRAINT      1       /* code for constraint */
define NOCONSTRAINT    0       /* code for absence of constraints */
#define GOAL            1       /* code for goal points */
#define NOGOAL          0       /* code for goal points */
```

```c
#define OBSTACLE      -1           /* obstacle pointer */
#define IP            777          /* initial pointer */
#define PI            3.1415926
/* dimensions of task space */
#define CARTMARGIN    0
#define CARTWIDTH     (128*CENTIMETER)
#define CARTHEIGHT    (128*CENTIMETER)
#define XBASE         ((CARTWIDTH-2*CARTMARGIN)/2 + CARTMARGIN)
#define YBASE         ((CARTWIDTH-2*CARTMARGIN)/2 + CARTMARGIN)
/* dimensions of setup on screen */
#define FRAMEQ_XOFFSET 20
#define FRAMEQ_YOFFSET 110
#define BLOCK_BUTTON  0
#define START_BUTTON  0
#define GOAL_BUTTON   3
#define DGOAL_BUTTON  1
#define POINTER_BUTTON 2
#define MOVEMODE      0
#define PATHMODE      1
#define NDARM         2
#define FLOW          0
#define NOFLOW        1
#define PIX_COLOR(color) ((color)<<5)
#define MAXPATH (XSIZE+YSIZE) /* maximum path length */
#include <stdio.h>
include <math.h> define INPUT         0
define PROPAGATE     1
#define PREPARE       2
define GRADIENT      3 define MAX_GOAL_NUMBER 30 define YES           1
define NO            0 define KILLGOALS     0
define KEEPGOALS     1 define MOTION        0
define DISTANCE      1
define EFFORT        2 typedef short VECTYPE ;  /* bit string of direction flags */ typedef int INDEXTYPE ;  /* indices into CS. */ typedef float COSTTYPE;

typedef struct csnode {
    COSTTYPE cost_to_goal;
```

```
        INDEXTYPE parent_x,parent_y,parent_c;
        VECTTYPE vector;         /* 42 possible directions */
} CSNODE;

typedef struct neighbornode {
        COSTTYPE dist;
        int dx,dy,dc;
} NEIGHBORNODE;

typedef unsigned int ALLINDICIES;    /* length of x&y&z together */ typedef struct xynode {
        int x;                   /* could be a char !! */
        int y;
        int z;                   /* index of car angle in tenth of radians */
} XYNODE, HEAPNODE;

typedef struct polnode {
        int x;                   /* must be int !! */
        int y;
        int c;
} POLNODE;

#define ACCURACY (.0001)

#define MAXHEAP ((int)(XSIZE*YSIZE*CPLANES))

/* #define MAXHEAP ((int)((XSIZE*YSIZE*CPLANES)>>2 )) */ define MAXPERIM 2000 define NUMVERTICES 12 /* maximum number of vertices in a polygon */ typedef COSTTYPE (*PFF)();

define DRAWOBS  0
#define ADDOBS   1
#define REMOBS  -1
#define HALFWAY  2

/* constraint dimensions */ define ator(a) ((PI/180) * a)
define rtoa(r) (r*180/PI)

#define resol(x) (((int) (x / RESOLUTION)) * RESOLUTION)

#define dist_to_state(x) ((int)((x*1.001) / RESOLUTION))
/*
#define dist_to_state(x) (x>0? (int)((x / RESOLUTION)+.5): (int)((x/RESOLUTION) -.5))
leo */ define state_to_dist(y) ((COSTTYPE)y * RESOLUTION)
```

```
#define radians_to_state(r) ((int)((1.02*r)*CPLANES/TWOPI))
#define state_to_radians(s) ((float)(s*TWOPI/CPLANES))

#define D0   0
#define D45  1
#define D315 2
#define REVERSE 3
#define D180 3
#define D225 5
define D135 4 define MOVING_WHEEL_COLOR    RED
define SWEEPING_WHEEL_COLOR  RED define CELL_SIZE 64
```

• • • • • • • • • • • • • • • • • • • • • •

```
/* printout of file: demo */
/*****************************/
demo.nonscaled -Wp 0 0 -Wb 255 255 255 -Wg -Ws 900 600
```

```
/* printout of file: demo.c */
/*********************************************/ include "defines.h"
include "externs.h"
#include "globals.h"
/*********************************************
    armdemo2.c
    history:
           created 19860912        Leo Dorst
           modified 19861113       Leo + Karen
*********************************************/

INDEXTYPE c1x = 0;
INDEXTYPE c1y = 0;
INDEXTYPE c2x = 0;
INDEXTYPE c2y = 0;

plan_path(s_x,s_y,s_c, k1_x, k1_y, k2_x, k2_y)
INDEXTYPE s_x,s_y,s_c, k1_x, k1_y, k2_x, k2_y;
{
    int tx,ty,tc,td,nx,ny,nc;

if((c1x!= k1_x) || (c1y != k1_y) ||
       (c2x!= k2_x) || (c2y != k2_y))
    {
        c1x=k1_x;
        c1y=k1_y;
        c2x=k2_x;
        c2y=k2_y budinit();
        /*printf("plan_path: entry point()");*/
        mode=PATH-MODE;
        /* sxm has done budinit() */ istart=s_x;
        jstart=s_y;
        kstart=s_c;

starts_address= &(configspace[kstart][istart][jstart]);

init_goals();
        /*printf("plan_path: initialized goals()");*/ transform_cars(k1_x,k1_y,k2_x,k2_y);

set_goal(k1_x,k1_y,k2_x,k2_y);

/*printf("plan_path: about to regenerate !()");*/
        regenerate();
        /*printf("plan_path: about to find and draw !()");*/
```

42

```
        printf("0");
        /*system("sleep 5");*/
}
        find_and_draw_shortest_path2(s,x,s,y,s_c);
/* printf("returning to main_handler.0); */
} find_and_draw_shortest_path2(s_x,s_y,s_c)
INDEXTYPE s_x,s_y,s_c;
{
        int tx,ty,tc,td,nx,ny,nc;
        int cx,cy,cc;
        int wheels;
        COSTTYPE dummy;
        CSNODE *stateptr;

tx= s_x;
        ty= s_y;
        tc= s_c;

stateptr= &(configspace[tc][tx][ty]);

/*printf("initial vector=%x(x)0,stateptr->vector);*/ if(stateptr->vector == IP)
        {
                if(stateptr->cost_to_goal == 0) /* at goal */
                        printf("AT GOAL ALREADY0");
                else    printf("CAN'T GET TO GOAL FROM HERE0);
                        /* collide_proc(); */
                return;
        }
        if ((stateptr->vector == UNCOSTED) ||
            (stateptr->cost_to_goal == INFINITY))
        {
                        printf("CAN'T GET TO GOAL FROM HERE0);
                        return;
        } wheels= (int) ((stateptr->vector) / STATES_PER_UNIT);

/* if(is_sun) */
        drive_car(tx,ty,tc,wheels);

/*
        printf("drive_car to (x,y,c= %d,%d,%d), w=%d0,
                tx,ty,tc,wheels);
        */
        while((stateptr->cost_to_goal != 0)
        &&(stateptr->cost_to_goal != UNCOSTED) &&
          (stateptr->cost_to_goal != INFINITY))
        {
```

43

```
#ifdef DEBUGING_NEIGHBORS          /* next is new */
        neighbor(&dummy,
            tx,ty,tc,stateptr->vector,&cx,&cy,&cc);
#endif
            nx= stateptr->parent_x;
            ny= stateptr->parent_y;
            nc= stateptr->parent_c;
            /* next is new */
            if((cx!= nx) || (cy != ny) || (cc != nc))
printf("BAD NEIGHBOR: (x,y,c) %d!=parent(%d), %d!=%d or %d!=%d0,
            cx,nx,cy,ny,cc,nc);
#endif
        wheels= (int) ((stateptr->vector) / STATES_PER_UNIT);
        /*
        printf("drive_car to (x,y,c= %d,%d,%d), w=%d0,
            nx,ny,nc,wheels);
        */
        /*if(is_sun) */
            drive_car(nx,ny,nc,wheels);
            tx=nx;ty=ny;tc=nc;
            stateptr= &(configspace[tc][tx][ty]);
        }
        wheels= (int) ((stateptr->vector) / STATES_PER_UNIT);
        /*printf("Last state:0);
        printf("drive_car (x,y,c= %d,%d,%d), w=0(by def)0,
            tx,ty,tc,wheels);*/
        /*if (is_sun)*/
            drive_car(tx,ty,tc,0);
}
```

44

```
/* printout of file: draw.c */
/*****************************************
 *  FILE:        draw.c
 *  AUTHOR:      Sandeep Mehta, R&FA, Philips Labs, Briarcliff Manor, NY
 *  DATE:        Mon Mar 21 16:33:03 EST 1988
 *  PURPOSE:     parking path planner drawing routines
 *
 *  DESCRIPTION:
 *  FUNCTIONS:
 *  LIBRARIES:
 *
 *  Modification History:
 *  - created Mon Mar 21 16:33:03 EST 1988 - sxm
 */
#ifndef lint
static char draw_c_sccsinfo[] = " %Z% %M% %I% %D%";
#endif
extern int errno;

#include <stdio.h>       /* standard C library */
#include <math.h>
#include <pixrect/pixrect_hs.h>
#include "rgb.h"
#include "defines.h"
include "externs.h"

extern int sweepmode;
extern int patentmode;
extern Pixrect car_pr;
int trace[SMOOTH_FACTOR][2];
int smooth_factor;

#define OBSCOLOR BLUE
/*
 * Obstacle pixrects
 */
static short obs_image[] =
#include "obs.pr"
};
mpr_static(obs_pr,32,32,1,obs_image);

static short curb_image[] =
{
#include "curb.pr"
};
mpr_static(curb_pr,16,8,1,curb_image);
static short solidcar_image[] =
{
#include "car.pr"
```

```
};
mpr_static(solidcar_pr,32,16,1,solidcar_image);

/*
 * Obstacles
 */
struct pr_pos obs1_lst[MAXVERTS] =
{
    {0,0},{0,0},{0,0},{0,0}
};
struct pr_pos obs2_lst[MAXVERTS] =
{
    {0,0},{0,0},{0,0},{0,0}
};
struct pr_pos curb[MAXVERTS] =
{
    {0,0},{0,0},{0,0}
};
/*
 * FUNCTION:    draw_obs1()
 * PURPOSE:     draw obstacle #1
 */
draw_obs1(x,y)
    int x,y;
{
    int nbds = 1;
    int npts[1];

npts[0] = MAXVERTS;

pw_polygon_2(park_canvas_pw,0,0,nbds,npts,obs1_lst,PIX_CLR,
                 (struct pixrect *) NULL,0,0);

obs1_lst[0].y = obs1_lst[1].y = (dist_from_curb*STATES_PER_UNIT*yres);
    obs1_lst[1].x = obs1_lst[2].x = (int) ((x/xres)+0.5)*xres;
    obs1_lst[2].y = obs1_lst[3].y = (int) ((y/yres)+0.5)*yres;

pw_polygon_2(park_canvas_pw,0,0,nbds,npts,obs1_lst,
                 PIX_SRC | PIX_COLOR(OBSCOLOR), (struct pixrect *) NULL,0,0);
}

/*
 * FUNCTION:    draw_obs2()
 * PURPOSE:     draw obstacle #2
 */
draw_obs2(x,y)
    int x,y;
{
    int nbds = 1;
    int npts[1];
```

46

```
npts[0] = MAXVERTS;

pw_polygon_2(park_canvas_pw,0,0,nbds,npts,obs2_lst,PIX_CLR,
             (struct pixrect *) NULL,0,0);

obs2_lst[0].x = maxx;
obs2_lst[0].y = obs2_lst[1].y = (dist_from_curb*STATES_PER_UNIT*xres);
obs2_lst[1].x = obs2_lst[2].x = (int) ((x/xres)+0.5)*xres;
obs2_y = obs2_lst[2].y = obs2_lst[3].y = (int) ((y/yres)+0.5)*yres;
obs2_lst[3].x = maxx;

pw_polygon_2(park_canvas_pw,0,0,nbds,npts,obs2_lst,
             PIX_SRC | PIX_COLOR(OBSCOLOR), (struct pixrect *) NULL,0,0);

}

/*
** FUNCTION:    draw_curb()
** PURPOSE:     draw curb
*/
draw_curb()
{
    int offy;
    int nbds = 1;
    int npts[1];

npts[0] = MAXVERTS;

pw_vector(park_canvas_pw,0,0,maxx-1,0,PIX_CLR,(Pixrect *) NULL);
    pw_vector(park_canvas_pw,0,0,maxx-1,PIX_SRC | PIX_COLOR(OBSCOLOR),0);

pw_vector(park_canvas_pw,maxx,0,maxx-1,maxy-1,PIX_CLR,(Pixrect *) NULL);
    pw_vector(park_canvas_pw,maxx,0,maxx-1,maxy-1,
              PIX_SRC | PIX_COLOR(OBSCOLOR), (Pixrect *) NULL);

pw_vector(park_canvas_pw,maxx-1,maxy-1,PIX_CLR,(Pixrect *) NULL);
    pw_vector(park_canvas_pw,0,maxx-1,maxy-1,
              PIX_SRC | PIX_COLOR(OBSCOLOR), (Pixrect *) NULL);

pw_polygon_2(park_canvas_pw,0,0, nbds, npts, curb,PIX_CLR, (Pixrect *) NULL,0,0);
    curb[1].x = curb[2].x = maxx;
    curb[3].y = curb[2].y = CURB_WIDTH*2;
    pw_polygon_2(park_canvas_pw,0,0, nbds, npts, curb,PIX_SRC | PIX_COLOR(OBSCOLOR) ,
                 (Pixrect *) NULL,0,0);
}

/*
```

```
* FUNCTION:      draw_grid()
* PURPOSE:       draw a grid on the canvas (parking lot) in STATES
*/
draw_grid(op)
   int op;
{
   register int i;
   int xgrid = (int) (xres+0.5);
   int ygrid = (int) (yres+0.5);

pw_batch(park_canvas_pw, PW_ALL);
   for ( i = 0 ; i < XSIZE ; i++)
      pw_vector(park_canvas_pw, i*xgrid, 0, i*xgrid, maxy, (int) op, NULL);
   for ( i = 0 ; i < YSIZE ; i++)
      pw_vector(park_canvas_pw, 0, i*ygrid, maxx, i*ygrid, (int) op, NULL);
   pw_show(park_canvas_pw);
   pw_batch(park_canvas_pw, PW_NONE);
}

/*
* FUNCTION:      draw_car()
* PURPOSE:       draw car
*/
draw_car()
{
   register int i;
   int nbds = 1;
   int npts[1];
   int color;

if(sweepmode)
      color= SWEEPING_WHEEL_COLOR;
   else color=MOVING_WHEEL_COLOR;

if (sweepmode)
   {
      npts[0] = MAXVERTS;
      pw_polygon_2(park_canvas_pw,0,0,nbds,npts,car_vlst,PIX_SRC | PIX_COLOR(BLACK),
                   (Pixrect *) &solidcar_pr,0,0);
   } for ( i = 1 ; i < MAXVERTS ; i++)
      pw_vector(park_canvas_pw, car_vlst[i-1].x,car_vlst[i-1].y,car_vlst[i].x,car_vlst[i].y,
                PIX_SRC, GREEN);
   pw_vector(park_canvas_pw, car_vlst[3].x,car_vlst[3].y,car_vlst[0].x,car_vlst[0].y,
             PIX_SRC, GREEN);

/* next is the wheels */
   pw_vector(park_canvas_pw,fw_lst[0].x,fw_lst[0].y,fw_lst[1].x,fw_lst[1].y,PIX_SRC, color);
   pw_vector(park_canvas_pw,fw_lst[2].x,fw_lst[2].y,
```

48

```c
          fw_lst[3].x,fw_lst[3].y,PIX_SRC, color);
    pw_vector(park_canvas_pw,fw_lst[5].x,fw_lst[4].x,fw_lst[4].y,
          fw_lst[5].x,fw_lst[5].y,PIX_SRC, color);
    pw_vector(park_canvas_pw,fw_lst[6].x,fw_lst[6].y,
          fw_lst[7].x,fw_lst[7].y,PIX_SRC, color);
    if (!patentmode)
    {
        pw_vector(park_canvas_pw,cov_lst[0].x,cov_lst[0].y,cov_lst[1].x,cov_lst[1].y,
              PIX_SRC, MAGENTA);
        pw_vector(park_canvas_pw,cov_lst[2].x,cov_lst[2].y,cov_lst[3].x,cov_lst[3].y,
              PIX_SRC, MAGENTA);
    }
}

/*
 * FUNCTION:    erase_car()
 * PURPOSE:     erase the car
 */
erase_car()
{
    register int i;
    int npts[1];
    int nbds = 1;
    int color;

if(sweepmode) color=SWEEPING_WHEEL_COLOR; else color =
                  MOVING_WHEEL_COLOR;

npts[0] = MAXVERTS;

/*pw_batch_on(pw);kit*/
    for ( i = 1; i < MAXVERTS ; i++)
    pw_vector(park_canvas_pw, car_vlst[i-1].x,car_vlst[i-1].y,car_vlst[i].x,car_vlst[i].y,
              PIX_NOT(PIX_SRC) & PIX_DST, GREEN);
    pw_vector(park_canvas_pw, car_vlst[3].x,car_vlst[3].y,car_vlst[0].x,car_vlst[0].y,
              PIX_NOT(PIX_SRC) & PIX_DST, GREEN);

pw_vector(park_canvas_pw,fw_lst[0].x,fw_lst[0].y,
          fw_lst[1].x,fw_lst[1].y,PIX_NOT(PIX_SRC) & PIX_DST, color);
    pw_vector(park_canvas_pw,fw_lst[2].x,fw_lst[2].y,
          fw_lst[3].x,fw_lst[3].y,PIX_NOT(PIX_SRC) & PIX_DST, color);
    pw_vector(park_canvas_pw,fw_lst[4].x,fw_lst[4].y,
          fw_lst[5].x,fw_lst[5].y,PIX_NOT(PIX_SRC) & PIX_DST, color);
    pw_vector(park_canvas_pw,fw_lst[6].x,fw_lst[6].y,
          fw_lst[7].x,fw_lst[7].y,PIX_NOT(PIX_SRC) & PIX_DST, color);

pw_vector(park_canvas_pw,cov_lst[0].x,cov_lst[0].y,cov_lst[1].x,cov_lst[1].y,
          PIX_NOT(PIX_SRC) & PIX_DST, MAGENTA);
    pw_vector(park_canvas_pw,cov_lst[2].x,cov_lst[2].y,cov_lst[3].x,cov_lst[3].y,
          PIX_NOT(PIX_SRC) & PIX_DST, MAGENTA);
    /*pw_batch_off(pw); kit */
}
```

```
/*
 * FUNCTION:    drive_car()
 * PURPOSE:     drive the car specified by the quadruple state spac: x,y,c,w
 *              It determines the change in state & does linear interpolation
 *              between the previous quadruple and the current one. This
 *              results in a smoother scenario without the overhead of
 *              computing a lot more states in configuration space.
 */
drive_car(x,y,c,w)
    int x,y;
    int c,w;
{
    char msg[MAXSTRLEN];
    extern int delay;
    double midx, midy;
    double dx, dy, dc;
    register int i;
    double checked_angle();
    COSTTYPE cur_cost, prev_cost, interval_dist;

cur_cost = configspace[c[x][y]].cost_to_goal;
    prev_cost = configspace[(int)prev_angle][prev_x][prev_y].cost_to_goal;
    interval_dist = prev_cost - cur_cost;

define SHOTS_PER_GRID_UNIT 300 smooth_factor = (int) (interval_dist*SHOTS_PER_GRID_UNIT/xres);

dx = ((x-prev_x)*xres)/(smooth_factor);
    dy = ((y-prev_y)*yres)/(smooth_factor);
    dc = checked_angle(c,prev_angle,smooth_factor);

for ( i = 1; i <= smooth_factor ; i++)
    {
        pw_batch_on(park_canvas_pw);  /*kit*/
        if (!sweepmode )  /* erase old car */
        erase_car();
        sprintf(msg,"%d,%d",(int) ((prev_x*xres)+(i*dx)), (int) ((prev_y*yres)+(i*dy)));
        move_car((int) ((prev_x*xres)+(i*dx)), (int) ((prev_y*xres)+(i*dx)),
                 (int) ((prev_y*yres)+(i*dy)));
        panel_set_value(center,msg);
        rotate_car((prev_angle*CINC)+(i*dc));
        sprintf(msg,"%f",(prev_angle*CINC)+(i*dc));
        panel_set_value(angle,msg);
        panel_set_value(a_slider,(int) (prev_angle+((i*dc)/CINC)));
        switch(w)
        {
            case DO:
            case DIBO:
                rotate_wheels((prev_angle*CINC)+(i*dc));
                panel_set_value(wheel,"0.0");
                panel_set_value(w_slider,c);
                break;
```

```
                    /* kit */
            case D135:
            case D45:
                    rotate_wheels((prev_angle*CINC)+(i*dc)+(M_PI/4.0));
                    sprintf(msg,"%f",M_PI/4.0);
                    panel_set_value(wheel,msg);
                    panel_set_value(w_slider, (int) ((M_PI/4.0)/CINC));
                    break;
                    /*kit */
            case D315:
            case D225:
                    rotate_wheels((prev_angle*CINC)+(i*dc)-(M_PI/4.0));
                    sprintf(msg,"%f",-(M_PI/4.0));
                    panel_set_value(wheel,msg);
                    panel_set_value(w_slider, (int) ((7*M_PI/4.0)/CINC));
                    break;
            }
            /* draw_h_line(hline[c]); for diagnosis only. kit 11/88*/
            draw_car();
            /* usleep(delay=200000);kit */
            pw_batch_off(park_canvas_pw); /*kit*/
            /*clear_h_line(hline[c]); for diagnosis only. kit 11/88*/
        }
        prev_x = x;
        prev_y = y;
        prev_angle = c;
        prev_w = w;
    } clear_h_line(h)
int h;
{
    int offy;
    int nbds = 1;
    int npts[1];

npts[0] = MAXVERTS;

pw_polygon_2(park_canvas_pw,0,h*maxx/XSIZE, nbds, npts,
            curb,PIX_CLR, (Pixrect *) NULL, 0, 0);
    curb[1].x = curb[2].x = maxx;
    curb[3].y = curb[2].y = CURB_WIDTH*2;
} draw_h_line(h)
int h;
{
    int offy;
    int nbds = 1;
    int npts[1];

npts[0] = MAXVERTS;
```

```
        curb[1].x = curb[2].x = maxx;
        curb[3].y = curb[2].y = CURB_WIDTH*2;
        pw_polygon_2(park_canvas_pw,0,h+maxx/XSIZE,
                     nbds, npts, curb,PIX_SRC | PIX_COLOR(OBSCOLOR) ,
                     (Pixrect *) NULL,0,0);
} double
checked_angle(c,prev,smooth_factor)
   int c;
   double prev;
   int smooth_factor;
{
   if ( c <= CPLANES/4 && (int) prev >= 3*CPLANES/4 && (int) prev <= CPLANES )
      return((c*CINC+(2*M_PI-(prev*CINC)))/(smooth_factor));
   else
      return((c*CINC-prev*CINC)/(smooth_factor));
}
```

```
/* printout of file: externs.h */
/***************************************************/
/*        externs.h                                 */
/*        history:                                  */
/*              created 198609xx Leo Dorst          */
/*              mod     19861113 Karen Trovato      */
/***************************************************/ include "park.h"

extern Pixwin *park_canvas_pw;

extern show_start_point();
extern show_goal_point();
extern plot_path_element();
/*       cdt.c    */
extern init_cdt();
extern new_cdt();
/********************************************************************/
find_and_draw_shortest_path2();  /*      path.c    */
extern int    istart,jstart,kstart;         /* start point */
extern int    ilast,jlast,klast;
/* configuration space definitions */
/********************************************************************/
extern short    change2;
extern short    change1;
extern short    mode;
extern short    redraw;
extern short    flow;
extern short    speed;
extern short    camera;
extern short    robot;
extern short    gain;
extern float    (*metric_fcn)();    /* ptr to any of the metric fcns */ extern short pathlength;

extern int regeneration_needed;

extern short    num_goals;
extern CSNODE   (*configspace)[XSIZE][YSIZE];
extern CSNODE   *starts_address;
extern          bud();
extern          init_goal();

53
```

```
extern int firsttime;
extern un_bud();                                        /* in bud.c */
extern un_look();                                       /* in bud.c */
extern remove_goal();                                   /* in bud.c */
extern coordinates_of();                /* in bud.c */
extern float metric_value();  /* in metric.c */ extern int newcon;
extern int perim;

extern HEAPNODE perimeter[MAXPERIM+1];  /* heap uses locations 1-> MAXHEAP */
                                /* location 0 isn't used to hasten indexing */
extern XYNODE remobs[MAXOBS];
/* keep newly freed constraints here */
extern XYNODE addobs[MAXOBS];
/* keep newly added constraints here */ extern XYNODE newgoals[MAX_GOAL_NUMBER];/* keep the newly added goals here */
extern XYNODE remgoals[MAX_GOAL_NUMBER];/* keep the newly added goals here */
extern XYNODE goal[MAX_GOAL_NUMBER]; /* cumulative goals kept here */
extern goalcounter;

extern int nfcounter, newgoalcounter, remgoalcounter;
                                /* indicies into above structures */
extern check_new_obs_and_rmd_goals();   /* in bud.c */
extern check_free_obs_and_new_goals();  /* in bud.c */ extern clear_influence();  /* in bud.c */
extern budinit();          /* in bud.c */ extern int addobscounter;
extern int remobscounter;

extern int object;

extern int new_object;

extern XYNODE parked_car1, parked_car2;

extern XYNODE mycar;
extern neighbor();        /* in neighbor.c gets neighbor in dir */ extern int car1x,car1y, car2x, car2y;
extern set_goal();                     /* in transform.c */
extern transform_cars();               /* in transform.c */ extern CSNODE uncost_node;

54
```

```
extern VECTTYPE opposing[PRIMARY_DIRECTIONS*STATES_PER_UNIT];
extern drive_car();

extern is_sun;
extern float carlength;
extern float wheelbase;
extern float halfwidth;
extern float rear;
extern float front;

extern oldx,oldy,oldc; /* for graphics of car */ extern float dist_from_curb;

extern NEIGHBORNODE local_neighbor[CPLANES][PRIMARY_DIRECTIONS*STATES_PER_UNIT];

extern init_local_neighbors();

extern struct pixrect *goal_icon_ptr;

extern int hline[CPLANES];

#include "copyright.extern"
```

```
/* printout of file: globals.c */
/*****************************************/
/*
 *    FILE   :   globals.c
 *    AUTHOR :   Sandeep Mehta, R&FA, Philips Labs, Briarcliff Manor, NY
 *
 *    DATE:      Tue Mar 22 15:33:59 EST 1988
 *    PURPOSE:   global vars
 *
 *    DESCRIPTION:
 *    FUNCTIONS:
 *    LIBRARIES:
 *
 *    Modification History:
 *    - created Tue Mar 22 15:33:59 EST 1988 - sxm
 */
#ifndef lint
static char globals_c_sccsinfo[] = " %Z% %M% %I% %D%";
#endif
extern int errno;
#include <stdio.h>          /* standard C library */
#include "park.h"

/*
 * Car vertex list.
 */
struct pr_pos car_vlst[MAXVERTS] =
{ (70,25),(-29,25),(-29,-24),(70,-24)};

struct pr_pos car_cov_lst[MAXVERTS] =
{ (60,25),(40,25),(60,-24),(40,-24),
  (10,25),(-9,25),(10,-24),(-9,-24)};

struct pr_pos unit_vlst[MAXVERTS] =
{ (70,25),(-29,25),(-29,-24),(70,-24)};

struct pr_pos unit_cov[MAXVERTS] =
{ (0,10),(0,-9),(10,0),(-9,0)};

struct pr_pos unit_fw[WHEELS] =
{ (60,25),(40,25),(60,-24),(40,-24),
  (10,25),(-9,25),(10,-24),(-9,-24)};

9
9
                                         56
```

```
/* printout of file: globals.h */
/*****************************************/

/*
 *    FILE :            globals.h
 *    AUTHOR :          Karen Trovato and Leo Dorst,
 *                      R&FA, Philips Labs, Briarcliff Manor, NY
 *
 *    DATE:             Mon Mar 28 1988
 *    PURPOSE:          global vars
 *
 *    DESCRIPTION:
 *    FUNCTIONS:
 *    LIBRARIES:
 *
 *    Modification History:
 *
 */

/****************************************************************/
/* type definitions */
/****************************************************************/ int     istart,jstart,kstart;           /* start point */
int     ilast,jlast,klast;

/****************************************************************/
/* canvas treatment: cell dimensions */
/****************************************************************/ short change2;
short change1;
short mode;
short redraw;
short flow;
short speed;
float (*metric_fcn)();       /* ptr to any of the metric fcns */
short gain;
short camera;
short robot;

/****************************************************************/
short pathlength;

int regeneration_needed;

float carlength = CARLENGTH;
float wheelbase = WHEELBASE;
float halfwidth = HALFWIDTH;
```

```
float rear= REAR;
float front= FRONT;

short   num_goals;

int firsttime;
/* right, left, up, down, forward, backward */

XYNODE remobs[MAXOBS]; /* keep newly freed constraints here */
XYNODE addobs[MAXOBS]; /* keep the new obstacles (=constraints) here */

XYNODE newgoals[MAX_GOAL_NUMBER];/* keep the newly added goals here */
XYNODE remgoals[MAX_GOAL_NUMBER];/* keep the newly removed goals here */
XYNODE goal[MAX_GOAL_NUMBER];    /* all known goals are in here */ int goalcounter;    /* number of pts in goal[].pts to next free */
int nfcounter = 0;  /* newly freed index. pts to next free spot for data*/
int newgoalcounter = 0; /* index for newgoals. pts to next free spot for data*/
int remgoalcounter = 0; /* index for remgoals. pts to next free spot for data*/ int addobscounter = 0; /* number of points in addobs */
int remobscounter = 0; /* number of points in remobs */

CSNODE uncost_node = {UNCOSTED,0,0,0,0};

CSNODE *starts_address;

int object;
int new_object;

XYNODE parked_car1, parked_car2;

XYNODE mycar;

int car1x,car1y, car2x,car2y;

CSNODE (*configspace)[XSIZE][YSIZE];

VECTTYPE opposing[PRIMARY_DIRECTIONS*STATES_PER_UNIT];
/* lookup table of arrow opposing */ int is_sun;
INDEXTYPE oldx, oldy, oldc;

float dist_from_curb;

NEIGHBORNODE local_neighbor[CPLANES][PRIMARY_DIRECTIONS*STATES_PER_UNIT];

static unsigned short goal_data[] = {
#include "cargoal.icon"
};

int hline[CPLANES];
```

```
mpr_static (cargoal_icon,CELL_SIZE,CELL_SIZE,1,goal_data);
struct pixrect *goal_icon_ptr = &(cargoal_icon);
#include "copyright.def"
Pixwin *park_canvas_pw;
```

```
/* printout of file: goal.cursor */
/***********************************/

/* Format_version=1, Width=16, Height=16, Depth=1, Valid_bits_per_item=16
*/
    0x0000, 0x03f0, 0x0C1B, 0x1004, 0x3006, 0x2C1A, 0x4221, 0x41C1,
    0x41C1, 0x4221, 0x4C19, 0x3006, 0x2002, 0x1004, 0x0C1B, 0x03E0
```

```
/* printout of file: handler.c */
/******************************/

/*
 *   FILE   :    handler.c
 *   AUTHOR :    Sandeep Mehta, R&FA, Philips Labs, Briarcliff Manor, NY **  DATE:  Mon Mar 21 16:32:36 EST 1988
 *   PURPOSE:    park path planner event handlers
 *
 *   DESCRIPTION:
 *   FUNCTIONS:
 *   LIBRARIES:
 *
 *   Modification History:  *  - created Mon Mar 21 16:32:36 EST 1988 - sxm */
#ifndef lint static char handler_c_sccsinfo[] = " %Z% %M% %I% %D%";
#endif extern int errno;

#include <stdio.h>              /* standard C library */
#include <math.h>
#include "rgb.h"
#include "defines.h"
include "externs.h"

#define MSE_RES 25
define MINMSEDIST   70.0 short goal_img[] =
{
#include "goal.cursor"
};
mpr_static(goal_pr,16,16,1,goal_img);

int obs_moved = TRUE;
int delay;
int sweepmode;
int gridmode;
int patentmode = FALSE;

clr_panel()
{
    char msg[MAXSTRLEN];
    sprintf(msg,"%f",0.0);

/*  panel_set_value(angle,msg);*/
    panel_set_value(wheel,msg);
    panel_set_value(obs1,msg);
    panel_set_value(obs2,msg);

panel_set_value(a_slider,(int) (INIT_THETA));

sprintf(msg,"%f",INIT_THETA * CINC);
    panel_set_value(angle,msg);

sprintf(msg,"%d %d",(int) (INIT_X/xres),(int) (INIT_Y/yres));
```

```
/*                  (cov_lst[3].x+cov_lst[2].x)/(2*RESOLUTION100),
                    (cov_lst[3].y+cov_lst[2].y)/(2*RESOLUTION100));
*/
    panel_set_value(center,msg);
/* kit 8/15/88 use initial state to report position */
    pw_write(park_canvas.pw,0,0,maxx,maxy,PIX_CLR,0,0,0);
    erase_car();
    if (gridmode)
        draw_grid(PIX_SRC);
    draw_obs1(obs1_x,obs1_y);
    draw_obs2(obs2_x,obs2_y);
    draw_curb();
    draw_car();
    window_set(collide_frame,WIN_SHOW,FALSE, 0);
} mse_handler(canvas, event)
    Canvas canvas;
    Event *event;
{
    int x, y;
    char msg[MAXSTRLEN];
    int del_x, del_y;

x = event_x(event);
    y = event_y(event);
    del_x = (int) abs(x-pmse_x);                /* delta */
    del_y = (int) abs(y-pmse_y);

/*  pw_batch_on(park_canvas.pw);*/
    if (event_id(event) == LOC_DRAG &&
        window_get(canvas, WIN_EVENT_STATE, MS_LEFT))
    {
        if (valid_obs1(x,y))
        {
            draw_obs1(x,y);
            sprintf(msg,"%f,%f", x/xres, y/yres);
            panel_set_value(obs1.msg);
            obs_moved = TRUE;
        }
        else if (valid_obs(2,x,y))
        {
            draw_obs2(x,y);
            sprintf(msg,"%f,%f",x/xres,y/yres);
            panel_set_value(obs2,msg);
            obs_moved = TRUE;
        }
        else if(valid_car(x,y))
        {
            if (del_x >= (int) xres || del_y >= (int) yres)
```

```
{
    pmse_x = x;
    pmse_y = y;                                          /* update prev pos. */
    x = (int) ((x/xres)+0.5)*xres;
    y = (int) ((y/yres)+0.5)*yres;
    erase_car();
    translate_car(x-((cov_lst[3].x+cov_lst[2].x)/2),
                  y-((cov_lst[3].y+cov_lst[2].y)/2));
    draw_car();
    sprintf(msg,"%d,%d",
                  (cov_lst[3].x+cov_lst[2].x)/(2*RESOLUTION100),
                  (cov_lst[3].y+cov_lst[2].y)/(2*RESOLUTION100));
    panel_set_value(center,msg);
}
#ifdef DEBUG
else
{
    switch(event_id(event)){
    case MS_LEFT:
        printf("hitting LEFT mouse button0);
        break;
    case MS_MIDDLE:
        printf("hitting MIDDLE mouse button0);
        break;
    case MS_RIGHT:
        printf("hitting RIGHT mouse button0);
    }
}
endif
/*   pw_batch_off(park_canvas_pw);*/
} zoom_car(item,value,event)
Panel_item item;
int value;
Event *event;
{
    erase_car();
    scale_car((double) (0.2*value),(double) 0.2*value);
    draw_car();
} int
valid_obs(flag,x,y)
int flag;                                  /* obstacle number */
int x,y;                                   /* mouse position */
{
    switch(flag)
    {
```

63

```
        case 1:
          if ((abs(x-obs1_x) <= MSE_RES) && (abs(y-obs1_y) <= MSE_RES) &&
              (x < obs2_x))
            return 1;
          else return 0;
        case 2:
          if ((abs(x-obs2_x) <= MSE_RES) && (abs(y-obs2_y) <= MSE_RES) &&
              (x > obs1_x))
            return 1;
          else
            return 0;
        default:
            return 0;
    }
} int
valid_car(x,y)
int x,y;
{
    double midx = (cov_lst[2].x+cov_lst[3].x)/2;
    double midy = (cov_lst[2].y+cov_lst[3].y)/2;
    double dist = sqrt(((midx-x)*(midx-x))+((midy-y)*(midy-y)));

if ( dist < MINMSEDIG1 )
        return 1;
    else return 0;
} rotate_proc(item, value, event)
Panel_item item;
int value;
Event *event;
{
    char msg[MAXSTRLEN];

erase_car();
    rotate_car((value*CINC));
    draw_car();
    sprintf(msg, "%f", (value*CINC));
    prev_angle = value;
    panel_set_value(angle,msg);
} rotate_wheels_proc(item, value, event)
Panel_item item;
int value;
Event *event;
{
    char msg[MAXSTRLEN];

erase_car();
    rotate_wheels((prev_angle+value)*CINC);
```

64

```
        draw_car();
        prev_w = value;
        sprintf(msg,"%f",(value*CINC));
        panel_set_value(wheel,msg);
} goal_proc()
{
        int msex,msey;
        int x,y,c;
        extern process_goal();
        Pixfont *pf;
        Event evt;
        Cursor oldcur;

oldcur = cursor_copy(window_get(park_canvas, WIN_CURSOR));
        window_set(park_canvas,WIN_CURSOR, cursor_create(CURSOR_IMAGE, &goal_pr,
                                        CURSOR_XHOT, 8,
                                        CURSOR_YHOT, 8,
                                        0);
        while(window_read_event(park_canvas, &evt) == -1 ! !event_is_down(&evt) !
                !event_is_button(&evt));
        msex = event_x(&evt);
        msey = event_y(&evt);
        window_set(park_canvas, WIN_CURSOR, oldcur,0);
        pf = pf_open("/usr/lib/fonts/fixedwidthfonts/cour.b.24");
        pw_ttext(park_canvas, pw,msex,msey,PIX_SRC ! PIX_COLOR(WHITE), pf, "G");

x = (int) ((msex/xres)+0.5);
        y = (int) ((msey/yres)+0.5);
        c = (int) (prev_angle+0.5);
        process_goal(x,y,c);
} diag_proc()    /* for given xyc dump adjacent cs */
{
        CSNODE *csp;
        int tx,ty,tc;
        int curx,cury,curc;
        extern CSNODE (*configspace)[XSIZE][YSIZE];

curx = (int) ((pmse_x/xres)+0.5);
        cury = (int) ((pmse_y/yres)+0.5);
        curc = (int) (prev_angle+0.5);

printf("home x,y,c is %d,%d,%d",curx,cury,curc);

for(tc=(curc-2);tc<((curc+3);tc++)
        {
                printf("0c slice %d:0;tc);
```

```
            for(ty=(cury-4);ty<(cury+5);ty++)
            {
                for (tx=(curx-4);tx<(curx+4;tx++)
                {
                    csp = &(configspace[tc][tx][ty]);
                    if(csp->cost_to_goal == INFINITY)
                        printf(" %9s ","OBSTACLE");
                    else
                        printf("%2d,%2d,%2d ",csp->parent_x - tx,
                        csp->parent_y - ty,csp.csp->parent_c - tc);
                }
                printf("0);
            }
} clrgoal_proc()
{
    extern clear_vectors_and_costs();
    printf("clearing goals0);
    clear_vectors_and_costs(KILLGOALS);
    printf("after clearing goals0);
} park_proc()
{
    int s_x, s_y, s_c, k1_x, k1_y, k2_x, k2_y;
    register int i;
    int midx = (int) (cov_lst[2].x+cov_lst[3].x)/2.0;
    int midy = (int) (cov_lst[2].y+cov_lst[3].y)/2.0;

extern plan_path();
    extern int trace[SMOOTH_FACTOR][2];

prev_x = s_x = (int) ((midx/xres)+0.5);
    prev_y = s_y = (int) ((midy/yres)+0.5);
    s_c = (int) (prev_angle+0.5);
    k1_x = (int) ((obs1_x+(xres/2))/xres)+0.5 );
    k1_y = (int) ((obs1_y+(yres/2))/yres)+0.5 );
    k2_x = (int) ((obs2_x+(xres/2))/xres)-0.5 );/* kit change to - */
    k2_y = (int) ((obs2_y/yres)+0.5);
/*
fprintf(stderr,"PARK_PROC: prev_x=%d,prev_y=%d, prev_angle=%d0,prev_x,prev_y,
    prev_angle);
*/
/*
    drive_car ( 24,8,0,0);
    drive_car ( 26,8,2,1);
    drive_car ( 24,7,4,5);
    drive_car ( 21,5,7,5);
    drive_car ( 19,4,5,4);
```

```
                drive_car ( 16, 3, 2, 4);
                drive_car ( 13, 3, 0, 4);
                drive_car ( 12, 3, 0, 3);
                return;
*/
/*
        fprintf(stderr,"S_(X,Y,C)=%d,%d K1(x,y)=%d,%d K2(x,y)=%d,%d0, s_x, s_y, s_c,
                k1_x, k1_y, k2_x, k2_y);
*/              plan_path(s_x, s_y, s_c, k1_x, k1_y, k2_x, k2_y);

draw_obs1(obs1_x, obs1_y);
                draw_obs2(obs2_x, obs2_y);
                draw_curb();
        } delay_proc(item, value, event)
                Panel_item item;
                int value;
                Event *event;
        {
                delay = value;
        } done_proc()
        {
                window_destroy(base_frame);
        } sweep_proc(item, value, event)
                Panel_item item;
                int value;
                Event *event;
        {
                erase_car();
                sweepmode = value;
                draw_car();
        } grid_proc(item, value, event)
                Panel_item item;
                int value;
                Event *event;
        {
                gridmode = value;              /* If erasing then redraw scene also */
                if (!value)
                {
                        draw_grid(PIX_CLR);
                        draw_obs1(obs1_x, obs1_y);
                        draw_obs2(obs2_x, obs2_y);
                        draw_curb();
                        draw_car();
                }

67
```

```
        else                    /* else if drawing then draw scene over grid */
        {
            draw_grid(PIX_SET);
            draw_obs1(obs1_x,obs1_y);
            draw_obs2(obs2_x,obs2_y);
            draw_curb();
            draw_car();
        }
} collide_proc()
{
    window_set(collide_frame, WIN_SHOW, TRUE, 0);
} load_proc()
{
    char filename[80];

sprintf(filename,"%s",panel_get_value(prompt_item));
    if (strlen(filename))
        loadcs(filename);
} store_proc()
{
    char filename[80];

sprintf(filename,"%s",panel_get_value(prompt_item));
    if (strlen(filename))
        storecs(filename);
} loadcs(file)
    char *file;
{
} storecs(file)
    char *file;
{
} patent_proc(item,value,event)
    Panel_item item;
    int value;
    Event *event;
{
    erase_car();
    patentmode = value;
    draw_car();
    if (value)
```

```
		panel_set(center, PANEL_SHOW_ITEM, FALSE, 0);
	else
		panel_set(center, PANEL_SHOW_ITEM, TRUE, 0);
```

```
/* printout of file: init.c */
/*****************************/
#include "defines.h"
include "externs.h"
/***************************************************************
             init.c
             initialisation routines
    history
             created 19860924 Leo Dorst
             mod     19861113 Leo Dorst
***************************************************************/
init_goals()
{
    goalcounter = 0;
}
#ifdef OLDCON
init_con()  /* initializes array con[][] */
{
    register short i,j,k;

for (i=0; i<XSIZE; i++) {
        for (j=0; j<YSIZE; j++) {
            for (k=0; k<ZSIZE; k++) {
                if (i<= XWALL) {                         /* free motion area */
                    con[i][j][k] = NOCONSTRAINT;
                } else if (i<XGRIP) {                    /* block if closed */
                    if (j<YWALL) {
                        con[i][j][k] = CONSTRAINT;
                    } else {
                        con[i][j][k] = NOCONSTRAINT;
                    }
                } else if (i==XGRIP) {                   /* grip line */
                    if (j<YGRIP) {
                        con[i][j][k] = CONSTRAINT;
                    } else {
                        con[i][j][k] = NOCONSTRAINT;
                    }
                } else {                                 /* always blocked */
                    con[i][j][k] = CONSTRAINT;
                }
            }
        }
    }
    for (i=0; i<XSIZE; i++) {
        for (j=0; j<YSIZE; j++) {
            con[i][j][ZSIZE-1] = CONSTRAINT;
        }
    }
    for (k=0; k<ZSIZE; k++) {
        for (i=0; i<XSIZE; i++) {
            con[i][YSIZE-1][k] = CONSTRAINT;
        }
    }
```

```
/* printout of file: neighbor.c */
/*******************************/ include <math.h>
include <stdio.h>
#include "defines.h"
include "externs.h"

#define Q1 1
#define Q2 2
#define Q3 3
define Q4 4 float wheel_dir_to_rad(d)
int d;
{
    switch(d){
    case D0:   return(0);
    case D45:  return(PI/4);
    case D135: return(3*PI/4);
    case D180: return(PI);
    case D225: return(5*PI/4);
    case D315: return(7*PI/4);
    default:
        printf("direction %d is no good!0);
        return(-1);
    }
} init_local_neighbors()
{
    int carangle,dir;
    float dist;
    int dx,dy,dc;
    FILE *fp;
#ifdef NEIGHBORDIAG
    fp=fopen("neighbor.report","w");
    fprintf(fp,"dir : dist  dx dy dc0);
#endif
    for(carangle=0;carangle < CPLANES;carangle++)
    {
#ifdef NEIGHBORDIAG
        fprintf(fp,"carangle %d0,carangle);
#endif
        for(dir=0;dir<DIRECTION_COUNT;dir++)
        {
            d_neighbor(carangle,dir,&dist,&dx,&dy,&dc);
            local_neighbor[carangle][dir].dist= (COSTTYPE)(dist);
            /*local_neighbor[carangle][dir].dist= (COSTTYPE)(COST_DIST_RATIO * dist);*/
            local_neighbor[carangle][dir].dx=dx;
            local_neighbor[carangle][dir].dy=dy;
            local_neighbor[carangle][dir].dc=dc;
```

72

```
#ifdef NEIGHBORDIAG
        fprintf(fp,"dir %d: %5.3f %3d%3f%3d0,dir,dist,dir,dy,dc);
#endif
    }
#ifdef NEIGHBORDIAG
    fclose(fp);
#endif
} d_neighbor(c,dir,dist_moved,deltax,deltay,deltac)
int c,dir;
float *dist_moved;
int *deltax,*deltay,*deltac;
/* return neighbor of (x,y,c) in direction dir */
{
    /* delta might go from .1 to 1 with 9 increments */
    /* dir has 2 derived components:
            delta_x_or_y = RESOLUTION *(1+dir%STATES_PER_UNIT);
            wheel_direction = dir/STATES_PER_UNIT)
    */
    float xfact,yfact,cfact;
    float dC,dx,dy,tmpangle;
    float x_dist,y_dist,c_ang;
    float newx_dist,newy_dist,newc_ang;
    int tmp;
    float R;
    float delta_x_or_y;
    int wheel_direction;
    float tan_c_ang;
    float tan_w_ang;
    float wheel_in_radians;
    float tmpfloat;
    int signs;
    float delta_dist,deltay_dist;
    float base_angle;

/* for small dC   this holds.. we have small dC */ base_angle = 0;
    delta_x_or_y = (float) RESOLUTION * (1+(dir%STATES_PER_UNIT));
    wheel_direction = (int) (dir/STATES_PER_UNIT);

/* R is turning radius */ switch(wheel_direction)
    {
        /* since the movement of the 'pivot' (point halfway
           between the rear wheels) is symmetric for forward and backward
           movement, as well as symmetric left 45 and right 45 angles. The
           change in x,y, and theta (also called 'c' here) therefore only
           change in their signs from a 'reference' 45 degree maneuver or
```

73

```
        0 degree (straight) maneuver. The signs are assigned below.
        */
        case D180:
                wheel_direction= D0;
                xfact= -1;
                yfact= 1;
                cfact=1;
                break;
        case D135:
                wheel_direction= D45;
                xfact= -1;
                yfact= 1;
                cfact = -1;
                break;
        case D315:
                wheel_direction= D45;
                xfact= 1;
                yfact= -1;
                cfact= 1;
                break;
        case D225:
                wheel_direction=D45;
                xfact= -1;
                yfact= -1;
                cfact= 1;
                break;
        default:
                xfact= 1;
                yfact= 1;
                cfact=1;
} wheel_in_radians = wheel_dir_to_rad(wheel_direction);

tan_w_ang = tan(wheel_in_radians);

if(tan_w_ang < 0) tan_w_ang = -tan_w_ang;

if(tan_w_ang != 0)
        R= HALFWIDTH + WHEELBASE/tan_w_ang;
else R=9e99;    /* vvery large */

/* the R's above could be in a table */ c_ang = state_to_radians(c);

tan_c_ang = 0;
/*note that: tan_c_ang = tan(base_angle);*/ dx=delta_x_or_y;
dC= dx/(R*cos(base_angle));
            /* dC has to get calculated off c_ang */
dy= dx * (tan_c_ang + dC*dC/(2*cos(base_angle)));
```

```
            /* below is formula for distance moved along the arc */
            *dist_moved = (dx/cos(base_angle+dC/2));

if(*dist_moved <0)/* make sure that the distance is positive */
            {
                    printf("original dist was negative0);
                    *dist_moved = - (*dist_moved);
            } deltax_dist= xfact*dx*cos(c_ang) - yfact*dy*sin(c_ang);
            deltay_dist = xfact*dx*sin(c_ang) + yfact*dy*cos(c_ang);

*deltax= dist_to_state(deltax_dist);
            *deltay= dist_to_state(deltay_dist);
            *deltac = radians_to_state(cfact*dC);
    } neighbor(dist_moved,x,y,c,dir,newx,newy,newc)
    COSTTYPE *dist_moved;
    int x,y,c;
    int dir;
    int *newx, *newy, *newc;
    /* return neighbor of (x,y,c) in direction dir */
    {
            int tmpangle;
            NEIGHBORNODE *n;

/* old, calculation intensive way
            /*d_neighbor(c,dir,dist_moved,&dx,&dy,&dC);*/
            /*********************************************/ n= &(local_neighbor[c][dir]);

*dist_moved = n->dist;

*newx = x+ (n->dx);
            *newy = y+ (n->dy);
            *newc = c+ (n->dc);

if(*newc < 0) *newc += CPLANES;
            else if(*newc >= CPLANES) *newc -= CPLANES;

if( (*newx < 0) || (*newy < 0) ||
                (*newx >= XSIZE) || (*newy >= YSIZE))
            {
                    return(NOT_VALID);       /* outside of region */
            }
            else
                    return(VALID);  /* these states are VALID */
    }
```

```
/* printout of file:  obs.pr */
/********************************************/
/* Format_version=1, Width=32, Height=32, Depth=1, Valid_bits_per_item=16
*/
    0x9999, 0x9999,
    0x6666, 0x6666,
    0x6666, 0x6666,
    0x9999, 0x9999,
    0x9999, 0x9999,
    0x6666, 0x6666,
    0x6666, 0x6666,
    0x9999, 0x9999,
    0x9999, 0x9999,
    0x6666, 0x6666,
    0x6666, 0x6666,
    0x9999, 0x9999,
    0x9999, 0x9999,
    0x6666, 0x6666,
    0x6666, 0x6666,
    0x9999, 0x9999,
    0x9999, 0x9999,
    0x6666, 0x6666,
    0x6666, 0x6666,
    0x9999, 0x9999,
    0x9999, 0x9999,
    0x6666, 0x6666,
    0x6666, 0x6666,
    0x9999, 0x9999,
    0x9999, 0x9999,
    0x6666, 0x6666,
    0x6666, 0x6666,
    0x9999, 0x9999,
    0x9999, 0x9999,
    0x6666, 0x6666,
    0x6666, 0x6666,
    0x9999, 0x9999
```

76

```
/* printout of file: park.c */
/*****************************/

/*
 *   FILE    :   park.c
 *   AUTHOR  :   Sandeep Mehta, R&FA, Philips Labs, Briarcliff Manor, NY
 *
 *   DATE    :   Mon Mar 21 13:39:46 EST 1988
 *   PURPOSE :   SunView interface for car parking path planner
 *
 *   DESCRIPTION:
 *   FUNCTIONS:
 *   LIBRARIES:
 *
 *   Modification History:
 *   - created Mon Mar 21 13:39:46 EST 1988 - sxm
 *   - revised Mon Mar 28 22:00:00 EST 1988 - kit
 *            to handle non-sun interface
 */
#ifndef lint
static char park_c_sccsinfo[] = " %Z% %M% %I% %D%";
#endif
extern int errno;

#include <stdio.h>               /* standard C library */
#include <sunwindow/notify.h>
#include <sys/time.h>
#include "defines.h"
include "externs.h"
/* budding defines */ define PROGNAME "park"
define ITIMER_NULL ((struct itimerval *) 0)

static short icon_image[] =
{
#include "park.icon"
};

static short car_image[] =
{
#include "car.pr"
};
static Notify_value dispatcher();

mpr_static(car_pr,32,16,1,car_image);

DEFINE_ICON_FROM_IMAGE(park_icon, icon_image)

main(argc,argv)
    int argc;
    char *argv;
{
```

```
char string[53];
int sx,sy,sc,k1x,k1y,k2x,k2y;
int nx,ny,nc;
int cfr,cff;              /* Center of vehicle from rear and front */
COSTTYPE dummy;
int clen, cwid;           /* Length and Width of vehicle */
char cmd;
int dd;
struct itimerval dispatch;
/*
 * Setup graphics
 */
    printf(copyright);
    /* (c) copyright 1988 Philips Laboratories Briarcliff Manor NY */
    /* give them time to read it while the demo sets up*/ dist_from_curb = RESOLUTION;

/*
    printf("states per unit=%d, resolution=%d0,
                    STATES_PER_UNIT,RESOLUTION);
    */
#ifdef DEBUG
    printf("exec from sun? ->");
    scanf("%s",string);
    if(string[0] == 'y')
#endif
    {
    base_frame = window_create(0, FRAME,
        FRAME_ARGS, argc, argv,
        FRAME_ICON, (struct pixrect *) &park_icon,
        FRAME_LABEL, "PARALLEL PARKING PATH PLANNER INTERFACE",
        FRAME_NO_CONFIRM, TRUE,
        0);
    maxx = (int) window_get(base_frame, WIN_WIDTH);
    maxy = (int) ( maxx * YSIZE/XSIZE );
    /*
     * initialize state variables
     */
    create_panel();
    create_canvas(maxx,maxy);
    create_collide_panel();
    /*fprintf(stderr,"XSIZE=%d, YSIZE=%d, XSIZE,YSIZE);*/
    maxx = (int) window_get(park_canvas, WIN_WIDTH);
    maxy = (int) window_get(park_canvas, WIN_HEIGHT);
    xres = (float) maxx / (float) XSIZE;
    yres = (float) maxy / (float) YSIZE;

pmse_x = prev_x = (int) (INIT_X)/xres;  /* init mouse to car starting posn */
    pmse_y = prev_y = (int) (INIT_Y)/yres;
    prev_w = 0;
```

```
prev_angle = INIT_THETA;

/*fprintf(stderr, "MAX(x,y)=%d,%d, XRES=%f, YRES=%f0,
    maxx,maxy,xres,yres);*/

/*
 * Set up initial scene
 */ draw_obs1(maxx/4,maxy/3);
draw_obs2((3*maxx)/4,maxy/3);
/*
draw_obs2((3*maxx)/4+XSIZE,maxy/3); /* leo did this */
*/
draw_curb();
/*fprintf(stderr, "CARLENGTH=%f, HALFWIDTH=%f, REAR=%f0,
    carlength,halfwidth, rear);*/
/*
 * build car from specified parameters
 */
clen = (int) (carlength * STATES_PER_UNIT * xres + 0.5);
cwid = (int) (2 * halfwidth * STATES_PER_UNIT * yres + 0.5);
cfr  = (int) (rear * STATES_PER_UNIT * xres + 0.5);
cff  = (int) (clen-cfr);
/*fprintf(stderr,"CLEN=%d,CWID=%d,CFR=%d,CFF=%d",clen,cwid,cfr,cff);*/
build_car(clen,cwid,cfr,cff);
/*  translate_car(maxx/2,maxy/2);*/
/*  New position - sandeep 08/12/88 */
translate_car(INIT_X,INIT_Y);
rotate_car((INIT_THETA*CINC));
draw_car();
clr_panel();

/*fprintf(stderr,"INITIAL STATE: x=%d, y=%d, c=%f, w= %d0,prev_x,prev_y,
    prev_angle, prev_w);

/*
 * initialize budding
 */
#ifdef DEBUG
    is_sun = YES;
}
else is_sun = NO;
endif init_local_neighbors();/* sets up what the dx,dy,dc of local neighbors */
ifdef DEBUG
    if(is_sun)
#endif
{
    window_fit(base_frame);
    window_main_loop(base_frame);
#ifdef DEBUG
```

```
}
else
{
    printf("XSIZE=%d YSIZE=%d CPLANES=%d STATES_PER_UNIT=%d0,
        XSIZE,YSIZE,ZSIZE,STATES_PER_UNIT);
    /*printf("carlength=%f units, or %d states0,
        carlength,(int)(carlength*STATES_PER_UNIT));*/
    printf("obstacle1 x,y:");
    scanf("%d %d",&k1x,&k1y);
    printf("obstacle2 x,y:");
    scanf("%d %d",&k2x,&k2y);
    printf("START x,y,c:");
    scanf("%d %d",&sx,&sy,&sc);
    /*printf("plan_path(%d,%d,%d,%d,%d,%d,%d,%d0,
        sx,sy,sc,k1x,k1y,k2x,k2y);*/
    plan_path(sx,sy,sc,k1x,k1y,k2x,k2y);
    while(1)
    {
        printf("n(neighbor s(tart e(xamine state ->");
        scanf("%c",&cmd);
        switch(cmd)
        {
            case 'n':
                printf("neighbor of x y c:");
                scanf("%d %d",&sx,&sy,&sc);
                printf("direction? -> ");
                scanf("%d",&dd);
                neighbor(&dummy,sx,sy,sc,
                    dd,&nx,&ny,&nc);
                printf("neighbor of %d,%d,%d in dir %d is 0%d,%d,%d0,
                    sx,sy,sc,dd,nx,ny,nc);
                printf("transition cost is %f0,dummy);
                break;
            case 's':
                printf("NEW START? x,y,c:");
                scanf("%d %d",&sx,&sy,&sc);
                find_and_draw_shortest_path2(sx,sy,sc);
                break;
            case 'e':
                printf("state? x,y,c:");
                scanf("%d %d",&sx,&sy,&sc);
                printf("cost_to_goal=%f0,
                    configspace[sc][sx][sy].cost_to_goal);
                printf("parent x,y,c=%d,%d,%d0,
                    configspace[sc][sx][sy].parent_x,
                    configspace[sc][sx][sy].parent_y,
                    configspace[sc][sx][sy].parent_c);
                printf("vector=%d0,
                    configspace[sc][sx][sy].vector);
                break;
            default: printf("illegal cmd %c0,cmd);
        }
    }
}
```

```
}
endif DEBUG static Notify_value
dispatcher(me, which)
    Notify_client me;
    int which;
{
    notify_dispatch();
    return(NOTIFY_DONE);
} print_car()
{
    int i;
    for (i = 0; i < MAXVERTS; i++)
        printf("car_vlst[%d].(x,y) = %d,%d0,i,car_vlst[i].x,car_vlst[i].y);
    for (i = 0; i < MAXVERTS; i++)
        printf("cov_lst[%d].(x,y) = %d,%d0,i,cov_lst[i].x,cov_lst[i].y);
    for (i = 0; i < WHEELS; i++)
        printf("fw_lst[%d].(x,y) =%d,%d0,i,fw_lst[i].x,fw_lst[i].y);
}
```

```
/* printout of file: park.h */
/*********************************/
/*
 *      FILE :          park.h
 *      AUTHOR :        Sandeep Mehta, R&FA, Philips Labs, Briarcliff Manor, NY
 *      DATE:           Mon Mar 21 13:39:48 EST 1988
 *
 *      PURPOSE:        definitions for park
 *
 *      Modification History:
 *      - created Mon Mar 21 13:39:48 EST 1988 - sxm
 */
#ifndef lint
static char park_h_sccsinfo[] = " %Z% %M% %I% %D%";
endif include <suntool/sunview.h>
include <suntool/panel.h>
#include <suntool/canvas.h>
#include <suntool/tty.h>
include <suntool/textsw.h> define MAXSTRLEN       12
define MAXVERTS        4
#define COV_VERTS       4
#define WHEELS          4
#define WHEELS_OFF      8
#define OBS_GUARD       5
#define CURB_WIDTH      25   /* Number of pixels to guard from obs. */
#define INIT_X          4
#define INIT_Y          800
#define INIT_THETA      325
                        32

/*
 * The number indicates the number of intermediate positions drawn between
 * two calls to drive_car. This can vary between 10 to 25.
 */
define SMOOTH_FACTOR   10  /* Number of interpolation bet. states */ define STDOUT  0           /* Standard file descs. */
define STDIN   1

Frame   base_frame, collide_frame;
Panel   ctrl_panel, collide_panel;
Canvas  park_canvas;
Tty     tty;
Panel_item center, angle, wheel, direction, obs1, obs2, e_slider, w_slider,
        sweep, prompt_item;

extern struct pr_pos car_vlst[MAXVERTS];
extern struct pr_pos fw_lst[WHEELS];
```

```
extern struct pr_pos cov_lst[COV_VERTS];

extern struct pr_pos unit_vis[MAXVERTS];
extern struct pr_pos unit_fw[WHEELS];
extern struct pr_pos unit_cov[COV_VERTS];
/*
 * Global variables
 */
int obs1_x, obs1_y;                              /* Obstacle #1 co-ords */
int obs2_x, obs2_y;                              /* Obstacle #2 co-ords */
int maxx, maxy;                                  /* Canvas size. pixels numbered 0-(max-1)*/
int tty_fd;                                      /* Tty file desc */ float xres, yres;                                /* Resolution of parking lot in STATES */
float prev_angle;                                /* Previous angle of rotation */
int prev_x, prev_y, prev_c, prev_w; /* Previous quadruple in states */
int pmse_x, pmse_y;                              /* previous mouse positions */
```

83

```
/* printout of file: park.icon */
/****************************************/

/* Format_version=1, Width=64, Height=64, Depth=1, Valid_bits_per_item=16
 * Description: Traffic intersection as viewed from overhead
 * Background: White
 */
    0xFFFF, 0xFFFF, 0xFFFF, 0xFFFF, 0xB000, 0x0000, 0x0000, 0x0001,
    0xB000, 0x0000, 0x0000, 0x0001, 0xB000, 0x0000, 0x0000, 0x0001,
    0xB000, 0x0000, 0x0000, 0x0001, 0xFC00, 0x0000, 0x3C3C, 0x003D,
    0xE600, 0x0000, 0x0000, 0x0001, 0xE63C, 0x0C0C, 0x0C0C, 0x3C0D,
    0xE666, 0x76656, 0x0C0C, 0x0C0C, 0xF606, 0x6006, 0x0C0C, 0x660D,
    0xE603E, 0x603E, 0x0C0C, 0x7E0D, 0xE066, 0x6066, 0x0C0C, 0x600D,
    0xE066, 0x6056, 0x0C0C, 0x660D, 0xE000, 0x0001, 0x0000, 0x3C0D,
    0xB000, 0x0000, 0x0000, 0x0001, 0xB000, 0x0001, 0x0000, 0x0001,
    0xB000, 0x0000, 0x0000, 0x0001, 0xB000, 0x0001, 0x0000, 0x0001,
    0x3000, 0x0000, 0x0000, 0x0001, 0xB000, 0x0000, 0x0000, 0x0001,
    0x3000, 0x0000, 0x0000, 0x0001, 0xB7C0, 0x0006, 0x0180, 0x0001,
    0x8660, 0x0006, 0x0000, 0x0001, 0x8663, 0xC6C6, 0x6785, 0xC361,
    0x8666, 0x6766, 0xC187, 0x6661, 0xC7C0, 0x6607, 0xB1B6, 0x6661,
    0x8603, 0xE607, 0x31B6, 0x8606, 0x6606, 0xC1B6, 0x6661, 0x8606,
    0x6606, 0x5506, 0x6186, 0x66E1, 0x66E1, 0x8503, 0xE606, 0x61B6, 0x6361,
    0x8000, 0x0000, 0x0000, 0x0061, 0x8000, 0x0000, 0x0000, 0x0661,
    0x8000, 0x0000, 0x0000, 0x03C1, 0x8000, 0x0000, 0x0000, 0x0001,
    0x8000, 0x0000, 0x0000, 0x0001, 0x8000, 0x0000, 0x0000, 0x0001,
    0x8000, 0x0000, 0x0000, 0x0001, 0x8000, 0x0000, 0x0000, 0x0001,
    0x8000, 0x0000, 0x0000, 0x0001, 0x8000, 0x0040, 0x0000, 0x0001,
    0x8000, 0x0020, 0x0000, 0x0001, 0xA222, 0x2010, 0x0000, 0x0001,
    0xB8BB, 0x81FF, 0xFFFC, 0x4895, 0x8888, 0x8104, 0x0044, 0x2223,
    0xA222, 0x2102, 0x0004, 0x4445, 0xA222, 0x2100, 0x0044, 0x1111,
    0xB8BB, 0x8100, 0x0044, 0x0889, 0xB8BB, 0x8100, 0x01F4, 0x2223,
    0xA222, 0x2100, 0x0044, 0x4445, 0xA222, 0x2140, 0x0044, 0x1111,
    0xB8BB, 0x8120, 0x0004, 0x0889, 0xB8BB, 0x8110, 0x0004, 0x2223,
    0xA222, 0x21FF, 0xFFFC, 0x4445, 0xA222, 0xA222, 0x2002, 0x0000, 0x1111,
    0xB8BB, 0x8001, 0x0889, 0xB8BB, 0x8000, 0x0000, 0x2223,
    0xA222, 0x2000, 0x0000, 0x4445, 0xFFFF, 0xFFFF, 0xFFFF, 0xFFFF
```

```
/* printout of file: rgb.h */
/****************************/

/*
 *   FILE :       rgb.h
 *   AUTHOR :     Sandeep Mehta, R&FA, Philips Labs, Briarcliff Manor, NY
 *
 *   DATE:        Mon Mar 21 16:27:50 EST 1988
 *
 *   PURPOSE:     definitions for rgb
 *
 *   Modification History:
 *   - created Mon Mar 21 16:27:50 EST 1988 - sxm
 *   mod 8/23 kit- to switch between black & white background
 */
#ifndef lint
static char rgb_h_sccsinfo[] = " %Z% %M% %I% %D%";
endif define RGB       "rgb"
define RGBSIZE   8 define BLACKBACKGROUND
/* comment out the above define if you want a white background */ ifdef BLACKBACKGROUND

/* BLACK background */
#define BLACK    0
#define RED      1
#define YELLOW   2
#define GREEN    3
#define CYAN     4
#define BLUE     5
#define MAGENTA  6
define WHITE    7 define rgbsetup(r,g,b)      (r)[BLACK] = 0;    (g)[BLACK] = 0;    (b)[BLACK] = 0;    (r)[RED] = 255;    (g)[R
else /* WHITE BACKGROUND */
define WHITE    0
#define RED      1
#define YELLOW   2
#define GREEN    3
#define CYAN     4
#define BLUE     5
#define MAGENTA  6
define BLACK    7 define rgbsetup(r,g,b)      (r)[WHITE] = 255;  (g)[WHITE] = 255;  (b)[WHITE] = 255;  (r)[RED] = 255;    (g)
``` endif

```
/* printout of file: show.c */
/**************************************/ include "defines.h"
include "externs.h"
/*#define NOARROWS*/
/******************************************************************/
/*    show.c                              */
/*    sunshow arrays       */
/*           created 198609xx Leo Dorst          */
/*           mod     19861114 Leo Dorst          */
/******************************************************************/ show_goal()        /* show goal points */
{
    register int i, inc;

inc = CELL_SIZE > CSTEP;

for (i=0; i<goalcounter; i++) {
        printf("goal[%d]= %d, %d, %d,
            goal[i].x, goal[i].y, goal[i].z);
    }
} show_state(i, j, k)
int    i, j, k;
{
    /* INSERT SANDEEPS CODE HERE */
    /* kit removed 8/31/88
    printf("state shown is x,y,c %d,%d,%d0,i,j,k);
    printf("=x,y,c %f,%f feet at %f degrees0,
        state_to_dist(i),state_to_dist(j),
        rtoa(state_to_radians(k)));
    */
}
```

B7

```c
/* printout of file: transform.c */
/***************************************/
include <stdio.h>
include <math.h>
/*#include <pixrect/pixrect_hs.h>*/
#include "rgb.h"
*/ include "defines.h"
include "externs.h"

/* file transform.c */ define TOP_RIGHT      0
define TOP_LEFT       1
#define BOTTOM_RIGHT   2
define BOTTOM_LEFT    3 define TR(c) c
define TL(c) (PI-c)
#define BR(c) (-c)
#define BL(c) (PI+c)

#define TR_sign_x  1
define TR_sign_y  1 define TL_sign_x -1
define TL_sign_y  1 define BR_sign_x  1
define BR_sign_y -1 define BL_sign_x -1
define BL_sign_y -1 define MAXVERTICES 12
static POLNODE polygon[NUMVERTICES];

get_params(angle,a,b,d)
double *angle;
float *a,*b,*d;
{
            /* given angle, give dimensions of a,b,d */ if(*angle < 0)
                  *angle = *angle + 2*PI;
            else if(*angle > (2*PI))
                  *angle = *angle - 2*PI;

if(*angle < PI/2)
            {
                  *a=rear;
```

```
            *b=halfwidth;
            *d=halfwidth;
            return;
        }
        if(*angle < PI)
        {
            *a=halfwidth;
            *b=rear;
            *d=front;
            return;
        }
        if(*angle < 3*PI/2)
        {
            *a=front;
            *b=halfwidth;
            *d=halfwidth;
            return;
        }
        else
        {
            *a=halfwidth;
            *b=front;
            *d=rear;
        }
    } get_corner(corner_type,Car_Angle,a,b,d,dx1,dy1,dx2,dy2)
    int corner_type;
    double Car_Angle;
    double a,b,d;
    int *dx1, *dy1, *dx2, *dy2;
    {
        int xsign,ysign;

double factor, t_angle, angle;

/*      each obstacle corner yields 2 transformed
                turning points  t1=(x+dx1,y+dy1); t2=(x+dx2,y+dy2);
        */
        switch(corner_type)
        {
            case TOP_RIGHT:
            {
                xsign= TR_sign_x;
                ysign= TR_sign_y;
            }
            break;
            case TOP_LEFT:
            {
                xsign= TL_sign_x;
```

```
            }
            break;
        case BOTTOM_RIGHT:
            {
                xsign= BR_sign_x;
                ysign= BR_sign_y;
            }
            break;
        case BOTTOM_LEFT:
            {
                xsign= BL_sign_x;
                ysign= BL_sign_y;
            }
            break;
    }
    factor = sqrt(a*a + b*b);

if(Car_Angle >= 3*PI/2)
        t_angle = Car_Angle - 3*PI/2;
    else if(Car_Angle >= PI)
        t_angle = Car_Angle - PI;
    else if(Car_Angle >= PI/2)
        t_angle = Car_Angle - PI/2;
    else t_angle=Car_Angle;

angle = t_angle + atan(b/a);
    /*
    angle = Car_Angle - atan(a/b));
    */
    *dx1 = dist_to_state(xsign*factor * cos(angle));
    *dy1 = dist_to_state(ysign*factor * sin(angle));

factor = sqrt(a*a + d*d);
    angle = t_angle - atan(d/a);

*dx2 = dist_to_state(xsign*factor * cos(angle));
    *dy2 = dist_to_state(ysign*factor * sin(angle));
} set_goal(trx,try,tlx,tly)
int trx,try,tlx,tly;    /* these are states */
{
    /* for now, the car will park right next to the curb
       and leave the same amount of space to either side of it */
    /* it will point to the left of the screen */ int spotsize,buffer,goalstate_x;
    int states_from_curb,states_in_halfwidth;
    int states_for_car;
```

```
/*printf("carlength=%f   wheelbase=%f,  halfw=%f rear=%f, front=%f0,
    carlength,wheelbase, halfwidth, rear, front);
    printf("dist_from_curb=%f0,dist_from_curb);*/
    spotsize = tix - trx;   /* size of parking spot */
    /*printf("spotsize=%d states0,spotsize);*/ states_for_car= dist_to_state(carlength);
    buffer = (int)(spotsize - states_for_car)/2;
    /* buffer is in states */
    /*
    printf("buffer to either side is %d states for car %d units0,
        buffer,states_for_car);
    */ goalstate_x = trx + buffer + dist_to_state(front);
    /* this is the position of the pivot point */ states_from_curb = dist_to_state(dist_from_curb);   /* leo */
    states_in_halfwidth = dist_to_state(halfwidth);

add_goal(goalstate_x, states_from_curb + states_in_halfwidth,
        CPLANES/2);

/* draw_goal(newgoals[0].x,newgoal[0].y); */
    /* car should face left */
} add_goal(x,y,z)
int x,y,z;
{
    /*printf("adding goal at %d,%d,%d0,x,y,z);*/
    newgoals[newgoalcounter].x=x;
    newgoals[newgoalcounter].y=y;
    newgoals[newgoalcounter++].z=z;
} int greatestof(y1,y2,y3,y4)
int y1,y2,y3,y4;
{
    int greatest_of_y1_y2;
    int greatest_of_y3_y4;

if(y1 > y2)
        greatest_of_y1_y2 = y1;
    else
        greatest_of_y1_y2= y2;

if(y3 > y4)
        greatest_of_y3_y4= y3;
    else
        greatest_of_y3_y4= y4;

if(greatest_of_y1_y2 > greatest_of_y3_y4)
```

```
            else      return(greatest_of_y1_y2);
                     return(greatest_of_y3_y4);
} transform_cars(trx,try,tlx,tly)
int trx,try,tlx,tly;     /* these are states */
/* trx, try is top right corner of car in bottom left of street */
/* tlx, tly is top left corner of car in bottom right of street */
{
        /* the config space has 0,0 in the bottom left corner */
        /* the graphics is upside down- it has 0,0 in the upper left */
        /* all following terminology is for the config space situation */

/* cars are in the bottom left corner and the bottom right
        corner in task space, and will be converted to forbidden regions
        (all angles C) in configuration space */ int Cplane;
        int i;

float a,b,d;

double Car_Angle;
        int dx1,dy1,dx2,dy2;            /* states */
        int dx3,dy3,dx4,dy4;
        int away_from_curb;
        int l1x,l1y,l2x,l2y;
        int l3x,l3y,l4x,l4y;

int t1x,t1y,t2x,t2y,t3x,t3y,t4x,t4y;

/* for the angle C of the Car, determine the forbidden
        region in this plane (C) of Configspace */ for(Cplane=0;Cplane < CPLANES;Cplane++)
        {
                /* for angles 0 to PI/2 */
                /* and for the Right-Top corner (Parked car 1) */

Car_Angle = TR(Cplane * CINC);
                /* depends on which corner */ get_params(&Car_Angle,&a,&b,&d);

/* now the outward facing side of the car is determined */ get_corner(TOP_RIGHT,Car_Angle,a,b,d,&dx1,&dy1,&dx2,&dy2);

/* absolute locations of 2 points k1 & k2 of car 1 are: */
                t1x = trx+dx1; t1y = try+dy1;
                t2x = trx+dx2; t2y = try+dy2;
```

```
/*
if((Cplane % 10) == 0)
   printf("dx,y1 = %d,%d   dx,y2 = %d,%d0,dx1,dy1,dx2,dy2);
*/

Car_Angle = TL(Cplane * CINC);
get_params(&Car_Angle,&a,&b,&d);
get_corner(TOP_LEFT,Car_Angle,a,b,d,&dx3,&dy3,&dx4,&dy4);

/* vertices are connected: t1 t2 t4 t3 */
/* left to right */ t3x = t1x+dx3;  t3y = t1y+dy3;
t4x = t1x+dx4;  t4y = t1y+dy4;
/*
if((Cplane % 10) == 0)
   printf("dx,y3 = %d,%d   dx,y4 = %d,%d0,dx3,dy3,dx4,dy4);
*/ ifndef using_concave
/* START HERE ON THURSDAY TO BUILD THE ORANGE DIAG LINES */

/* now do the upper left CONCAVE corner (0,XSIZE-1) */

Car_Angle = BR(Cplane * CINC);   /* lower right box corner */
get_params(&Car_Angle,&a,&b,&d);
get_corner(BOTTOM_RIGHT,Car_Angle,a,b,d,&I1x,&I1y,&I2x,&I2y);
/*
if((Cplane % 10) == 0)
{
   printf("t1x,y=%d,%d   t2x,y=%d,%d0, t1x,t1y,t2x,t2y);
   printf("t3x,y=%d,%d   t4x,y=%d,%d0, t3x,t3y,t4x,t4y);
   printf("BR corners =delta[%d,%d] and [%d,%d]0,
           I1x,I1y,I2x,I2y);
   printf("BR corners =[%d,%d] and [%d,%d]0,
           I1x,YSIZE+I2x,YSIZE+I2y);
}
*/
Car_Angle = BL(Cplane * CINC);   /* bottom left box corner */
get_params(&Car_Angle,&a,&b,&d);
get_corner(BOTTOM_LEFT,Car_Angle,a,b,d,&I3x,&I3y,&I4x,&I4y);
/*
if((Cplane % 10) == 0)
{
   printf("t3x,y=%d,%d   t4x,y=%d,%d0, t3x,t3y,t4x,t4y);
   printf("BL corners =delta[%d,%d] and [%d,%d]0,
           I3x,I3y,I4x,I4y);
   printf("BL corners =[%d,%d] and [%d,%d]0,
           XSIZE+I3x,YSIZE+I3y,XSIZE+I4x,YSIZE+I4y);
}
*/
```

93

```
endif away_from_curb = greatestof(dy1,dy2,dy3,dy4);

/*
final polygon is:

(0,0,C) -> (0,t1y,C) -> (t1x,t1y,C) ->
        (t2x,t2y,C) -> (t2x,away_from_curb,C) ->
        (t4x,away_from_curb,C) ->
        (t4x,t4y,C) -> (t3x,t3y,C) -> (XSIZE-1,t3y,C)->
        (XSIZE-1,0,C) -> (0,0,C)

but because we are filling in where 2 cars were,
we can color in now
*/

/* make sure all the points are inside CS */ if(t1x < 0) t1x=0; if(t1x >= XSIZE) t1x = XSIZE -1;
        if(t1y < 0) t1y=0; if(t1y >= YSIZE) t1y = YSIZE -1;
        if(t2x < 0) t2x=0; if(t2x >= XSIZE) t2x = XSIZE -1;
        if(t2y < 0) t2y=0; if(t2y >= YSIZE) t2y = YSIZE -1;

if(t3x < 0) t3x=0; if(t3x >= XSIZE) t3x = XSIZE -1;
        if(t3y < 0) t3y=0; if(t3y >= YSIZE) t3y = YSIZE -1;
        if(t2x < 0) t2x=0; if(t2x >= XSIZE) t2x = XSIZE -1;
        if(t2y < 0) t2y=0; if(t2y >= YSIZE) t2y = YSIZE -1;

/* car not overlapping curb ever....*/ fill_down(0,t1y,t1x,t1y,Cplane);
        fill_down(t1x,t1y,t2x,t2y,Cplane);
        fill_down(t2x,t2y,t2x,away_from_curb,Cplane);
        fill_down(t2x,away_from_curb,t4x,away_from_curb,Cplane);
        fill_down(t4x,away_from_curb,t4x,t4y,Cplane);
        fill_down(t4x,t4y,t3x,t3y,Cplane);
        fill_down(t3x,t3y,XSIZE-1,t3y,Cplane);

/* draw forbidden lines for this plane */

/* next set will allow a little overlap w/curb */
/* will make it easier to get into the spot */
/* kit 3/30/88 commented out!!!!!!!!!
        fill_down(0,t1y,t1x,t1y,Cplane);
        fill_down(t1x,t1y,t2x,t2y,Cplane);
        fill_down(t2x,t2y,t2x,dy1-1,Cplane);
        fill_down(t2x,dy1-1,t4x,dy4-1,Cplane);
        fill_down(t4x,dy4-1,t4x,t4y,Cplane);
        fill_down(t4x,t4y,t3x,t3y,Cplane);
        fill_down(t3x,t3y,XSIZE-1,t3y,Cplane);
*/
```

```
/*
if((Cplane % 3) == 0)
printf("region=%d,%d->%d,%d->%d,%d->%d,%d->%d,%d->%d,%d->%d,%d 0,
         0,t1y,
         t1x,t1y,
         t2x,t2y,
         t2x,away_from_curb,
         t4x,away_from_curb,
         t4x,t4y,
         t3x,t3y,
         XSIZE-1,t3y);
printf("vertical stripe at x=%d, and x=%d0,dx2,XSIZE-1-dx3);
*/
         vertical_stripe(I2x,XSIZE+I4x,Cplane);
         horizontal_stripe(YSIZE+IIy,Cplane);
}
/*
for(i=0;i<CPLANES;i++)
         printf("hline[%d]=%d0,i,hline[i]);
*/
/*printf("finished transformationO);*/
}
horizontal_stripe(j,c)
int j,c;
{
    int x;
    /*if((c % 10) == 0)
         printf("Horiz. stripe at %d0,j);
    */
    for (x=0;x< XSIZE;x++)
    {
         configspace[c][x][j].cost_to_goal = INFINITY;
         configspace[c][x][j-1].cost_to_goal = INFINITY;
         /* the second stripe ensures safety margin for
            car plus the thickness of the border required */
    }
    hline[c]=j;
}
vertical_stripe(i,j,c)
int i,j,c;
{
    int y;
    /*if((c % 10) == 0)
         printf("Vertical stripes at %d and %d0,i,j);
    */
    for(y= 0;y< YSIZE;y++)
    {
         configspace[c][i][y].cost_to_goal = INFINITY;
         configspace[c][i+1][y].cost_to_goal = INFINITY;
         /* second stripe is safety & thickness */
```

95

```
                configspace[c][j][y].cost_to_goal = INFINITY;
                configspace[c][j-1][y].cost_to_goal = INFINITY;
                /* second stripe is safety & thickness */
        }
} fill_down(x1,y1,x2,y2,c)
int x1,y1,x2,y2,c;
{
        int t;  /* temporary swapping variable */
        int x,y,deltax;

/* formula:
                        y-y1 = y2-y1 (x-x1)
                              -----
                              x2-x1 if x2-x1 = 0, then vertical line.
        */
        if(x1 > x2)
        {
                /* swap pairs's so that xstart is < xend */
                t=x1;
                x1=x2;
                x2=t;
                /* swap corresponding y's */
                t=y1;
                y1=y2;
                y2=t;
        }
        if((deltax = x2-x1) != 0)        /* horiz or diagonal */
        {
                if((y2-y1) == 0)         /* horizontal. reduce calculation */
                {
                        for(x=x1;x<x2;x++)
                        for(y= y1;y>=0;y--)
                        configspace[c][x][y].cost_to_goal = INFINITY;
                }
                else    /* diagonal. need line equation */
                {
                        for(x=x1;x<x2;x++)
                        for(y= (int)(((y2-y1)*(x-x1)/deltax) + y1);y>=0;y--)
                        configspace[c][x][y].cost_to_goal = INFINITY;
                }
        }
        else /* vertical stripe */
        {
                /* x2 = x1 */
```

```
for(y=y1;y>=0;y--)
    configspace[c][x1][y].cost_to_goal =
        INFINITY;
```

We claim:

1. Apparatus for maneuvering a vehicle comprising
   means for storing a configuration space representation of a task space for the vehicle, which representation is referred to herein as a "configuration space";
   means for propagating cost waves in the configuration space;
   means for determining a maneuver path from a start state to a goal state in the configuration space based on the cost waves; and
   means for controlling the vehicle to follow the maneuver path;
   wherein the representation of the configuration space includes an array of states, each state having cost to goal and direction arrows fields.

2. The apparatus of claim 1 wherein the propagating means includes means for budding from a goal state, which budding means includes:
   a) means for exploring all neighbors of a state in the configuration space;
   b) means for improving neighbors of the state by assigning appropriate values of cost to goal and direction arrows fields to the state;
   c) means for adding improved neighbors to a storage data structure; and
   d) means for causing means 3a)–3c) to iterate for all states in the storing means.

3. The apparatus of claim 2 wherein said means for exploring searches states according to a precedence in which if a first neighbor state is blocked by an obstacle, no second neighbor state beyond the first neighbor state is searched.

4. The apparatus of claim 1 wherein the determining means includes computing means for following values in the direction arrows fields.

5. The apparatus of claim 1 wherein the array includes
   a first dimension for representing a pose of the vehicle in a task space along a first Cartesian axis;
   a second dimension for representing the pose of the vehicle in the task space along a second Cartesian axis; and
   a third dimension for representing the pose of the vehicle in the task space according to an angular orientation of the vehicle.

6. The apparatus of claim 5 wherein
   a. the vehicle is a car;
   b. the propagating means includes:
      i) means for exploring all neighbors of a state in the configuration space;
      ii means for improving neighbors of the state by assigning appropriate values of cost to goal and direction arrows fields to the state;
      iii) means for adding improved neighbors to a storage data structure; and
      iv) means for causing means 7b)i)–7b)iii) to iterate for all states in the storing means;
   c. the determining means includes computing means for following values in the direction arrows fields; and
   d. the pose is measured along the first and second Cartesian axes according to a position of the rear differential of the car.

7. The apparatus of claim 6 wherein each state in the representation of the configuration space has a set of neighbor states which fall within a bow-tie shape in task space.

8. A device for maneuvering a vehicle comprising
   a) means for storing an internal representation of objects surrounding the vehicle, which objects are relevant to a desired maneuver;
   b) means for selecting a movement trajectory based on the internal representation; and
   c) means for controlling the vehicle to follow the trajectory;
   wherein the internal representation includes a set of possible configurations of the vehicle and the selecting step includes selecting a sequence of configurations from the set of configurations.

9. The apparatus of claim 8 wherein the vehicle is a car.

10. The apparatus of claim 9 wherein the path is a path for parallel parking between two parked cars.

11. The apparatus of claim 10 wherein the path is a path for making a three point turn.

12. The device of claim 8, wherein
   a. the internal representation is a configuration space representation of a task space for the vehicle, which representation is referred to herein as a "configuration space";
   b. the means for selecting comprises
      i. means for propagating cost waves in the configuration space; and
      ii. means for determining a maneuver path from a start state to a goal state in the configuration space based on the cost waves.

13. A method for planning a path for an object to follow and for controlling the object to follow the path in a task space comprising the steps of:
   a) propagating cost waves in a configuration space representation of the task space, which propagating step comprises the steps of:
      i) exploring all neighbors of a state in the configuration space using a precedence in which if a first neighbor state is blocked by an obstacle, no second neighbor state beyond the first neighbor state is searched;
      ii) improving neighbors of the state by assigning appropriate values of cost to goal and direction arrows fields to the state;
      iii) adding improved neighbors to a storage data structure; and
      iv) causing iteration through steps 13a)i)–13a)iii) for all states in the storing means; and
   b) controlling the object to follow a path indicated by the direction arrows fields.

14. A method for planning a path for an object to follow in a task space and for controlling the object to follow the path comprising the steps of:
   a) propagating cost waves in a configuration space representation of the task space, which propagating step comprises the steps of:
      i) exploring all neighbors of a state in the configuration space, wherein neighbors are defined according to a neighborhood which varies from state to state;
      ii) improving neighbors of the state by assigning appropriate values of cost to goal and direction arrows fields to the state;
      iii) adding improved neighbors to a storage data structure; and
      iv) causing iteration of steps 13a)i)–13a)iii) for all states in the storing means; and
   b) controlling the object to follow a path indicated by the direction arrows fields.

15. The method of claim 14 wherein a shape of the neighborhoods varies by state of configuration space.

16. The method of claim 14 wherein neighbors correspond to respective numbers of transitions along respective parameter axes of configuration space and the respective numbers vary by state of the configuration space.

17. A device for maneuvering an autonomous vehicle comprising
 a) means for storing an internal representation of
  i) objects surrounding the vehicle, which objects are relevant to a desired maneuver; and
  ii) a non-holonomic nature of the vehicle;
 b) means for selecting a movement trajectory based on the internal representation according to some criterion for optimizing movement; and
 c) means for controlling the vehicle to follow the trajectory autonomously.

18. The device of claim 17 wherein the movement is parallel parking.

19. The device of claim 17 wherein the movement is a three point turn.

20. The device of claim 17 wherein the representation of the non-holonomic nature of the vehicle includes a representation of a neighborhood of permissible motions of the vehicle.

21. A device for maneuvering an autonomous vehicle comprising
 a) means for storing an internal representation of
  i) objects surrounding the vehicle, which objects are relevant to a desired maneuver; and
  ii) a non-holonomic nature of the vehicle;
 b) means for selecting a movement trajectory based on the internal representation according to some criterion for optimizing movement; and
 c) means for controlling the vehicle to follow the trajectory autonomously, wherein
  the representation of the objects around the vehicle has more than two dimensions;
  the representation includes a representation of a goal or obstacle position; and
  the goal or obstacle position is represented differently in different two dimensional layers of the representation.

22. The device of claim 21 wherein the representation of the non-holonomic nature of the vehicle includes a representation of a neighborhood of permissible motions of the vehicle, which permissible motions include motions between different two dimensional layers of the representation.

* * * * *